(12) United States Patent
Mueck

(10) Patent No.: US 12,363,516 B2
(45) Date of Patent: Jul. 15, 2025

(54) RECONFIGURABLE RADIO SYSTEMS INCLUDING RADIO INTERFACE ENGINES AND RADIO VIRTUAL MACHINES

(71) Applicant: Intel Corporation, Santa Clara, CA (US)

(72) Inventor: Markus Dominik Mueck, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 666 days.

(21) Appl. No.: 17/761,982

(22) PCT Filed: Dec. 18, 2020

(86) PCT No.: PCT/US2020/066236
§ 371 (c)(1),
(2) Date: Mar. 18, 2022

(87) PCT Pub. No.: WO2021/146029
PCT Pub. Date: Jul. 22, 2021

(65) Prior Publication Data
US 2022/0345863 A1    Oct. 27, 2022

Related U.S. Application Data

(60) Provisional application No. 62/962,738, filed on Jan. 17, 2020, provisional application No. 62/962,715, filed on Jan. 17, 2020.

(51) Int. Cl.
*H04W 4/50*   (2018.01)
*H04L 49/00*   (2022.01)
*H04W 56/00*   (2009.01)

(52) U.S. Cl.
CPC ............... *H04W 4/50* (2018.02); *H04L 49/70* (2013.01); *H04W 56/001* (2013.01)

(58) Field of Classification Search
CPC ............................ H04W 4/50; H04W 56/001
See application file for complete search history.

(56) References Cited

U.S. PATENT DOCUMENTS

2008/0189628 A1* 8/2008 Liesche ............... G06F 16/9535
707/E17.109
2012/0096485 A1* 4/2012 Andres Del Valle .. G06Q 30/02
725/32

(Continued)

FOREIGN PATENT DOCUMENTS

EP        3379771 A1    9/2018
KR    10-1701037 B1    2/2017

OTHER PUBLICATIONS

International Search Report and Written Opinion mailed Apr. 21, 2021 for International Patent Application No. PCT/US2020/066236, 13 pages.

(Continued)

*Primary Examiner* — Barry W Taylor
(74) *Attorney, Agent, or Firm* — Schwabe, Williamson & Wyatt, P.C.

(57) ABSTRACT

Disclosed embodiments generally relate to Reconfigurable Radio Systems (RRS), wireless networks, and wireless communication, and in particular, to various Radio Interface Engine (RIE) and Radio Virtual Machine (RVM) arrangements and configurations for RRS. Other embodiments may be described and/or claimed.

24 Claims, 31 Drawing Sheets

(56) References Cited

U.S. PATENT DOCUMENTS

2013/0208699 A1* 8/2013 Hakkinen ............. H04W 76/38
 370/331
2020/0336900 A1* 10/2020 Mueck .................. H04W 12/03
2023/0180338 A1* 6/2023 Fujishiro ........... H04W 74/0833
 370/329

OTHER PUBLICATIONS

ETSI, "Reconfigurable Radio Systems (RRS); Feasibility study of a Radio Interface Engine (RIE)", ETSI TR 103 587 V1.1.1, 19 pages (Feb. 2018).

ETSI, "Reconfigurable Radio Systems (RRS); Use Cases and Scenarios for Software Defined Radio (SDR) Reference Architecture for Mobile Device", ETSI TR 103 062 V1.1.1, 23 pages (Apr. 2011).

ETSI, "Reconfigurable Radio Systems (RRS); Cognitive Radio System Concept", ETSI TR 102 802 V1.1.1, 31 pages (Feb. 2010).

* cited by examiner

RECONFIGURABLE RADIO SYSTEMS INCLUDING RADIO INTERFACE ENGINES AND RADIO VIRTUAL MACHINES

CROSS-REFERENCE TO RELATED APPLICATIONS

The present application is a national stage entry under 35 U.S.C. § 371 of Int'l App. No. PCT/US2020/066236, which claims priority to U.S. Provisional App. No. 62/962,738 filed Jan. 17, 2020 and U.S. Provisional App. No. 62/962,715 filed Jan. 17, 2020, the contents of each of which are hereby incorporated by reference in their entireties.

TECHNICAL FIELD

Embodiments described herein generally relate to edge computing, network communication, communication system and reconfigurable radio equipment system implementations, and in particular, to Radio Interface Engines and Radio Virtual Machine system architectures and related technologies.

BACKGROUND

Radio equipment (RE) refers to an electrical or electronic product, which intentionally emits and/or receives radio waves for the purpose of radio communication and/or radio-determination, or an electrical or electronic product which must be completed with an accessory, such as antenna, so as to intentionally emit and/or receive radio waves for the purpose of radio communication and/or radiodetermination.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The following embodiments generally relate to Reconfigurable Radio Systems (RRS), wireless networks, and wireless communication, and in particular, to various Radio Interface Engine (RIE) and Radio Virtual Machine (RVM) arrangements and configurations for RRS. Other embodiments may be described and/or claimed herein. The various embodiments discussed herein are applicable to any kind of wireless/radio equipment and/or components thereof, including, for example, processors/CPUs with (or capable of accessing) connectivity features, mobile devices (e.g., smartphones, feature phones, tablets, wearables (e.g., smart watches or the like), IoT devices, laptops, wireless equipment in vehicles, industrial automation equipment, etc.), network or infrastructure equipment (e.g., Macro/Micro/Femto/Pico Base Stations, repeaters, relay stations, WiFi access points, RSUs, RAN nodes, backbone equipment, routing equipment, any type of Information and Communications Technology (ICT) equipment, any type of Information Technology (IT) equipment, etc.), and systems/applications that are not classically part of a communications network (e.g., medical systems/applications (e.g., remote surgery, robotics, etc.), tactile internet systems/applications, satellite systems/applications, aviation systems/applications, vehicular communications systems/applications, autonomous driving systems/applications, industrial automation systems/applications, robotics systems/applications, etc.). The embodiments introduce hierarchy levels for various types of equipment, for example, network equipment may have a higher hierarchy level as compared to UEs, or vice versa. Depending on the hierarchy level, some equipment may be treated preferably (less delay) or may have access to more information/data than other equipment.

1. Reconfigurable Radio Equipment Aspects

Figure 1:
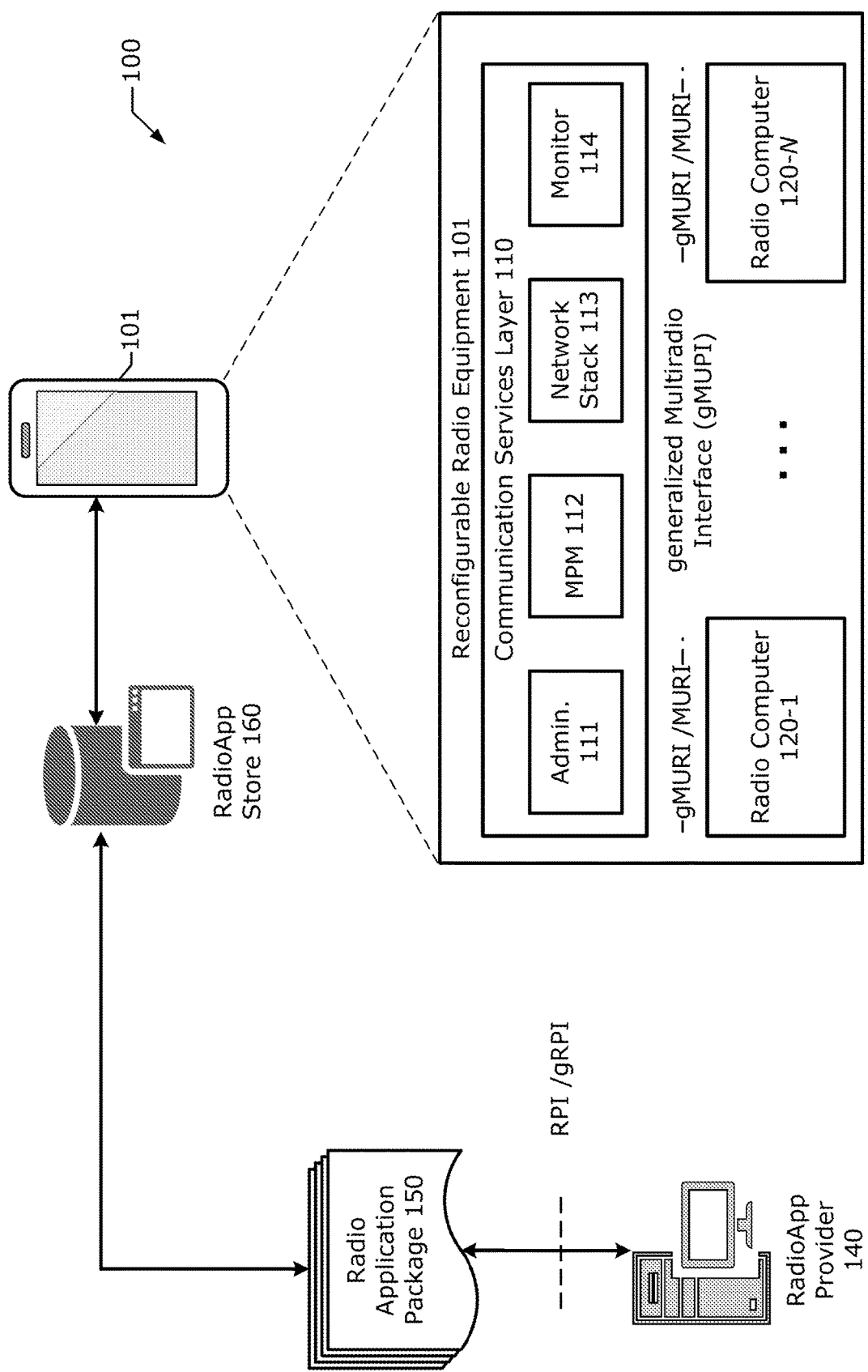
FIG. 1 illustrates an example reconfigurable radio equipment architecture according to various embodiments.

FIG. 1 shows an example reconfigurable RE (RRE) architecture 100 including four sets of interfaces, according to various embodiments. The RRE 101 includes one or more radio computers 120 (including radio computers 120-1 to 120-N where N is a number) for supporting distributed computations (see e.g., [EN303648]). The RRE 101 is capable of running multiple radios simultaneously (e.g., Radio Computers 1-N, where N is a number), changing the set of radios by loading new Radio Application Packages (RAP) 150 and setting their parameters. For the specific case of Mobile Device Reconfiguration as given in [EN303095], [EN303146-1] to [EN303146-4], [TR103087], and [TS103436], only a single Radio Computer is used in the target platform.

Each radio computer 120 can execute the Radio Application (RA) code including various functional blocks of which the granularities might be all different depending upon hardware platform vendors—depending on the features provided by radio equipment manufacturers, the (3rd party) software manufacturer develops the entire or partial RA 270 code using the standard programming interfaces as depicted in FIG. 1. A modular software approach is applied in order to maximize the reusability of software components. The evolution of RATs can be supported by adding and/or replacing the functional blocks on a given hardware platform.

A RAP 150 is a delivery unit of a Radio Application (RA), which may, upon execution of the RA 270, reconfigure the radio communications technologies of the RE 101. An RA 270 is software that enforces the generation of the transmit radiofrequency (RF) signals or the decoding of the receive RF signals The software is executed on a particular radio platform or an radio virtual machine (RVM) 271 as part of the radio platform.

RAs 270 are applications (apps) that may access low-level parameters of REs 101 in order to update or otherwise alter how the RE 101 uses its radio technology or individual radio computer(s) 120. In this example, RE 101 reconfiguration through RAs 270 is implemented via the RadioApp Store 160, which is an extension of the app store concept used for most mobile device platforms, such as smartphones and tablet computers, wherein a user may access an RA 270 from the RadioApp Store 160 through a RPI/gRPI to download and install RAs 270.

RAs 270 may have different forms of representation including, for example, source code including Radio Library 273 calls of Radio Library 273 native implementation and Radio HAL calls; as Intermediate Representations (IRs) including Radio Library 273 calls of Radio Library 273 native implementation and radio HAL calls; and/or as executable codes for a particular radio platform. All RAs 270 are called Unified Radio Applications (URAs) 205 when they exhibit a common behavior from the RRE's 101 point of view in [EN303648]. A URA 205 is an RA 270 that complies with the RRE framework defined in the present disclosure and/or a suitable standard/specification such as ETSI EN 303 681-3 V1.1.2 (2020 March) ("[EN303681-3]") and/or the like. In order to run multiple URAs 205, the RRE 101 includes a Communication Services Layer (CSL) 110 and one or more radio computers 120, each of which includes a Radio Control Framework (RCF) (see e.g., radio platform 210 of FIG. 2) and Radio Platform (see e.g., radio platform 220 of FIG. 2).

The CSL 110 is a layer related to communication services supporting generic applications. The CSL 110 supports generic applications like Internet access, enterprise network access, and/or the like. The CSL 110 introduces functionalities for the (de-)installation, selection and configuration of software components and the management of the data flows (see e.g., [EN303648]). The CSL 110 includes Administrator entity (admin) 111, Mobility Policy Manager entity (MPM) 112, a networking stack entity (NetStack) 113, and a monitor entity 114.

The admin 111 may request installation or uninstallation of URAs 205, and create or delete instances of URAs 205. This includes provisioning information about the URAs 205, URA 205 statuses, and/or other like URA-related information. Additionally, the admin 111 includes two sub-entities: an Administrator Security Function (ASF) and an RRS Configuration Manager (RRS-CM). The ASF is sub-entity of the admin 111 on the device end-point responsible for ensuring confidentiality, integrity, and authenticity of assets such as the RE Configuration Policy, and RAP(s), and supporting the non-repudiation, remote attestation, and configuration enforcement strategies. This may include direct and indirect interactions related to security with the RadioApp Store 160 and other security related entities associated with the RadioApp Store 160. In addition to supporting operations related to asset protection, the ASF acts as a proxy to other security functions on the platform, as detailed in [TR103087]. The RRS-CM is sub-entity of the admin 111 in charge of long-term management as discussed in clause 11 of [TR103087]. In case that a snapshot function is required, the admin 111 may store relevant RAPs, their configuration parameters and information on the URA 205 installation and execution history. When required, the same steps can be executed by the admin 111 to fall back to a previous snapshot.

The MPM 112 includes functions for monitoring of the radio environments and RE capabilities, functions for requesting activation or deactivation of URA 205, and functions for providing information about URA 205 lists. The MPM 112 also makes selections among different RATs and discover peer communication equipment and arrangement of associations. Here, the "association" is a logical communication link to a RAN or a peer equipment. Some control signaling may be necessary to maintain the association, and no user data transfer may occur with only an association present, but a data flow may be established into an association for this purpose. Additionally, "peer equipment" refers to any communication counterpart of a RRE 101, which can be reached by establishing a logical communication link (e.g., an association) between the RRE 101 and peer equipment. In addition, the MPM 112 may request a computational/spectral load balancing among baseband processors and RF transceivers in one or more radio platforms (see e.g., FIG. 2) when the number of baseband processors and RF transceivers in radio platform exceeds one. The requirement for computational and/or spectral resources varies depending on the situation of each base station in the case of network application. For example, the required traffic of each base station can rapidly and unexpectedly vary due to natural disasters, sports games, accidents, etc. When the RRE 101 is shared with multiple stakeholders (e.g., multiple network operators share a single network infrastructure), the policy of using both computational and spectral resources may have to be controlled for a desired performance requirement at each operation.

The NetStack 113 includes functions for sending and receiving user data. The NetStack 113 translates radio computer identifiers (IDs) to corresponding target network addresses, and vice versa. The NetStack 113 also manages data flows for basic TX/RX operation. The requirement is described in clause 6.2.4 of [EN303641]. The monitor 114 includes functions to transfer information from URAs 205 to user or proper destination entities in the RE 101. In addition, in case that distributed computation is applied, the monitor 114 receives the computational/spectral resource usage status. In some implementations, a non-real time OS is used for execution of the admin 111, MPM 112, NetStack 113, and monitor 114 which are part of the CSL 110 as described previously.

A Radio Controller (RC) is a functional component of an RA 270 for transferring context information from corresponding RAs 270 to monitor. The RC in an RA 270 ensures the availability of context information (see e.g., clause 6.2.5 of [EN303641]). An RC, which may operate in computational resources in non-real-time, accesses RAs 270 which operates in radio computer in real time. The monitor 114, to which the context information is transferred using an RC, provides context information to the admin 111 and/or MPM 112 for application(s) to be performed using the context information, for example, terminal-centric configuration.

Figure 2:
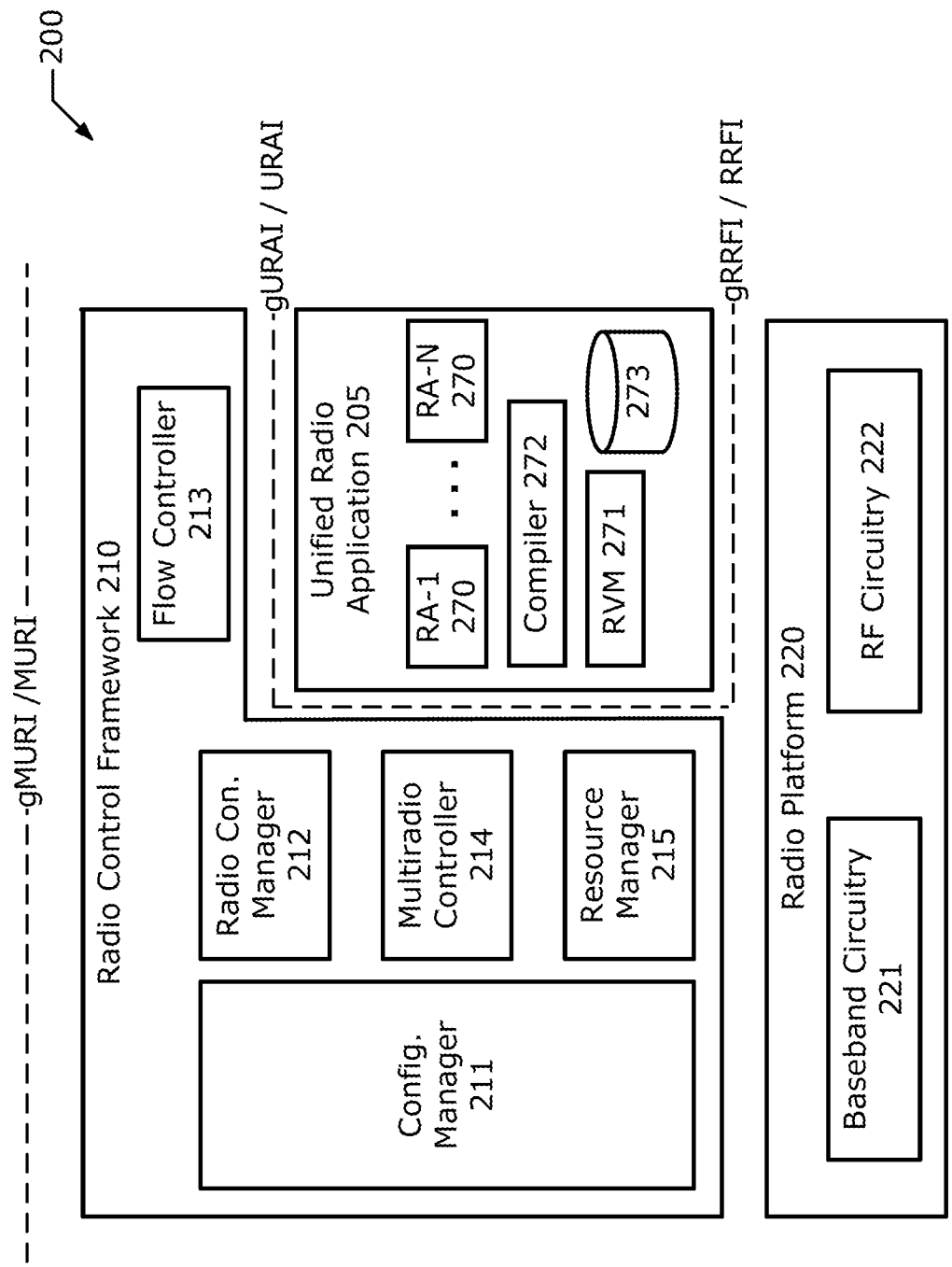
FIG. 2 illustrates an example radio computer architecture according to various embodiments.
Figure 4:
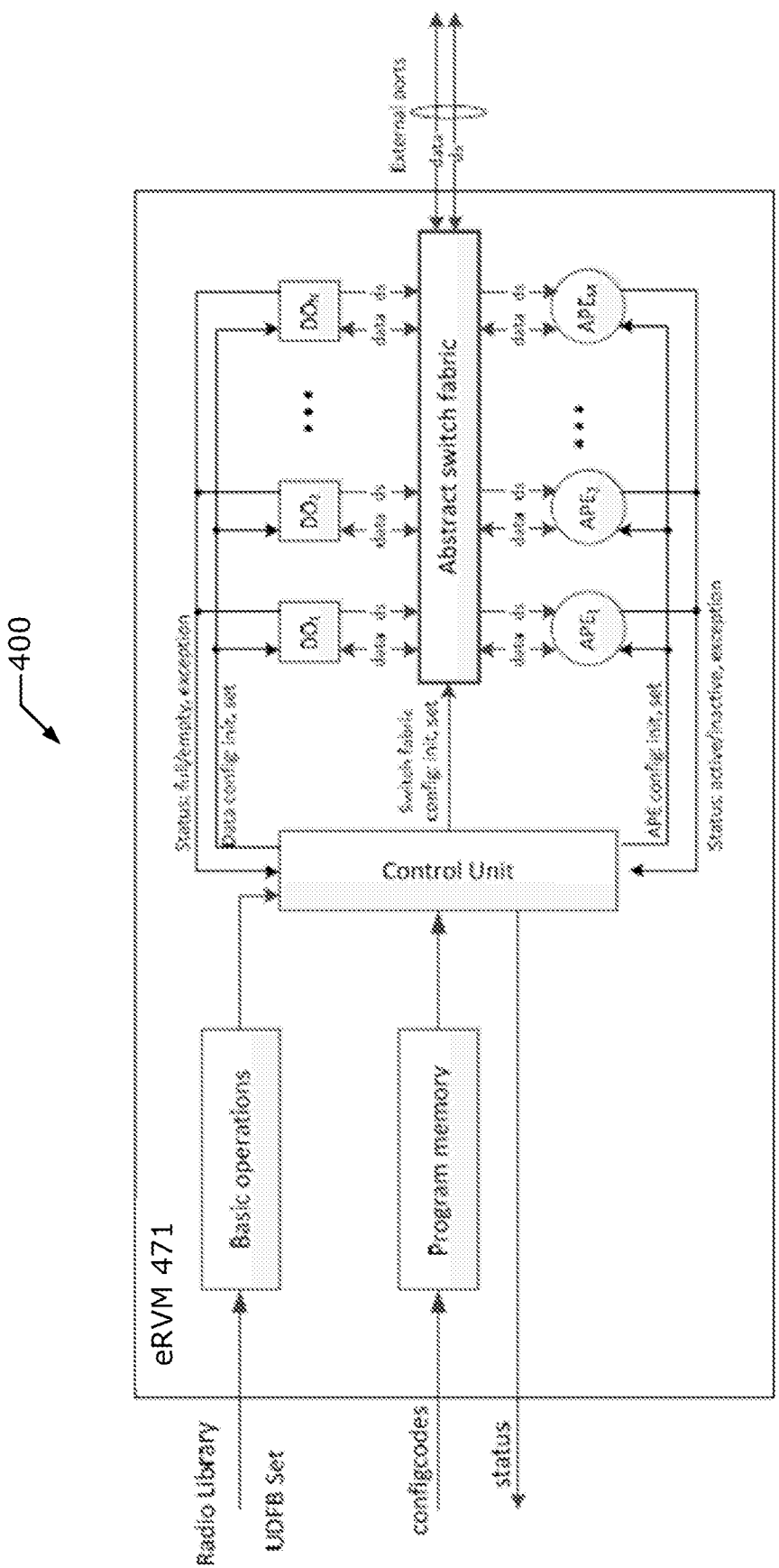
FIG. 4 shows an example architecture of an elementary RVM according to various embodiments.

A radio computer 120 is the part of the RE 101 hardware working under ROS control and on which RAs 270 are executed. The part of RE 101 hardware working under operating system (OS) control and on which Applications, among others, are executed are referred to as "Computational Resources". The operation of Computational Resources is performed by a given OS, which is performed on non-real-time basis, whereas radio computer(s)'s 120 operation is performed by another OS, which should support real-time operations of URA 205. The OS of radio computer (s) 120 is referred to as a Radio OS (ROS) and/or Real-time OS (RTOS) in the present disclosure and can belong to its own radio computer 120. An ROS or RTOS as used herein may refer to any appropriate OS empowered by RCF 210 and may provide RCF capabilities as well as traditional management capabilities related to management of RP such as resource management, file system support, unified access to hardware resources, etc. The radio computer(s) 120 include the following components: an ROS and/or RTOS and the five entities of the RCF 210, specified in clause 4.2.3 of [EN303648] and discussed infra with respect to FIG. 2, are classified into two groups. One group relates to real-time execution and the other group to non-real-time execution as shown by FIG. 4.3.1-1 of [EN303648]. The particular entities of the RCF interface related to real-time and non-real-time execution, can be determined by each vendor. The ROS/RTOS enables management of timing constraints and provides interface between URA 205 and the Radio Platform. The requirements are described in clauses 6.4.9 and 6.2.6 of [EN303641]. Other aspects of the radio computer(s) 120 are discussed in [EN303648].

The RRE 101 also includes four sets of interfaces or reference points for the interconnections among the elements of the RRE 101. These interfaces include the a Multiradio Interface (MURI) (see e.g., [EN303146-1]) and/or generalized MURI (gMURI) (see e.g., [EN303681-1]), which is/are interfaces between the CSL 110 and an RCF 210 of each radio computer 120.

The radio programming interface (RPI) (see e.g., [EN303146-4])/generalized RPI (gRPI) (see e.g., [EN303681-4]) is an interface/reference point allowing an independent and uniform production of RAs 270 (see e.g., [EN303681-4]). For example, a RadioApp provider 140 (e.g., an RA developer, etc.) may produce one or more RAs 270 and/or RAPs 150, which may be provided to the RadioApp store 160. One or more RAPs 150 may be provided to the RadioApp Store 160 via the RPI/gRPI, and the RE 101 may request and download RAPs 150 generated by the RadioApp provider 140 from the RadioApp Store 160 via a predetermined link. The other interfaces are discussed infra with respect to FIG. 2.

1.1. Radio Computer Architecture Aspects

FIG. 2 shows an example radio computer architecture 200 according to various embodiments. The radio computer architecture 200 may correspond to each of the radio computer(s) 120 of FIG. 1, the communication circuitry 3066 of FIG. 30, and/or the depicts communication components within mobile device 2932 of FIG. 31. The radio computer architecture 200 includes a Radio Control Framework (RCF) 210, a URA 205, and a radio platform 220

The RCF 210 is control framework which, as a part of the OS (e.g., ROS, RTOS, and/or platform/application OS), extends OS capabilities in terms of radio resource management. The RCF 210 provides a generic environment for the execution of URA 205, and a uniform way of accessing the functionality of the radio computer 200 and individual RAs 270. The RCF 210 provides services to CSL 110 via the MURI/gMURI. The RCF 210 manages the actual software execution through a number of functionalities discussed in [EN303648].

The RCF 210 is a control framework that includes Configuration Manager entity (CM) 211, Radio Connection Manager entity (RCM) 212, Flow Controller entity (FC) 213, and Multiradio Controller entity (MRC) 214. The RCF 210 may also include a Resource Manager entity (RM) 215, however in some implementations the RM 215 is part of an OS (e.g., ROS, RTOS, and/or platform/application OS). The CM 211 includes functions for installing/uninstalling and creating/deleting instances of URA 205 as well as management of and access to the radio parameters of the URA 205. The RCM 212 includes functions for activating/deactivating URA 205 according to user requests, and to management of user data flows, which can also be switched from one RA 270 to another. A "data flow" refers to a logical channel between the FC 213 and the URA 205 created by the FC 213 to send to or receive data elements (octets, packets or other granularity) from the URA 205. The FC 213 includes functions for sending and receiving user data packets and controlling the flow of signaling packets (e.g., data flows and the like). The MRC 214 include at least functions to schedule the requests for radio resources issued by concurrently executing URA 205, and to detect and manage the interoperability problems among the concurrently executed URA 205. In addition, for distributed computation cases, the MRC 214 includes a function to report spectral resource usage status. The RM 215 includes \functions to manage the computational resources, to share them among simultaneously active URA 205, and to guarantee their real-time execution. In addition, for distributed computation cases, RM 215 includes a function to report computational resource usage status. A distributed computation case is a computational model in which components located on networked computers communicate and coordinate their actions by passing messages interacting with each other in order to achieve a common goal.

The RCF 210 may represent functionalities provided by the radio computer 200, and may require all RAs 270 to be subject to a common reconfiguration, multiradio execution and resource sharing strategy framework depending on the concerned Radio Equipment Reconfiguration Class (RERC). Since all RAs 270 exhibit a common behavior from the RRE perspective, those RAs 270 are called URAs 205. The services relate to activation and deactivation, peer equipment discovery and maintenance of communication over user data flows are provided at a Unified Radio Application Interface (URAI) (see e.g., [EN303146-3]) and/or generalized URAI (gURAI) (see e.g., [EN303681-3]), which is an interface between the URA 205 and the RCF 210. The URA 205 represents the software downloaded and installed onto the target platform as in discussed in [EN303648]. A URA 205 includes one or more RAs, and a plurality of RAs 270 270 may be referred to as URA 205 when the RAs 270 exhibit common attributes, characteristics, or requirements related to the reconfiguration of the MD. As used herein, "URA" may be used interchangeably with "RA". An "RA" may also be referred to as "RA component(s)", "RRS component(s)", and the like.

The services provided by the URA 205 may be related to activation and deactivation, peer equipment discovery, and/or maintenance of communication over user data flows, which may be provided at the URAI/gURAI interface between the URA 205 and the RCF 210. In some cases, these services may be provided to the CSL 110 via the MURI/gMURI between the RCF 210 and the CSL 110.

Figure 29:
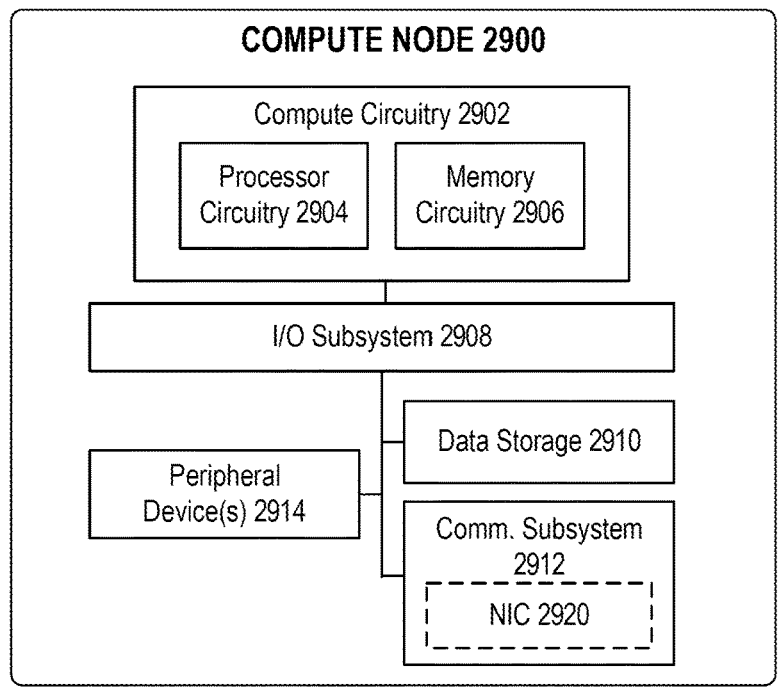
FIGS. 29 and 30 depict example components of various compute nodes in edge computing system(s).

The RAs 270 (including RA-1 270 to RA-N 270, where N is a number) are applications that, when executed by one or more processors (e.g., baseband circuitry 221 or the processor circuitry discussed infra with respect to FIGS. 29 and/or 30) may control generation and transmission of transmit (Tx) RF signals, control receipt of receive (Rx) RF signals, and the decode the Rx RF signals. The RAs 270 may be executed/operated in an RVM 271 that is part of the radio platform 220.

The RVM 271 is a controlled execution environment that allows RAs 270 to access low-level radio parameters. The RVM 271 may be an abstract machine independent of the hardware, which is capable of executing configcodes. In some implementations, the RVM 271 may be an abstract machine that can be configured by configcodes into an RA. The implementation of the RVM 271 is radio computer-specific and may include a compiler 272 (e.g., a front-end compiler or back-end compiler), which may provide Just-in-Time (JIT) or Ahead-of-Time (AOT) compilation of configcodes into executable codes.

The RAs 270 may have different forms of representation including, for example, source codes (also referred to as "RA codes"), intermediate representations (IRs), and executable codes for a particular radio platform. The RAs 270 may comprise RA codes including of User Defined Functional Blocks (UDFBs), Standard Functional Blocks (SFBs), radio controller (RC) codes, and/or executable codes depending on RA 270 design choice and/or executable codes for a particular radio platform. The RAs 270 may comprise RA codes including Functional Blocks (FBs), radio controller (RC) codes, and/or executable codes depending on the RA 270 design choice.

An FB is a function needed for real-time implementation of RA(s) 270. An FB includes not only the modem functions in L1, L2, and L3 but also all the control functions that should be processed in real-time for implementing given RA(s) 270. FBs are categorized into SFBs and UDFBs. SFBs can be shared by many RAs 270. Examples of SFBs include Forward Error Correction (FEC), Fast Fourier Transform (FFT)/Inverse Fast Fourier Transform (IFFT), (de)interleaver, Turbo coding, Viterbi coding, Multiple Input Multiple Output (MIMO), Beamforming, and other like category of SFBs. UDFBs include FBs that are dependent upon a specific RA 270. UDFBs are used to support special function(s) required in a specific RA 270 and/or to support a special algorithm used for performance improvement. In addition, a UDFB can be used as a baseband controller functional block, which controls the functional blocks operating in baseband processor in real-time and to control some context information processed in real-time.

In some implementations, an RA 270 may be expressed as a set of interconnecting SFBs together with one or more UDFBs. In some implementations, a Radio Library 273 may include some or all of the SFBs, and the SFBs to be provided from the Radio Library 273 may be represented in a platform-independent normative language. The native implementation of the Radio Library 273 may be provided as platform-specific codes of the SFBs for the radio platform 220. The Radio Library 273 may be located in the radio computer circuitry 120, and in some implementations, the Radio Library 273 may be a part of the RVM 271. The RC codes may be used to send context information to the monitor 114 and send/receive data to/from the net stack 113. The RC codes may be executed in a non-real-time environment (e.g., application/host circuitry of the UE/RE 101), and the remaining portion of the RAs 270 may be executed in the real-time environment (e.g., the radio platform 220).

SFBs are implemented through a Radio Hardware Abstraction Layer (RHAL) when the SFB is implemented on dedicated HW accelerators. SFBs are classified into two groups, those requiring dedicated hardware accelerators and those not requiring dedicated hardware accelerators. In case that a hardware accelerator is used, it is accessed through the RHAL. In the other case, platform specific code is provided for the concerned SFB by the Radio Library 273. When executable code is provided, the SFBs and UDFBs needed to perform a given URA 205 are already bound in the executable configcodes of URA 205. When source code(s) or IR is/are provided, the UDFBs needed to perform a given URA 205 are included in the configcodes of the URA 205 and are compiled for Source Code (by the Compiler) or IR (by the Back End Compiler), respectively (see e.g., [EN303648]).

The RHAL is part of the ROS. The RHAL abstracts the radio platform 220 and supports SFBs to be implemented using one or more hardware accelerators (e.g., FPGAs, CPLDs, programmable ASICs, programmable SoCs, etc.) in order for each of those SFBs to be implemented directly on corresponding hardware accelerator(s). In some implementations, the RHAL is platform specific and is not standardized.

Compiling the source codes of an RA 270 may yield configcodes. When an RA 270 provider develops high level code based on a target platform (e.g., radio platform 220), a result of compiling the RA 270 source codes or URA 205 codes is configcodes that is executable on the target platform (e.g., radio platform 220). In addition, the RE 101 may support different types of RA 270 source codes or URA 205 codes wherein some RAs 270 and/or URA 205 may run directly on the ROS as executable codes while others may run as an RVM 271 configured by configcodes. When the RA 270 provider develops high level code without considering a target platform, a result of front-end compiling of RA 270 source codes is an IR, which may be back-end compiled for operating on a specific target platform. In this case, the configcodes may be configuration codes of an RVM 271 instance. Back-end compilation may occur within the radio computer circuitry 200 or by a cloud computing service.

In some implementations, the RE 101 may include a shadow radio platform, or may interact with a cloud based shadow radio platform. The shadow radio platform is a platform where configcodes can be directly executed when it corresponds to the target radio platform or, when it corresponds to an RVM 271, compiled and executed. If the shadow radio platform corresponds to the target radio platform, then a front-end compiler will generate the executable code for the target radio platform and configcodes are equivalent to the executable code for that radio platform.

According to various embodiments, an RA 270 provider may generate an RAP 150, which may be a delivery unit of an RA 270 from the RadioApp Store 160 to the RE 101. As used herein, the term "RAP" may be used interchangeably with RA 270 and may be referred to as RAP 150. A RAP 150 may include RA 270 codes of an RA 270 and configuration metadata for the RE 101. The metadata may include RPI/gRPI information, which is a descriptive interface detailing how the RA 270 is structured and how its sub-components are synchronized together; bindings to the hardware abstraction layer (HAL), when applicable; bindings to linkable libraries, when applicable; and a pipeline configuration. RAPs 150 may be provided to the RadioApp Store 160 via the RPI/gRPI, and the RE 101 may request and download RAPs 150 generated by an RA 270 provider from the RadioApp Store 160 via a predetermined link. According to various embodiments, the configuration metadata may include a DoC that is associated with the RE 101 and also indicates installation parameters of the RA 270 component included in the RAP 150. In other embodiments, the DoC may be separate from the RAP 150, but provided to the RE 101 in a same digital signature as the RAP 150. In other embodiments, the DoC may be access from a remote resource.

In some implementations, the RE 101 may compile a RAP 150 to generate executable code for the radio platform 220. In such implementations, URA 205 configcodes may be downloaded to the radio computer circuitry 200 in the form of source code or IR, and may be transformed into corresponding executable code through the compiler 272. Where URA 205 configcodes are source codes or IR, the source codes or IR may be compiled at a RE 101 or compiled by a cloud computing service. When the compilation process is performed by a cloud computing service (not within the radio computer), the URA 205 configcodes may be downloaded into the radio computer circuitry 200 in the form of executable code as a result of the compilation at the cloud (not shown). In this case, the compiler 272 and radio library 273 may not be included in the RE 101, and instead, the vendor of the radio platform 220 may provide the compiler 272 and the radio library 273 at the cloud in accordance with the radio platform 220.

The radio platform 220 is the part of RE 101 hardware that relates to radio processing capability, including programmable hardware components, hardware accelerators, RF transceiver, and antenna(s). The radio platform 220 comprises hardware capable of generating RF signals or receiving RF signals, including baseband and RF processing. By nature, it is heterogeneous hardware including different processing elements such as fixed accelerators (e.g., ASICs, or reconfigurable accelerators such as FPGAs, programmable SoCs, etc.). In case of multiple radio computers 200, there is an independent radio platform 220 for each of the radio computers 200.

The radio platform 220 comprises baseband circuitry 221 and radiofrequency (RF) circuitry 222 (or RF transceiver 222). The baseband circuitry 222 may be processor circuitry that may implement one or more layer operations that are "below" layer operations of a network protocol stack 113. These operations may include, for example, PHY operations, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The RF transceiver 222 is the part of radio platform 220 that converts baseband signals from the baseband circuitry 222 into radio signals for transmission, and converts received radio signals into baseband signals for processing by the baseband circuitry 222. The RF transceiver 222 manages input/output signals from/to one or several RAs 270. Several RAs 270 that are simultaneously in active state may be served by one or multiple RF transceivers 222. The Reconfigurable Radio Frequency Interface (RRFI) (see e.g., [EN303146-2]) and/or generalized RRFI (gRRFI) (see e.g., [EN303681-2]) is an interface between URA 205 and RF Transceiver(s) 222. This interface enables the exchange of control and data information between the RAs 270 and the RF transceiver 222.

Figure 31:
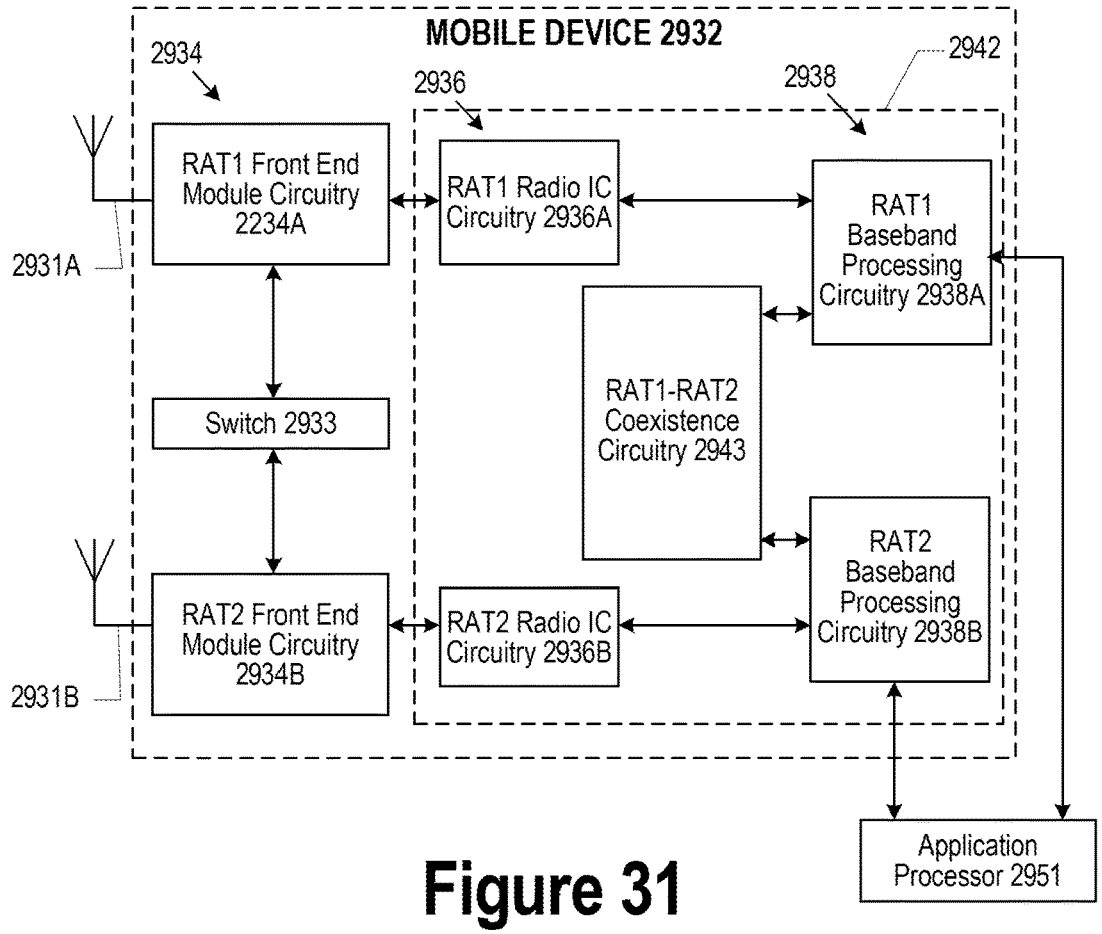
FIG. 31 depicts an example mobile computing device in an edge computing system.

The baseband processor(s) 221 may be the same or similar to the baseband processing circuitry 2938 of FIG. 31 and RF Transceiver(s) 222 may be the same or similar to the radio front-end module (FEM) circuitry 2934 and/or radio IC circuitry 2936 of FIG. 31. In some implementations, the baseband circuitry 221 and/or RF circuitry 222 may include hardware elements such as digital signal processors (DSPs), Application Specific Integrated Circuit (ASICs), a field-programmable gate array (FPGAs), radio-frequency integrated circuits (RFICs), and/or other hardware element.

Referring back to both FIGS. 1 and 2, the CSL 110 communicates with one or multiple Radio Computers through the MURI/gMURI interface(s) as defined in [EN303146-1] and [EN303681-1]. There are a number of MURI/gMURI services and service primitives defined which are feed to/from the RCF 210 within the target Radio Computer 200. The RAP 150 is containing a URA 205, which is controlled by the RCF 210 and executed on any type of hardware components (e.g., FPGAs, DSPs, ASICs, CPUs, etc.).

1.2. Radio Virtual Machine Aspects

As introduced in [EN303095], the RVM 271 is an Abstract Machine which is capable of executing configcodes. The RVM 271 executes a particular algorithm presented as a data flow chart. In other words, the RVM 271 is the result of replacing all operators and tokens in a particular data flow chart with Abstract Processing Elements (APEs) and Data Objects (DOs), respectively. Each APE executes computations marked by the replaced operator identifier. These computations are taken from a Radio Library 273, which is also included in an RVM 271.

Figure 3:
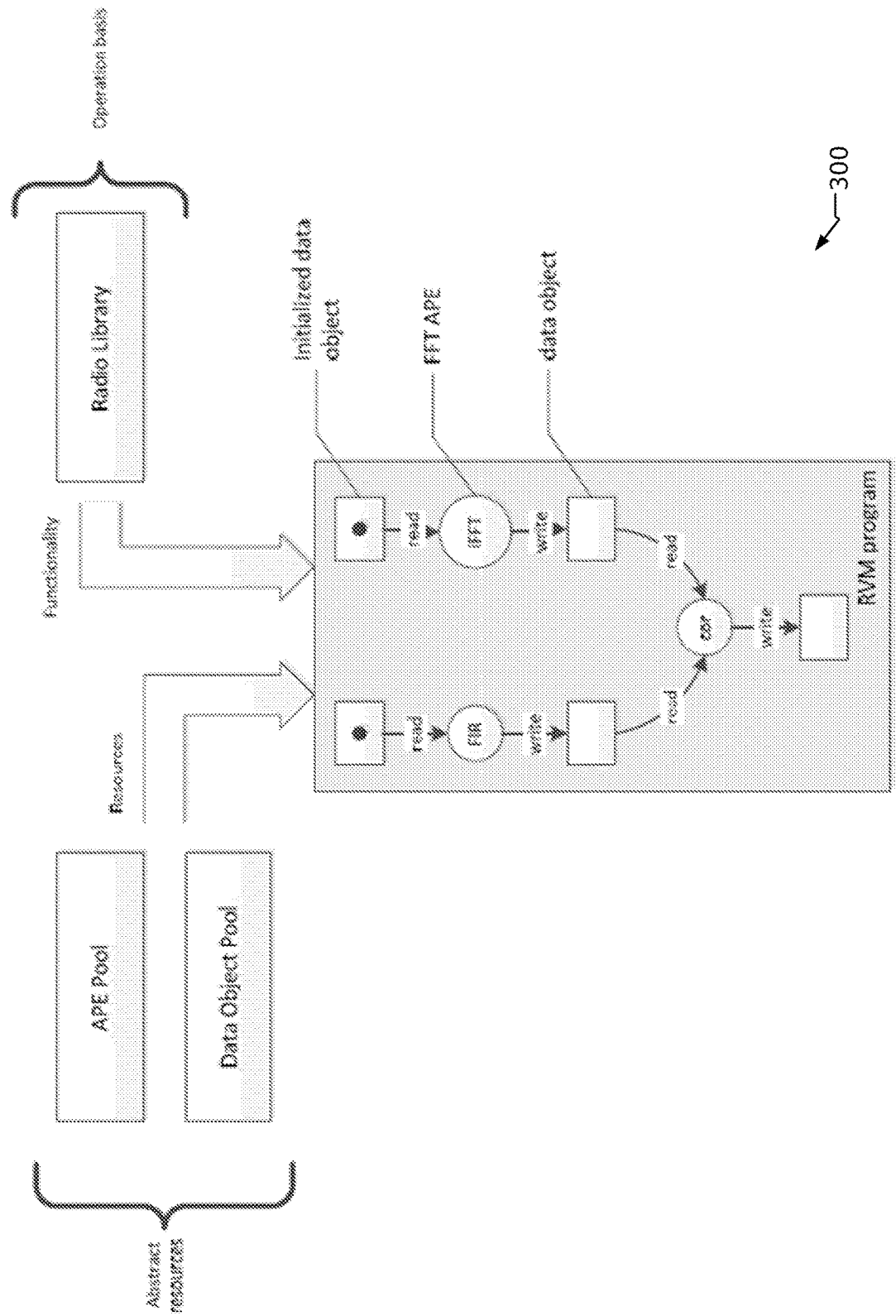
FIG. 3 illustrates a conceptual view of a radio virtual machine (RVM) processing according to various embodiments.

FIG. 3 illustrates a conceptual view of RVM processing according to various embodiments. The implementation of a RVM 271 is target Radio Computer 120 specific. The RVM 271 has access to a Back-end Compiler (e.g., on the platform itself or externally as described in [EN303095], clause 4.4.1) for JIT or AOT compilation of configcodes. The RVM process includes one or more APEs in an APE Pool, one or more DOs in a DO Pool, and a Radio Library 273. The RVM 271 is independent of the underlying hardware.

Each APE abstracts a computational resource corresponding to an operation in a particular data flow chart. Each APE abstracts computational resource(s) that executes any computations downloaded from the Radio Library 273. A "computational resource" may refer to part of RE hardware working under OS control and on which applications (e.g., RA(s) 270), among others, are executed. Each APE is connected with one or more input DOs and one or more output DOs. APEs are reactive. Any computations are started if all input DOs are filled with real data.

In this context, a "data flow chart" is a reactive data flow computational model including data and operators where data are connected with operators. A "data flow" may be a logical channel between a Flow Controller (FC) 213 and an Unified Radio Applications (URAs) 205 created by the FC 213 to send to or receive data elements (e.g., octets, packets, PDUs, and/or other granularity) from URA. The operators in a data flow chart are abstract computations that are triggered by full data (e.g., when a DO is in a "full state"). Results of operator computations are written in connected output data if they are empty.

DOs are typeless tokens that abstract any type of data. Each DO abstracts a memory resource. In other words, a DO is an abstracted memory for storing data used during the procedure of Radio processing. Each DO provides a container for storing data. A DO can be empty if there is no data in the container or it can be full if there is data in the container. Each DO acknowledges connected APEs about its status whether it empty or full. One or more APEs from the RVM 271 can be connected with a DO. In the applied model, memory is considered be flat and infinite, and each DO is allocated in the infinite and flat memory. Any RVM 271 has access to this memory.

The Radio Library 273 includes normative definitions/native implementation of all SFBs [EN303095] for front-end/back-end compilation. The Radio Library 273 may be a native radio library and/or a reference radio library. The native radio library provides platform-specific description of each SFB that represents the target platform hardware. The reference radio library provides normative definition of each SFB. There may be multiple such Reference Radio Libraries. For a given RA 270, a unique Reference Radio Library 273 is used. The computations included in the Radio Library 273 are represented in terms of normative definitions or native implementations of SFBs depending upon whether the Radio Library is used for front-end or back-end compilation, respectively.

In some implementations, UDFBs may be created through a combination of SFBs and represented as a data flow chart to be executed in the RVM 271. Alternatively, a UDFB is implemented as a stand-alone module/function that can be mapped into one APE (e.g., the UDFB can be considered atomic); or into an eRVM 471 and/or RVM 271 (e.g., not atomic). In general, UDFBs are not included into the Radio Library 273, but they are part of a RAP.

The RVM 271 begins to work immediately after some DOs initialization. Usually, all APEs execute computations asynchronously and concurrently. According to various embodiments, one or more APEs execute computations synchronously according to a clock signal provided by a sync source as discussed above. An individual APE executes the allocated operator if all the corresponding input DOs are full. APEs access DOs with operations "read", "read-erase", or "write". After reading input data from the DOs, the APE executes the allocated operator and, if output DOs are empty, then the APE writes processed data. Any full output DO blocks the corresponding write operation. An output DO can become an input DO for a subsequent operator, this input DO can activate a subsequent operator.

The RVM 271 executes computations until reaching the state when all APEs become inactive. In this state, there are not enough full DOs, which can activate the inactive operators. The result of computations are full DOs, which cannot activate the inactive operators. The state or operation of a given APE is independent on the state of other APEs (e.g., each APE is atomic).

Additionally, the RVM 271 enables an RA 270 to choose one among multiple available RVM protection classes for code to be executed on the RVM 271 as well as a protection class for the RF front-end. RVM protection classes are introduced in order to find a trade-off between (re-) certification effort and baseband code development flexibility. A high-level RVM class corresponds to full reconfigurability of the low-level parameters of an RVM 271, and accordingly necessitates a relatively more extensive certification testing process after the RVM 271 has been reconfigured. A low-level RVM class corresponds to a limited reconfigurability of the low-level parameters of an RVM 271. One or more medium- or intermediate-level RVM classes may also be established between the two extreme RVM classes that correspond to intermediate levels of reconfigurability of the low-level parameters of an RVM 271. An intermediate-level RVM class, for example, would allow more flexibility for reconfiguring low-level parameters of an RVM 271 than the lowest-level RVM 271 class, but would not permit the degree of reconfigurability that would be associated with the highest-level RVM class. Details about RVM protection classes are discussed in ETSI TS 103 641 V1.1.1 (2019 March) ("[TS103641]"). Depending on the combination of chosen RF & RVM protection classes, the required re-certification process of the software reconfigurable radio platform will be more or less complex. An RE architecture may include an RF Transceiver chain, Analog-to-Digital converters, Digital-to-Analog converters, Baseband Processor(s), and the like (see e.g., FIG. 2). The RVM 273 controls RF Transceiver chain, in particular for selection of an RF Protection Class. In some embodiments, the RVM 271 may be, or may include, and elementary RVM (eRVM) 471.

FIG. 4 shows an example architecture 400 of an eRVM 471 according to various embodiments. The eRVM 471 includes Basic Operations, Program memory, Control Unit (CU), Abstract Switch Fabric (ASF) as well as APEs and DOs.

The Basic Operations in eRVM 471 include operations provided by the Radio Library 273 and/or a UDFB Set. Three cases can be considered: i) where a RAP includes only SFBs; ii) where a RAP includes only UDFBs; iii) where a RAP includes SFBs and UDFBs. Additionally or alternatively, the Basic Operations may include: i) SFBs only; ii) UDFBs only; or iii) SFBs and UDFBs.

The Basic Operations include operators either provided from the Radio Library 273 as SFBs and/or from a UDFB set as UDFBs, each of which is mapped onto one single APE. Since UDFBs might be implemented as a stand-alone module/function which can be mapped into one APE. In this case, the Basic Operations include operators provided by the UDFB Set as well as by the Radio Library 273 as SFBs. Note that those UDFBs are atomic. For an RVM 271, the SFB or UDFB can be mapped onto an APE, RVM 271, or eRVM 471. In the eRVM 471 case, the mapping to RVM 271 or eRVM 471 is not possible since it is the lowest level of hierarchy (see e.g., clause 6.3 of [EN303146-4] and/or clause 6.3 of [EN303681-4]). Note that from an execution perspective, there is no difference between SFBs and UDFBs. The target platform may or may not provide accelerators for some/all SFBs and/or UDFBs.

The program memory is provided with Configcodes which determine the eRVM 471 configuration. The CU generates Initialization and Set-up instructions for APEs, DOs, and the ASF based on decoding Configcodes stored in the Program memory. The ASF connects APEs and DOs in accordance with CU signals. One DO can be connected with multiple APEs, and/or one APE can be connected with multiple DOs. Additionally, one or more DOs from other eRVMs 471 can be connected with the ASF through external data ports.

Each DO is represented by a unique number including DO1, DO2, . . . , DON, where N is a number. Each DO is configured by a config instruction that includes an init field that initializes DO according to the specific initialization procedure (depending on implementation); and a set field with an instruction which sets up the DO attributes such as DO_ID, access time, size, etc. (as shown in clause 6.2 of [EN303146-4] and/or clause 6.2 of [EN303681-4]). The DOs communicate with APEs through an ASF interface that includes a data status (ds) signal to indicate whether the DO is full or empty; and data lines directed to or from DO to read or write data to or from APEs. The status interface provides the status information of DO to CU and includes a full/empty describes whether DO is full of data or empty; and exception describes the reason of fail when an APE operates with the DO.

Each APE is represented by a unique number including APE1, APE2, . . . , APEM, where M is a number. APEs are configured by a config instruction which includes an init field that brings the op code operation from Basic Operations; and a set field that sets up APE attributes such as the number of ports, port types, the execution cost and time. An APE's ports connect the APE to the ASF and includes a data interface including a ds signal to indicate whether the DO is full or empty; and one or more data lines to read or write data through the ASF. A status interface provides status information of the APE to the CU and includes an active/inactive interface that describes state of the APE, such as active and inactive; and an exception interface that describes the reason of fail when an APE's operation has an error. An APE is active when it has consumed input DOs and processes them. The APE transitions to the inactive state with a corresponding indication to the CU immediately after processing all the data associated to/with the APE.

Figure 6:
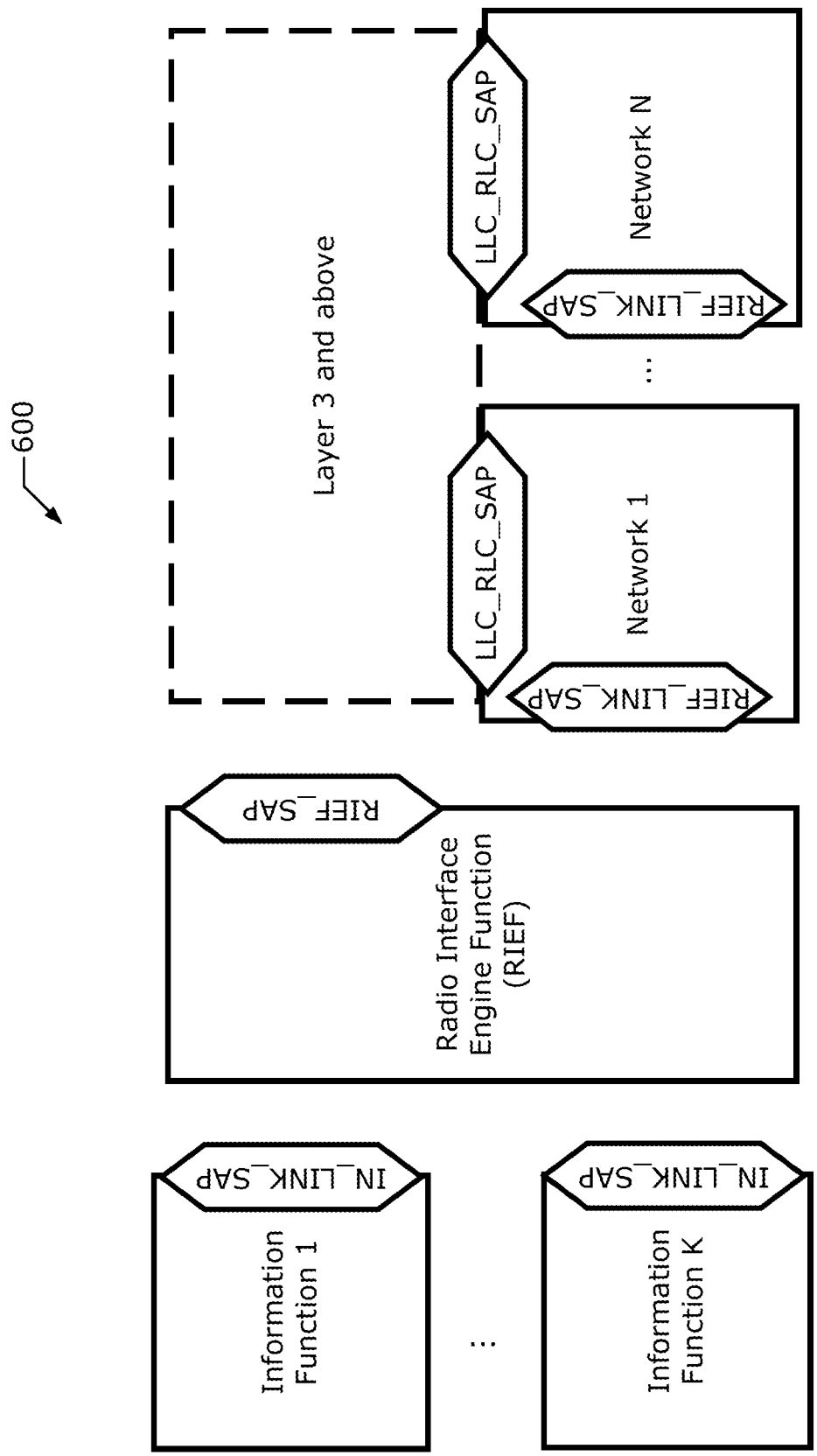
FIG. 6 illustrates an example RIE system architecture according to a first embodiment.

The ASF connects APEs and DOs (e.g., as shown by FIG. 6.5 in [EN303146-4] and/or [EN303681-4]). One DO can be connected to multiple APEs, and/or one APE can be connected to multiple DOs. The ASF connects DOs and APEs through ports which include one or more data ports (internal) connect the ASF to DOs via interface lines; data ports (external) that connect the ASF to DOs from other eRVM 471 and/or RVMs 271; and processing ports connect the ASF to APEs via one or more respective interface lines. Each connector of the ASF connects ports bounded to a DO with ports bounded to an APE. Each connector has the same interface lines as ports do (e.g., ds, data, etc.). Connectors convey interface values between ports when they appear in corresponding ports. The CU configures the ASF using the following commands: init, which associates data ports with DOs and processing ports with APEs; and set, which creates connections between data ports and processing ports. Other aspects of the RVM 271 and eRVM 471 are discussed in more detail in [EN303146-4] and/or [EN303681-4].

The RVM 271 as illustrated in FIGS. 3 and 4 is/are used to represent an algorithm in a concurrent manner. The description of an algorithm is typically independent on implementation choices, including a synchronous or asynchronous implementation approach. In some implementations, a compiler processes the algorithm description such that the desired implementation approach is applied. In practice, however, it can be preferred by a designer to facilitate the tasks of a compiler and describe the algorithm closer to an hardware implementation level, including provisions for a synchronous or asynchronous implementation approach. This is a common approach in hardware design programming languages such as Very High Speed Integrated Circuit Hardware Description Language (VHDL). Other hardware description languages and/or other programming languages may be used to develop the RVM 271. Also, some critical applications that require deterministic behavior(s) may need to be implemented using a synchronous approach. Embodiments for synchronous operation of the RVM 271 is discussed infra with respect to FIGS. 15-18.

2. Reconfigurable Radio System Radio Interface Engine Embodiments

ETSI is currently in the process of developing a Radio Interface Engine (RIE), which provides generalized functionalities including for example localization functions, cognitive functions related to the selection of RATs, and the like. The present disclosure presents a system architecture solution for RIE for Reconfigurable Radio Systems (RRS).

In the past, proprietary solutions were applied in order to provide cognitive context information to a communication component, including localization information, cognitive context information, etc. Since the existing solutions are proprietary, implementation of such solutions had to be produced from scratch when a new system is being designed. If different external components are integrated, typically new interfaces are being introduced and existing solutions need to be redesigned.

ETSI decided to develop an RIE, offering standardized interfaces for the provision of cognitive context information. The present disclosure provides various system architectures for an RIE. With the new architecture of the embodiments discussed herein, cognitive context information is provided to communications components in a well-defined and access layer (radio access technology (RAT)) independent manner as opposed to using proprietary solutions RAT-specific solutions. The embodiments herein allow context information and apriori information to be fed from any source in an integrated way to various edge compute nodes and artificial intelligence (AI)/machine learning (ML) functions implemented by the edge compute nodes.

Figure 5:
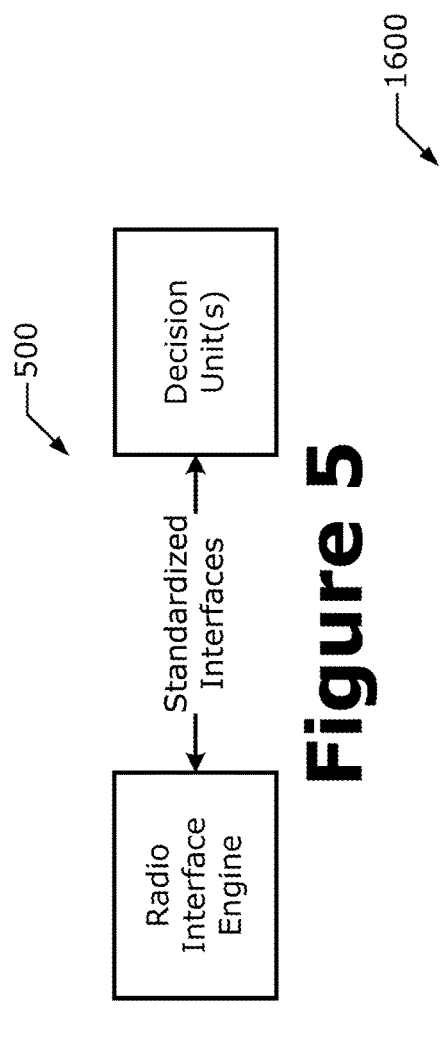
FIG. 5 illustrates an example RIE providing standardized interfaces according to various embodiment.

FIG. 5 shows an example RIE 500 providing standardized interfaces according to various embodiments. In FIG. 5, one or more decision units can interact with the RIE over the standardized interfaces. As examples, each of the decision units may include one or more Radio Communication Components and/or may include one or more AI/ML functions (e.g., ML model training functions, ML models, etc.). The RIE empowers the decision unit(s) to operate in a heterogeneous environment. The decision unit(s) can be either located at the mobile device, in the network, or in one or more edge compute nodes. As examples, the decision unit(s) may be any Radio Communication Component (e.g., LTE, 5G, WiFi, Bluetooth, and/or other like HW/SW components), some other component within a mobile device, network access nodes (e.g., NANs 2331-2333 of FIG. 23), one or more network functions in a core network, one or more application servers, one or more edge servers, and/or the like. In embodiments where the decision units are AI/ML functions, the decision units may include AI/ML models that have the ability to learn useful information from input data (e.g., context information, etc.) according to supervised learning, unsupervised learning, reinforcement learning (RL), and/or neural network(s) (NN). Separately trained AI/ML models can also be chained together in a AI/ML pipeline during inference or prediction generation.

The decision units rely on an eco-system that comprises multiple entities such as a context information acquisition entity, context management entity, configuration management entity, flexible modulation entity and others. The RIE enables the efficient acquisition and management of context information and suitable equipment configuration in a heterogeneous radio environment.

The RIE provides a defined mechanism to interchange relevant context information to one or more decision units. The RIE provides a standard interface access to model based data that could represent historical data or relies on typical alternatively characterized scenarios. A model based data set is a statistical distribution describing a data set including, for example, prior measurements (e.g., by the mean and the variance (e.g., Gaussian distribution $N(\mu, \sigma^2)$ with the mean $\mu$ and variance $\sigma^2$). The predictive decision making relies on context information which serves as input to the RIE. The reliability of the data is improved by the RIE through iterative processing including a combination of multiple sources, KPIs, and apriori knowledge based decision making. In these ways, the decision unit(s) (e.g., radio communication components and/or other components) are able to access cognitive context information in a well-defined manner, accessing such information through standardized interfaces as illustrated by FIG. 5.

The RIE provides access to cognitive context information (sometimes referred to as "radio context information, or simply referred to as "context information"). Context information is any information that is used to describe: the characteristics of the radio signal at given circumstances such as time, frequency, location, and orientation by a measuring device; what impacts the characteristics of the radio signal by the measuring device at a given time, frequency, location, and orientation; and/or the circumstances themselves, such as time frequency, location and orientation. Examples of the context information include radio context information and localization context information. Examples of the radio context information include received signal strength of a radio signal, awareness of a type of weather event that hinders the radio signal reception under the certain circumstances, and/or the like. Examples of the localization context information includes current and predictive location/position data, geolocation, proximity to other devices, and/or the like. Additionally or alternatively, the context information may be, or may include, environmental information. Here, "environmental information" may refer to a set of values that can affect the execution of RAs 270 on a radio computer; Environmental Information includes information related to the execution of RA(s) 270, such as Buffer Overflow, Resource Allocation, etc.

In some embodiments, the cognitive context information may include AI/ML training information and/or AI/ML model inference information. The training information includes the data of the ML model including the input (training) data plus labels for supervised training, hyperparameters, parameters, probability distribution data, and other information needed to train a particular AI/ML model. The model inference information is any information or data needed as input for the AI/ML model for inference generation (or making predictions). The data used by an AI/ML model for training and inference may largely overlap, however, these types of information refer to different concepts. The input data is called training data and has a known label or result. Supervised learning is an ML task that aims to learn a mapping function from the input to the output, given a labeled data set. Examples of supervised learning include regression algorithms (e.g., Linear Regression, Logistic Regression), and the like), instance-based algorithms (e.g., k-Nearest Neighbor (KNN), and the like), Decision Tree Algorithms (e.g., Classification And Regression Tree (CART), Iterative Dichotomiser 3 (ID3), C4.5, chi-square automatic interaction detection (CHAID), etc.), Fuzzy Decision Tree (FDT), and the like), Support Vector Machines (SVM), Bayesian Algorithms (e.g., Bayes Network, Naive Bayes, and the like), and Ensemble Algorithms (e.g., Extreme Gradient Boosting, voting ensemble, bootstrap aggregating ("bagging"), Random Forest and the like). Supervised learning can be further grouped into Regression and Classification problems. Classification is about predicting a label whereas Regression is about predicting a quantity. For unsupervised learning, Input data is not labeled and does not have a known result. Unsupervised learning is an ML task that aims to learn a function to describe a hidden structure from unlabeled data. Some examples of unsupervised learning are K-means clustering and principal component analysis (PCA). NNs are usually used for supervised learning, but can be used for unsupervised learning as well. Examples of NNs include deep NN (DNN), Convolutional NN (CNN), convolution NN (CNN), deep CNN (DCN), deconvolutional NN (DNN), a deep belief NN, a perception NN, and recurrent NN (RNN), Reinforcement learning (RL) is a goal-oriented learning based on interaction with environment. In RL, an agent aims to optimize a long-term objective by interacting with the environment based on a trial and error process. Examples of RL algorithms include Q-learning, multi-armed bandit learning, and deep RL. The RIE may feed a kind of compute and AI/ML functionality in the edge of a communications network (e.g., decision units implemented by one or more edge compute nodes). In one example, the decision units are NNs (e.g., CNNs, RNNs, etc.) that extract spatial features and sequential features from time-varying signal strength indicators (e.g., RSSI, RSRP, RSRQ, etc.), which are used to make inferences/predictions to improve Radio Access Network (RAN) performance, network performance, or radio component performance.

The RIE supports a reconfiguration framework, and in particular, the RIE provides the following features in a unified manner: standardized acquisition of context information, depending on the available sensors and/or other components, such as location determination, characterization of radio links, interference environment, etc.; standardized distribution (and possibly aggregation) of context information provided by one (or multiple) sources; provides (processed) context information to one or more decision making entities; provides link reliability metric definition; provides procedure(s) to compute link reliability metrics and station/MD location using available information to the MD and base station; and in some implementations, HW accelerators for multiple link transmission solutions comprising different processing components.

As examples, the context information may be used to identify if one or more links and/or one or more RATs should be used for a particular application; determine user circumstances and/or triggers that adapt communication Key Performance Indicators (KPIs); performance measurement data; whether to download and install different PHY and/or MAC protocol layers for a particular communication component or wireless network; decide where a processing unit should be executed; adapt PHY and/or MAC layer parameters to improve location estimation (e.g., improve accuracy) of the mobile device; assess the integrity of the estimated localization performance; switch to a different (e.g., lower power consuming) communication component if the context information identifies relevant changes; preselect sensor, actuator, RF circuitry, etc., data that may no longer be relevant because it is outdated to improve the net-throughput.

In some embodiments, performance indicators (e.g., KPIs) are categorized in two groups: communications KPIs (e.g., data rate, latency, spectrum and/or power efficiency, and the like) and context information KPIs (e.g., waveform, positioning/location accuracy (see e.g., 3GPP TR 22.872 v16.1.0 (2018-09)), integrity of sensor data, used spectrum for ranging, outdated sensor data, and the like). The context information KPIs steer the potential of the RIE to improve and reach the communication performance requirements of the network. The KPIs may be correlated with one or more other KPIs, or the KPIs may be uncorrelated. In general, correlated KPIs are performance indicators having correlation with at least one other KPI (e.g., a high spectral efficiency results in a higher throughput of the system), and uncorrelated KPIs are performance indicators having no correlation with each other (e.g., the KPI delay of the transmission of a certain data package (latency) is uncorrelated with the KPI spectral efficiency of a dedicated waveform). In some cases, the different KPIs could be correlated by considering constraints (e.g., constraints could be a certain interference (e.g., SNR, SINR, etc.) that may require repeated transmissions that will lead to a higher delay).

After having gathered radio related metrics and parameters, the decision unit(s) (e.g., radio communication components, AI/ML functions, etc.) may process them to make decisions on reconfiguration in order to optimize radio performance. The identification of the radio related metrics and parameters which can be used for reconfiguration purposes may vary according the specific use case. Example use cases may include traffic variations, channel bandwidth, interference, transmit power, QoS, and the like.

2.1. Radio Interface Engine Embodiment 1

FIG. 6 shows an example Radio Interface engine (RIE) system architecture 600 according to a first embodiment. A general basic approach of an architecture reference model is proposed including the Radio Interface Engine Function (RIEF), Information Functions and the lower layers of the related communication systems, which are accessible to the RIEF. No Information Validation Function is introduced in this embodiment. The RIE is capable of interacting with Layer 1 (physical layer (PHY)) and Layer 2 (medium access control layer (MAC)) entities as well as logical link control (LLC) layers such as IEEE 802.2 LLC or 3GPP radio link control (RLC) entities.

In FIG. 6, Information Function components 1, . . . , K (where K is a number) gather cognitive context information of potential interest to a communication component. The context information may include, for example, localization information (e.g., GNSS information, LTE Location Service information, etc.), wireless context information (e.g., which RATs are present (e.g., LTE, WiFi, 5G, etc.), which Quality of Service (QoS) is provided by specific RATs (e.g. radio signal strength measurements (e.g., including RSSI, RSRP, RSRQ, and/or other like measurements such as those discussed herein), observed Packet Error Rate (PER), observed round-trip latencies, jitter measurements, etc.).

Each Information Function component is responsible for collection a certain type of context information. For example, Information Function component 1 may be responsible for collecting localization information, and Information Function component K may be responsible for collecting radio context information. In some implementations, different Information Function components can be used to generate/collect context information for a specific network, and/or a specific access technology. For example, a first Information Function component may be responsible for collecting localization context information from positioning circuitry of the RE 101, and a second Information Function component may be responsible for collecting localization context information from cellular communication (modem) circuitry of the RE 101. In another example, a first Information Function component may be responsible for collecting radio context information from WiFi communication circuitry of the RE 101, a second Information Function component may be responsible for collecting radio context information from cellular communication (modem) circuitry of the RE 101, and a third Information Function component may be responsible for collecting radio context information from short-range communication circuitry of the RE 101. In these examples, the communication (modem) circuitry of the RE 101 may correspond to respective radio computers 120 in FIGS. 1 and 2.

The Radio Interface Engine Function (RIEF) component interacts with the Information Function components through the IN_LNK_SAP Service Access Point (SAP). The RIEF requests information (e.g., pull mode) from a specific Information Function component and then obtains the result from the specific Information Function component. Alternatively, the information may be provided by the respective Information Function components without a specific request (e.g., push mode), for example, when a specific event is happening or taking place (e.g., observed QoS metrics such as RSS/PER/latency is changing, etc.). The RIEF processes the information received from Information Function components (e.g., reformatting the information to fit a standardized format, and the like) and provides it to higher layers (e.g., Layer 3 and above) of communication components through the RIEF_SAP Service Access Point.

Figure 7:
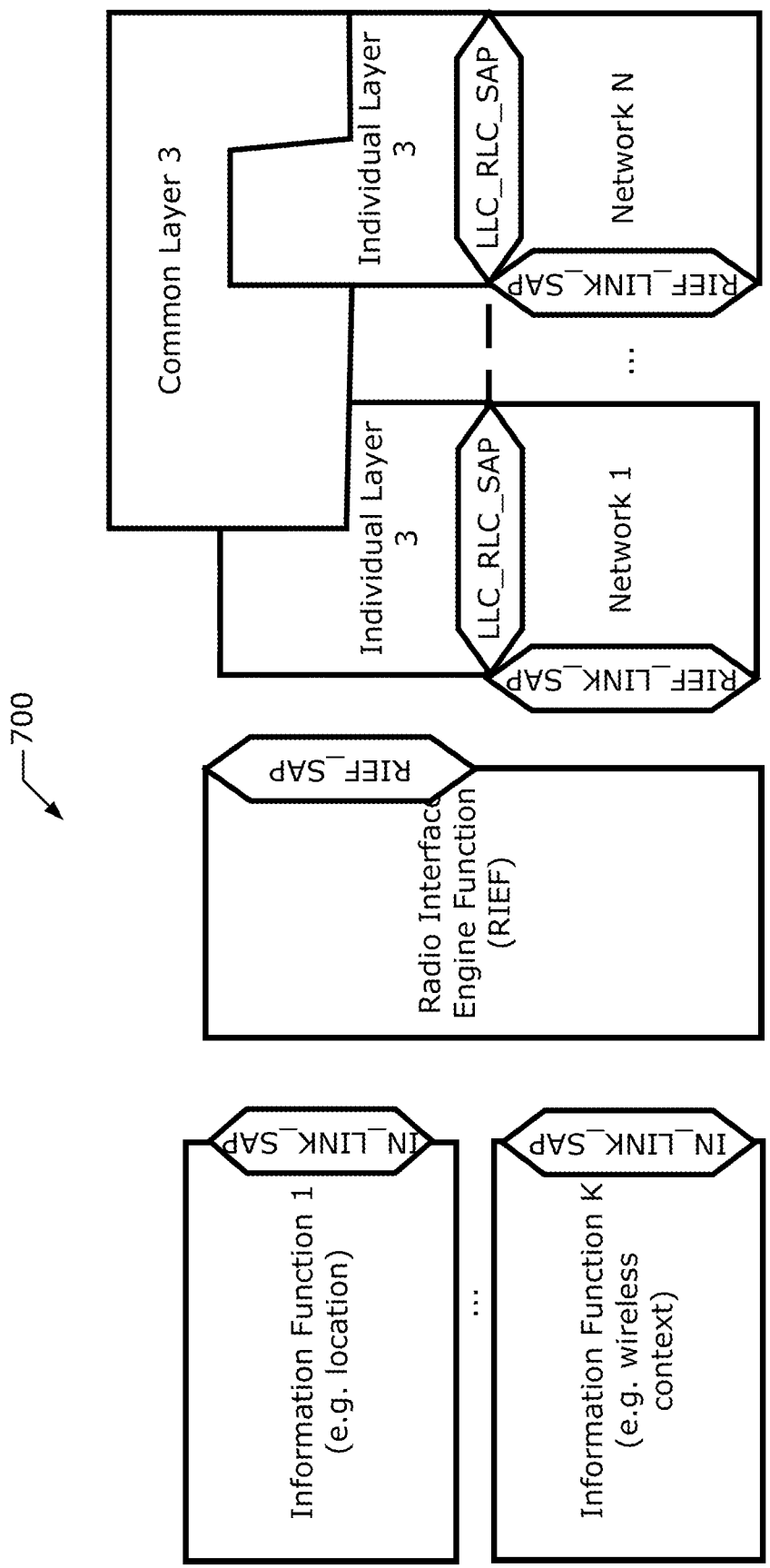
FIG. 7 illustrates an example of different communication component layers according to various embodiments.

Example communication systems 1, . . . , N (where N is a number) include LTE, 5G, WiFi, WiGig, Bluetooth, and/or any other communication system such as those discussed herein. In the example of FIGS. 6 and 7, Network 1 may represent lower layers of a 3GPP Rel. 14 communication system, and Network N may represent lower layers of a WiFi communication system.

The Lower Layers (e.g., PHY and MAC layers) of any type of communication systems 1, . . . , N (e.g., LTE, 5G, WiFi, WiGig, Bluetooth, etc.) interact with the RIEF through the RIEF_LINK_SAP Service Access Point. The information exchange is bidirectional. For example, a specific communication component may provide information about the performance of a specific radio link (e.g., RSS measurements, observed PERs, observed round-trip latencies, etc.) to the RIE. In return, a specific communication component may obtain information which is currently not accessible, e.g. information about typical link performance expected in the future (for example, historic information can be exploited which was observed by the user in the past and is processed by the RIE). The Lower Layers interact with a higher Layer (e.g., Layer 3) component through the LLC_RLC_SAP Service Access Point (e.g., logical link control (LLC) layers such as IEEE 802.2 LLC or 3GPP radio link control (RLC) layers).

The Layer 3 and above is indicated to be spanning across all communication components. This should be considered as an exemplary implementation. Alternatively, each communication component may have independent higher layers separate from the higher layers implemented by other communication components; in addition the individual Layer 3 (and above) there could be an extension of Layer 3 (and above) spanning across multiple (some or all) of the available communication components for coordination between the communication components (e.g., for selection of one RAT among multiple RATs, etc.). Examples of such embodiments is shown by FIG. 7.

FIG. 7 shows another example system architecture 700 according to the first embodiment, which provides separation of an "individual" Layer 3 (and above) for each communication components and a "Common" Layer 3 (and above) for coordination across multiple communication components.

Figure 8:
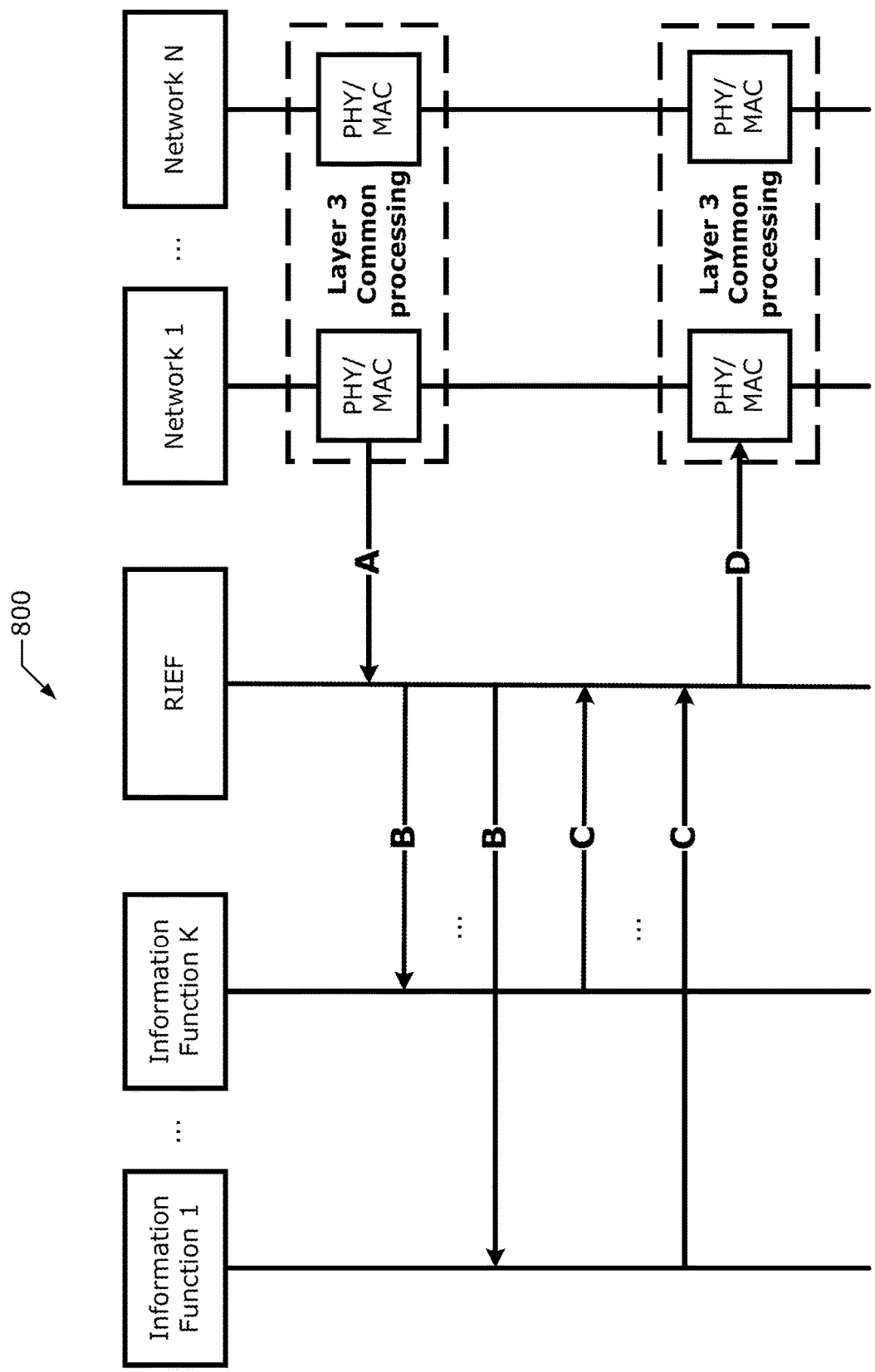
FIG. 8 illustrates an example procedure for operating the RIE system architecture according to the first embodiment.

FIG. 8 shows an example procedure 800 for operating the RIE system architecture 600 and/or 700 according to the first embodiment. Procedure 800 begins at operation A where individual Networks 1, . . . , N, request cognitive context information from the RIEF via RIEF_LINK_SAP for L1 and L2, and via RIEF_SAP for L3. At operation B, the RIEF requests cognitive context information from individual Information Functions 1, . . . , K, via respective IN_LINK_SAPs. At operation C, the individual Information Functions 1, . . . , K, provide requested respective cognitive context information to the RIEF via the respective IN_LINK_SAPs. At operation D, the RIEF requests cognitive context information from the individual networks via the RIEF_LINK_SAP for L1/L2 and via the RIEF_SAP for L3.

2.2. Radio Interface Engine Embodiment 2

Figure 9:
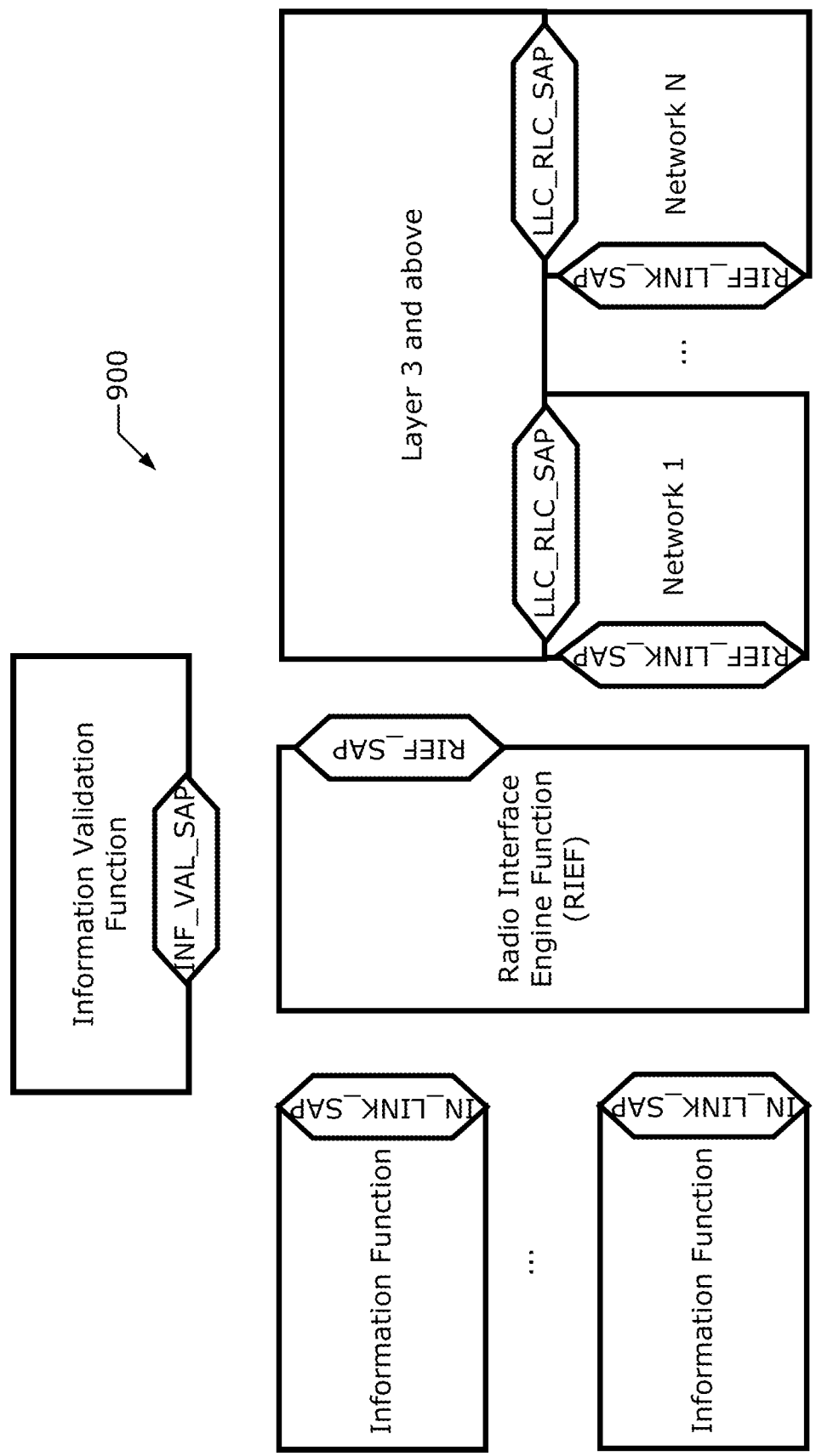
FIG. 9 illustrates an example RIE system architecture according to a second embodiment.

FIG. 9 shows an example RIE system architecture 900 according to a second embodiment. In RIE system architecture 900 like elements are the same as discussed previously with respect to FIGS. 6 and 7. In addition to the structure of the first embodiment, the second embodiment includes an Information Validation Function (IVF) component.

In FIG. 9, the IVF component may be accessed by the RIEF in order to request a cross-check and/or validation of the context information provided by various Information Function components. This may be achieved through various means, including, for example, certificates provided for specific Information Function components or even specific information elements; a cross check of provided information with historic data that was previously collected (e.g., for a user which is repeatedly passing through the same area); A cross check of provided information with other observations, e.g. with information provided by redundant sensors, etc.; and/or other like means. The aforementioned certificates may be provided by a trusted source validating the provided information.

In this embodiment, the RIEF uses the IVF component to validate critical information, for example, if it is being used for safety-related applications such as autonomous driving, etc. It may be the RIEF itself to decide whether certain information needs to be validated (or not). Alternatively, a communication component may request the validation of information from the RIEF through the appropriate Service Access Points.

Figure 10:
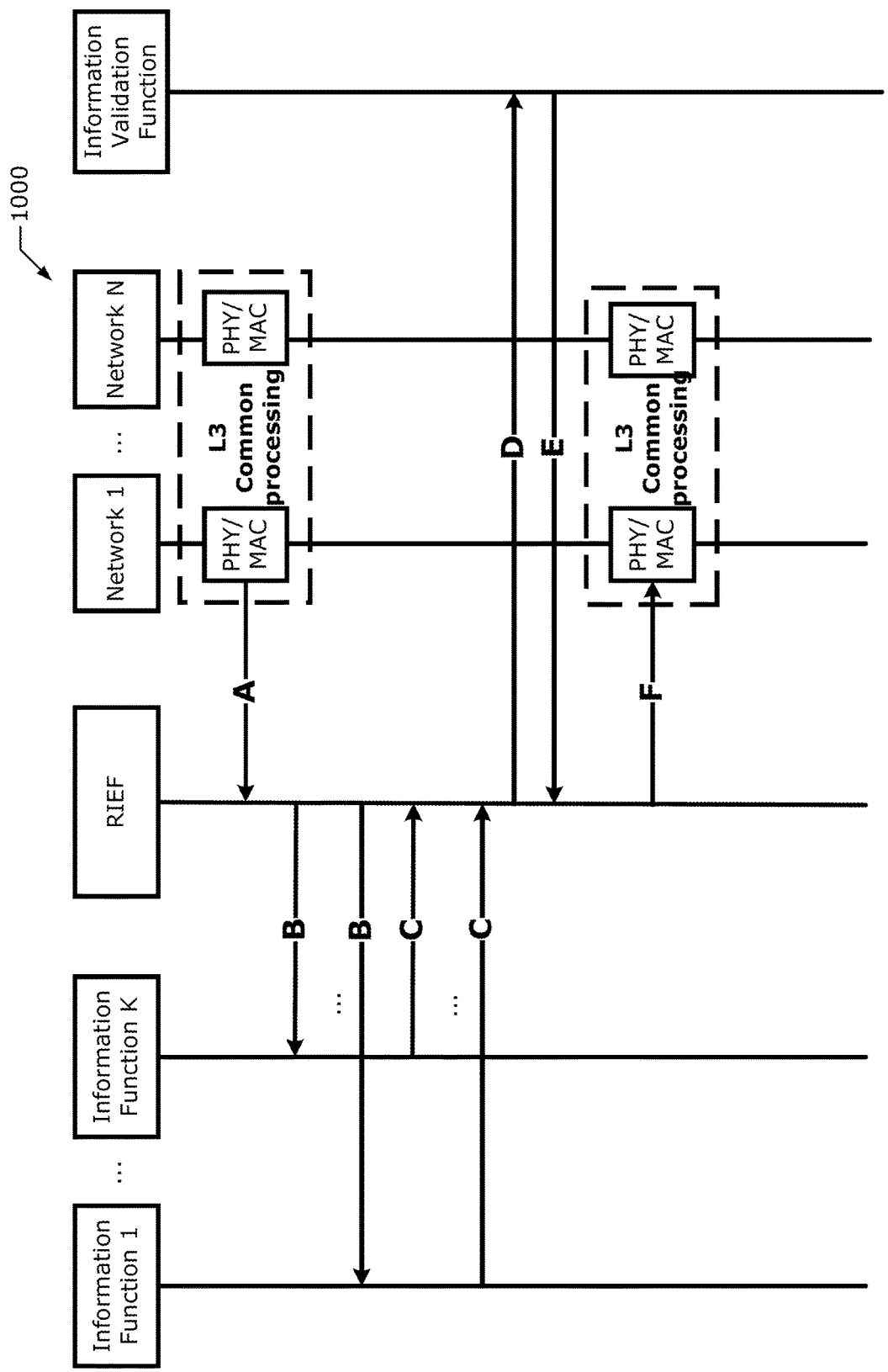
FIG. 10 illustrates an example procedure for operating the RIE system architecture according to the second embodiment.

FIG. 10 shows an example procedure 1000 for operating the RIE system architecture of the second embodiment. Procedure 1000 begins at operation A where the individual Networks 1, . . . , N, request cognitive context information from the RIEF via RIEF_LINK_SAP for L1 and L2, and via RIEF_SAP for L3. At operation B, the RIEF requests cognitive context information from individual Information Functions 1, . . . , K, via respective IN_LINK_SAPs. At operation C, the individual Information Functions 1, . . . , K, provide requested respective cognitive context information to the RIEF via the respective IN_LINK_SAPs. At operation D, the RIEF requests validation of information from the Information Valid Function via the IN_LINK_SAP. At operation E, the Information Valid Function provides the RIEF with an ACK/NACK for validation of information via IN_LINK_SAP. At operation F, the RIEF provides the validated cognitive context information to the individual networks via the RIEF_LINK_SAP for L1/L2 and via the RIEF_SAP for L3.

2.3. Radio Interface Engine Embodiment 3

Figure 11:
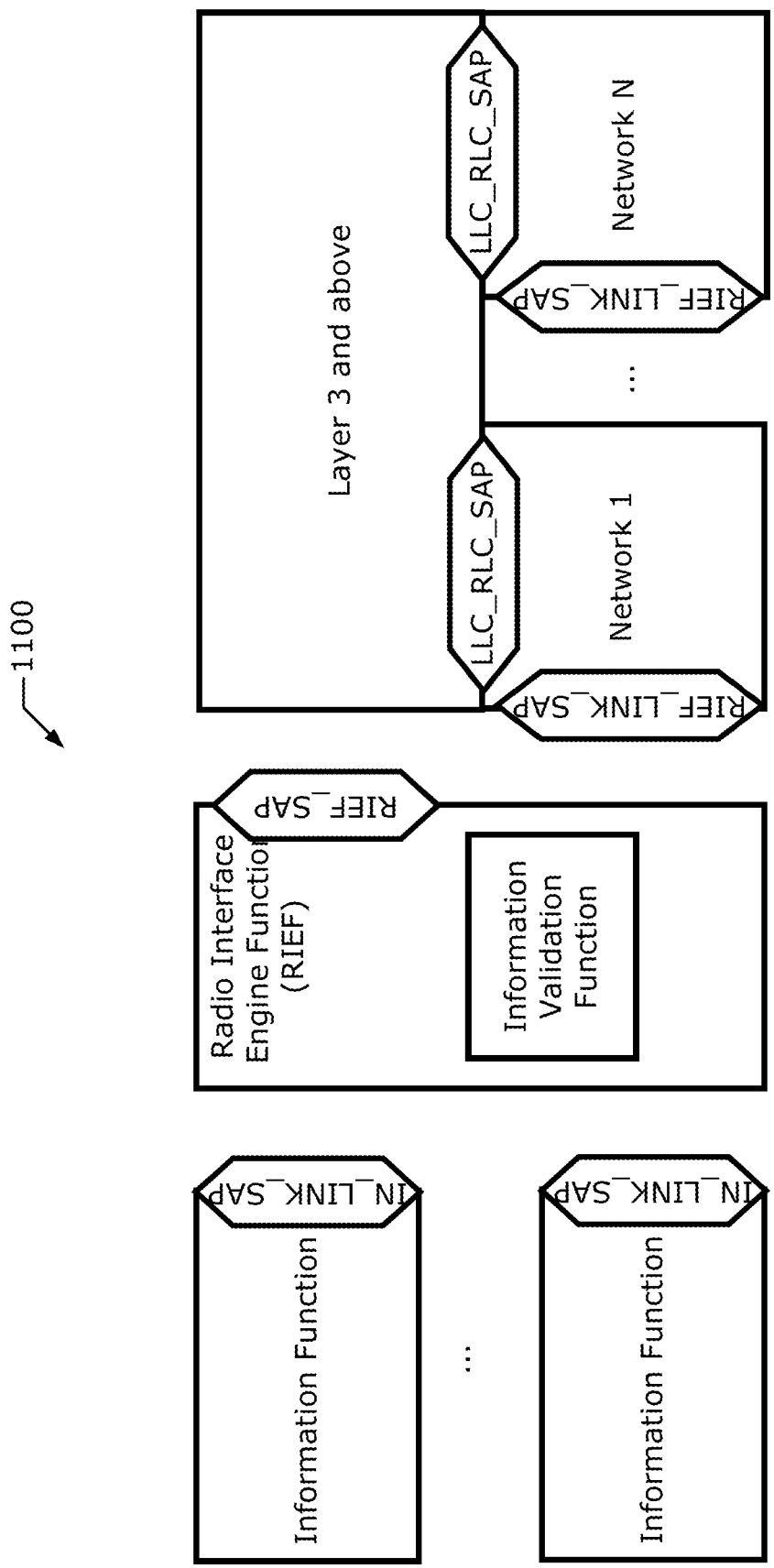
FIG. 11 illustrates an example RIE system architecture according to a third embodiment.

FIG. 11 shows an example RIE system architecture 1100 according to a third embodiment. While the second embodiment includes the IVF component, in a third embodiment, the functionality of the IVF component is provided by an IVF function inside the RIEF. In the third embodiment, the validation of information is performed within the RIEF itself. In some embodiments, the RIEF may request validation from the IVF, and receive validation indicators via a suitable API, ABI, middleware, firmware, software connector, software glue, and/or some other like interface. In case that an interaction with remote functions is required, Layer 2 and/or Layer 3 transport is used for the corresponding exchanges, as shown by FIG. 12.

Figure 12:
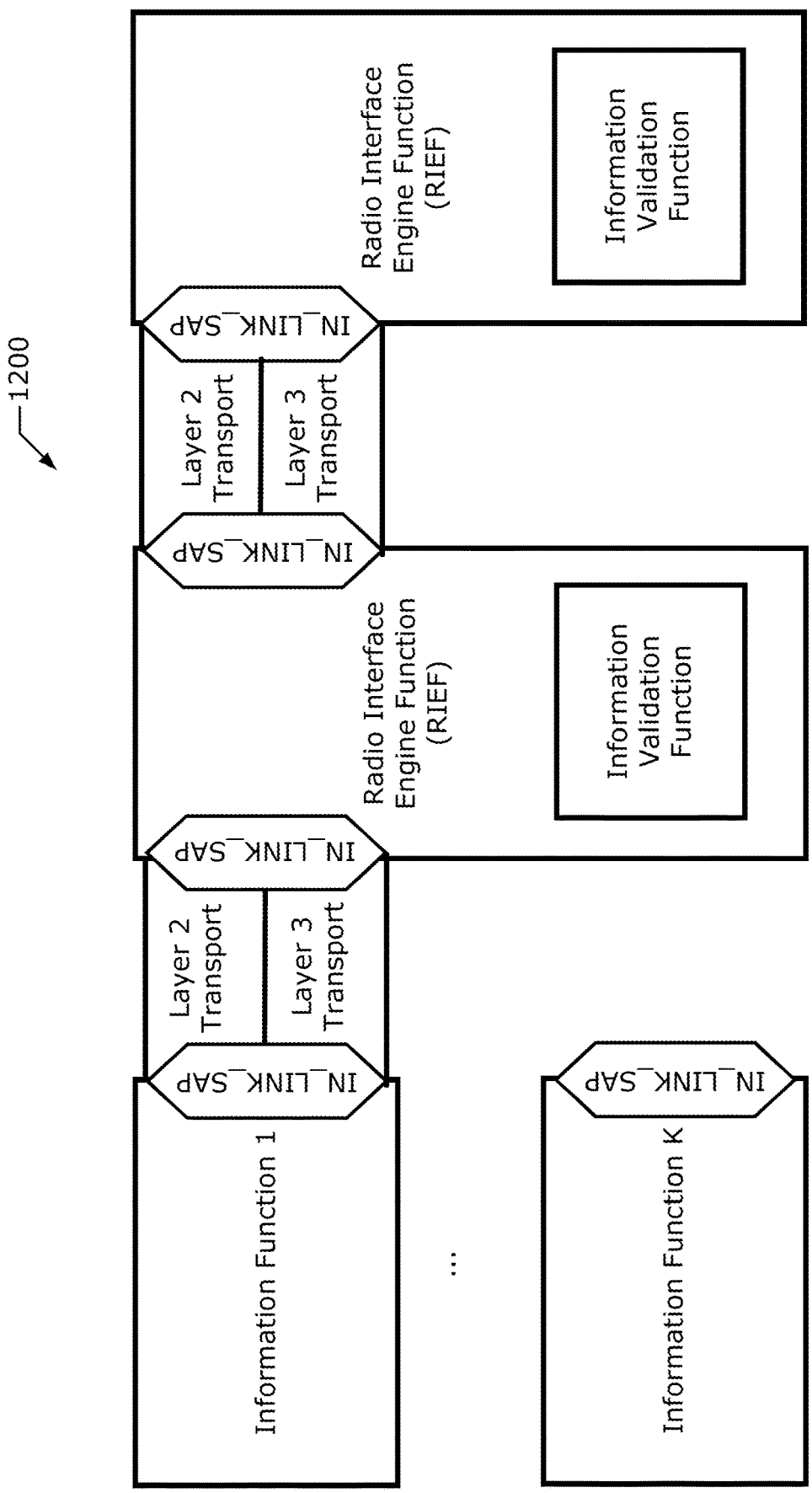
FIG. 12 illustrates an example exchange between remote functions according to various embodiments.

FIG. 12 illustrates an example 1200 exchange between remote functions through Layer 2 and/or Layer 3 connectivity. The SAPs group Service Primitives which are used for all exchanges discussed herein.

Figure 13:
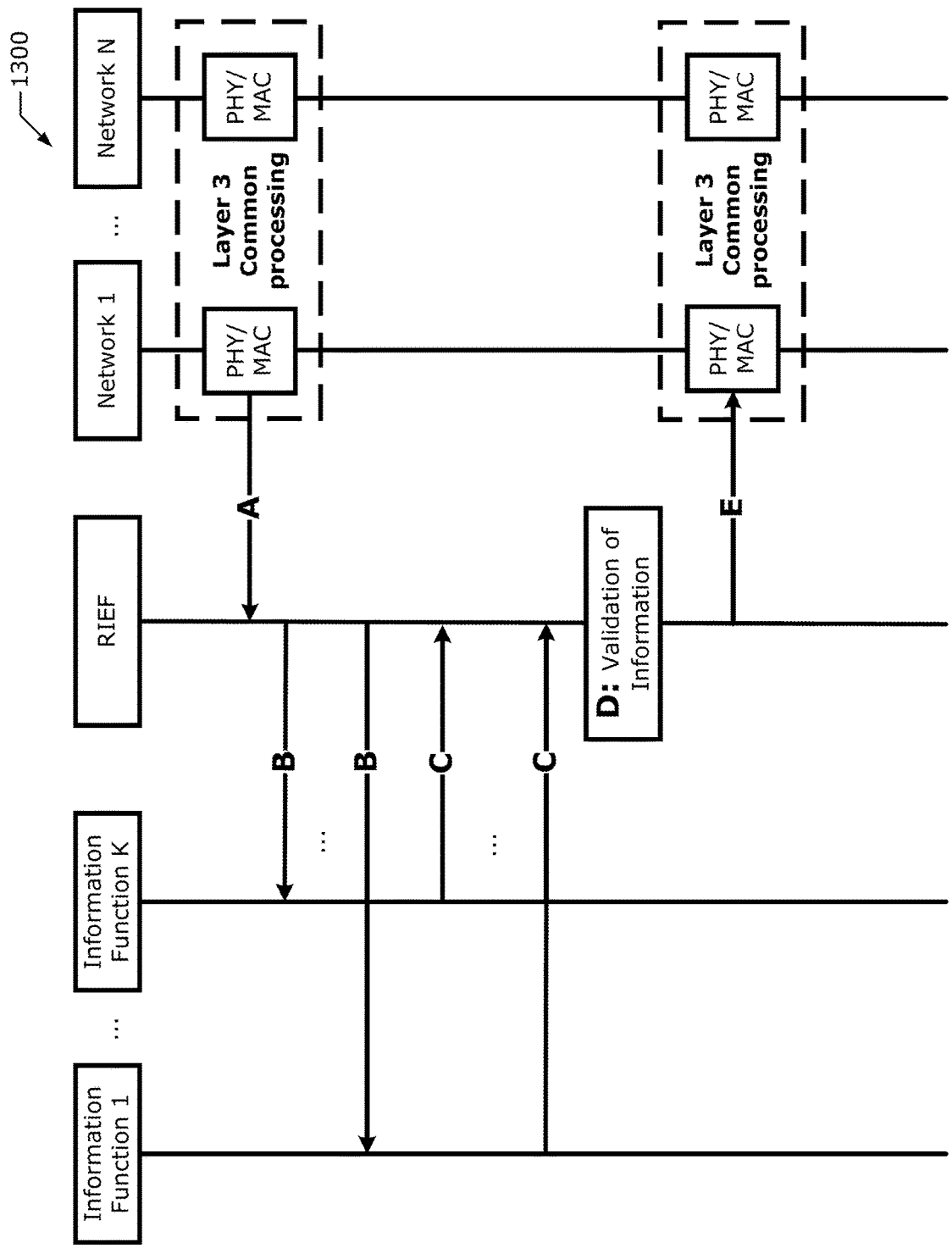
FIG. 13 illustrates an example procedure for operating the RIE system architecture according to the third embodiment.

FIG. 13 shows an example procedure 1300 for operating the RIE system architecture of the third embodiment. Procedure 1000 begins at operation A where the individual Networks 1, . . . , N, request cognitive context information from the RIEF via the RIEF_LINK_SAP for L1 and L2, and via the RIEF_SAP for L3. At operation B, the RIEF requests cognitive context information from individual Information Functions 1, . . . , K, via respective IN_LINK_SAPs. At operation C, the individual Information Functions 1, . . . , K, provide requested respective cognitive context information to the RIEF via the respective IN_LINK_SAPs. At operation D, the RIEF (or the Information Valid Function within the RIEF) validates the information provided by the individual Information Functions 1, . . . , K. At operation E, the RIEF provides the validated cognitive context information to the individual networks via the RIEF_LINK_SAP for L1/L2 and via the RIEF_SAP for L3.

2.4. Radio Interface Engine Reference Point Embodiments

Figure 14:
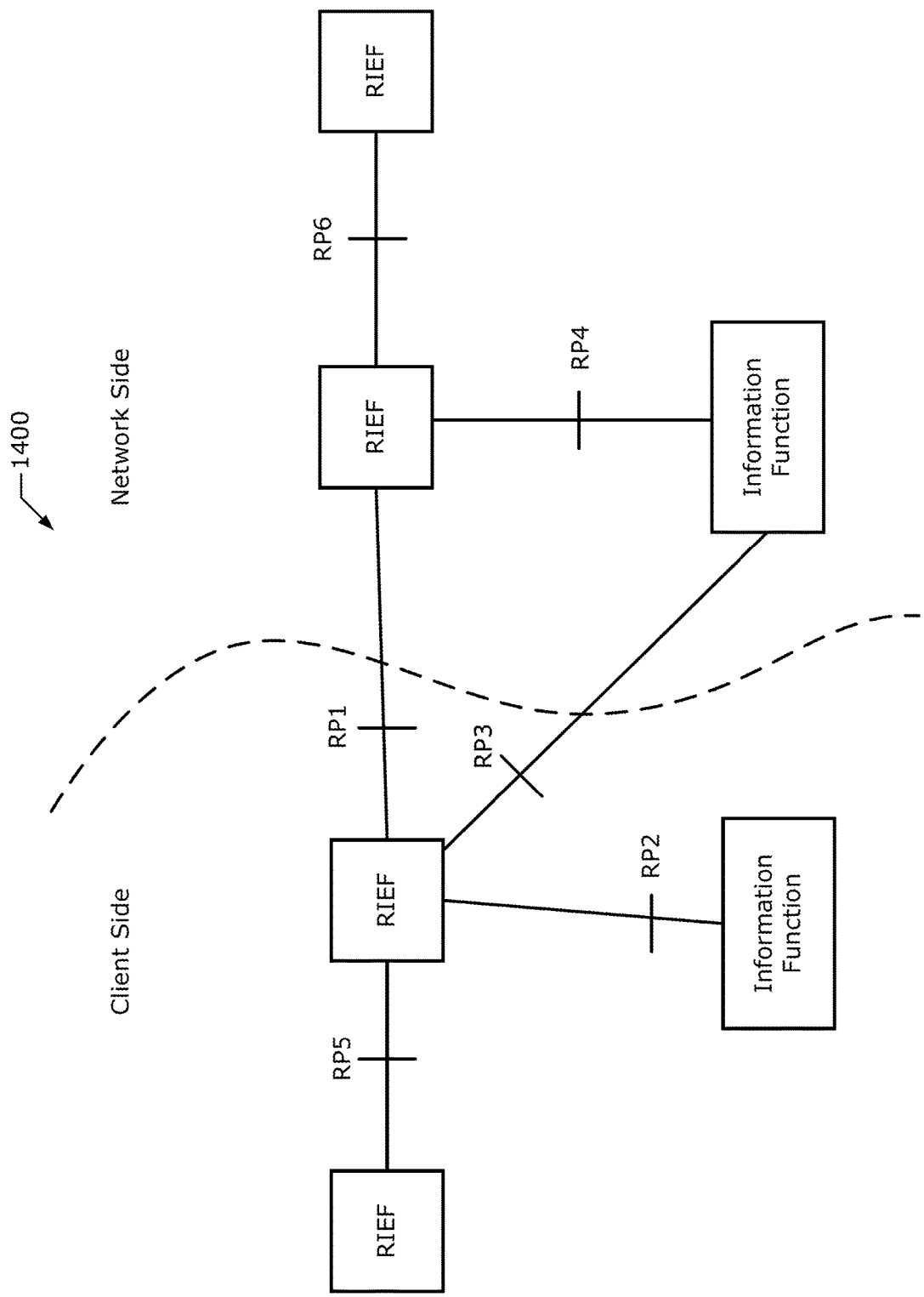
FIG. 14 illustrates an example RIE Reference Point architecture according to various embodiments.

FIG. 14 illustrates an example RIE Reference Point architecture 1400 according to various embodiments. The RIE Reference Point architecture 1400 includes various Reference Points (RPs) between Functions on the Client and Network Side. The RPs shown by FIG. 14 are for illustration purposes only and should not be interpreted as precluding any specific network deployment architecture(s). Each RP may be a conceptual point at the conjunction of two nonoverlapping functions that can be used to identify the type of information passing between the functions.

A summary of the RPs in the RIE Reference Point architecture 1400 is as follows. RP1 connects an RIEF in a client device with an RIEF in the network infrastructure. Both functions are able to exchange context information. RP2 connects an RIEF in a client device to a (distributed) Information Function (e.g. a stand-alone sensor, IoT device, a neighboring client device, etc.). RP3 connects an RIEF in a client device to an Information Function in the network infrastructure. RP4 RP4 connects an RIEF in the network infrastructure to an Information Function in the network infrastructure. RP5 connects two RIEFs located on the client side. For example, this enables the exchange of context information between Client Devices (e.g., smartphones, tablets, wearables, and/or the like). RP6 connects two RIEFs located on the network side. For example, this enable the exchange of context information between network equipment.

The RPs may be applicable to any of the embodiments discussed herein. For example, in the above RP description, the client device may correspond to the RE 101 discussed previously, and the network infrastructure may be one or more NANs 2331-2333 and/or edge compute node 2336 discussed infra with respect to FIG. 23.

2.5. Radio Interface Engine Sap Service Primitives and System Requirements

The service primitives for each of the SAPs discussed herein are summarized by Table 2.5.1, Table 2.5.2, Table 2.5.3, and Table 2.5.4.

TABLE 2.5.1

SAPs for RIEF_SAP

| Service Primitives | Comments |
|---|---|
| RIEF_SAP_Register | Register to the Radio Interface Engine Function. |
| RIEF_SAP_Deregister | De-register from the Radio Interface Engine Function. |
| RIEF_SAP_ProvideInformation | Provide Information to the Radio Interface Engine Function, typically valid for a given geographic location and time. |
| RIEF_SAP_RequestInformation | Request Information from the Radio Interface Engine Function, typically for a given geographic location and time. |

TABLE 2.5.2

SAPs for RIEF_LINK_SAP

| Service Primitives | Comments |
|---|---|
| RIEF_LINK_SAP_Register | Register to the Radio Interface Engine Function. |
| RIEF_LINK_SAP Deregister | De-register from the Radio Interface Engine Function. |
| RIEF_LINK_SAP_ProvideInformation | Provide Physical Layer and/or Medium Access Control Layer Information to the Radio Interface Engine Function, typically for a given geographic location and time. |
| RIEF_LINK_SAP_RequestInformation | Request Physical Layer and/or Medium Access Control Layer Information from the Radio Interface Engine Function, typically for a given geographic location and time. |

TABLE 2.5.3

SAPs for IN_LINK_SAP

| Service Primitives | Comments |
|---|---|
| IN_LINK_SAP Register | Register to the Information Function. |
| IN_LINK_SAP Deregister | De-register from the Information Function. |
| IN_LINK_SAP_ProvideInformation | Provide Information to the Information Function, typically provided by a sensor for a given geographic location and time. |
| IN_LINK_SAP_RequestInformation | Request Information from the Information Function, typically requested by the Radio Interface Engine Function for a given geographic location and time. |

TABLE 2.5.4

SAPs for INF_VAL_SAP

| Service Primitives | Comments |
|---|---|
| INF_VAL_Register | Register to the Information Validation Function |
| INF_VAL_Deregister | De-register from the Information Validation Function |
| INF_VAL_ReguestValidation | Reguest validation of information |
| INF_VAL_ProvideValidationAssessment | Provides result of validation assessment of information |

The RIE architecture embodiments discussed herein may incorporate some of the technical requirements discussed in ETSI TS 103 655-1 V1.1.1 (2019 March) ("[TS103655-1]"). A mapping of the novel components onto system requirements is summarized by Table 2.5.5.

TABLE 2.5.5

Mapping of Architectural Components to System Requirements

| Component | System Requirements as defined in [TS103655-1] | Comments |
|---|---|---|
| Radio Interface Function | R-FUNC-REC-01: Gathering and processing function | The system shall support a gathering and processing function to gather and process radio related metrics and parameters. |
| | R-FUNC-REC-06: Support of information provisioning function | The system shall support an information provisioning function to provide updated network configuration information to the appropriate system devices. |
| | R-FUNC-REC-06: Support of information provisioning function | The system shall support an information provisioning function to provide updated network configuration information to the appropriate system devices. |
| Information Validation Function | R-FUNC-MOB-04: Support of authentication | The system shall support authentication methods to provide traceable and trustable data sources from WDs. |
| | R-PERF-KPI-CON-04: Sensor reliability | The system shall assess the reliability of sensors that assess data to be integrated as context information (such as pressure and humidity) and provide the measurement data. |
| | R-PERF-KPI-CON-02: Integrity of the localization performance | The system shall assess the integrity of the estimated localization performance. |
| Information Function #K | R-FUNC-REC-06: Support of information | The system shall support an information provisioning |

TABLE 2.5.5-continued

Mapping of Architectural Components to System Requirements

| Component | System Requirements as defined in [TS103655-1] | Comments |
|---|---|---|
| | provisioning function | function to provide updated network configuration information to the appropriate system devices. |

3. Radio Virtual Machine Embodiments

As alluded to previously, RAs 270 may be developed using a Radio Virtual Machine (RVM) approach (see e.g., discussion of RVM 271 with respect to FIG. 2), which is an efficient way of developing RAs 270 that are portable across different heterogeneous hardware platforms.

In other words, it is advantageous to develop RAs 270 that can be portable many different types of hardware platforms that are produced by multiple different manufacturers. In this context, heterogeneous hardware platforms refers to multiple types of equipment that different processing elements and/or different RATs. For example, a first platform may include a single CPU or baseband processor with a memory device with a first architecture developed by a first manufacturer (e.g., MediaTek® Helio M70 is a multimode chipset), a second platform may include a single CPU or baseband processor with a memory device with a second architecture developed by a second manufacturer (e.g., Qualcomm® X50 family of 5G chips), a third platform may include multiple DSP combined or otherwise coupled with an FPGA, and so forth. RAs 270 may be written in a platform agnostic manner to be portable software across these heterogeneous platforms.

For this purpose, the RVM 271 is an abstract machine that allows any type of algorithm to be expressed in a way that is independent of the underlying hardware. For example, with reference to FIG. 4, the data objects $(DOs)_{1-N}$ are connected through the abstract switch fabric (ASF) to abstract processing elements (APEs). An APE is any type of operation including simple operations (e.g., arithmetic operations such as addition, subtraction, multiplication, division etc.), complex operations (e.g., complex arithmetic operations such as differential equations, derivatives, integrals, fast Fourier transform (FFT), inverse discrete FFT, etc.), basic operations (e.g., operations either provided by the Radio Library 273 and/or UDFB Set to eRVM 471 or by the Radio Library 273 and/or RVM 271/eRVM 471 Configcodes to RVM 271), dynamic operations (e.g., operations that are performed by allocating the computational resources during run-time for each APE required executing the given operation), terminal operations (e.g., operations that will always be executed without any other interruption), and/or other like operations. These operations typically needs a number of inputs (e.g., an addition operation may need two inputs to add together). The data from the $DOs_{1-N}$ is connected through the ASF to the appropriate APE, and then the APE processes the data and generates an output which is then fed back through the control unit to the DOs and the like.

The ETSI RVM approach employs a fully asynchronous ("async") design principles. In the async design approach, the functionalities of the RVM 271 are executed when the input data is available, independent of any clock signal or other synchronization signal. For example, once the data from the $DOs_{1-N}$ is made available to the appropriate APEs, the operation is executed and the results are written back to $DOs_{1-N}$.

Although async operation is typically suitable to implement small-scale functionality, larger scale functionality often prefers or requires synchronous operation because the behavior of such systems is considered to be more predictable. A sync design uses a synchronization ("sync") source, such as a clock signal, to coordinate the execution of various operations. For example, with reference to FIG. 4, in a sync design all the APEs may execute their operations at the same time according to a predefined sync source. In this example, the sync source is a clock signal that goes from logical zero to logical one, where the trigger for the APEs to go active is the clock signal being at (or going to) logical one. However, process for identifying a synchronous hardware implementation out of an async algorithm description is very difficult and computationally complex. Furthermore, many software tools do not have the capability to translate asynchronous programs into synchronous programs.

According to various embodiments, an RVM 271 executes functionality synchronously where all of the data transfers (e.g., from DOs to APEs) and/or all of the operation execution (e.g., APE operations) take place at the same time. In various embodiments, a sync source provides a sync signal (e.g., a clock signal) as an input to one or more DOs within the RVM 271. In these embodiments, the related functionality can only be executed when a DO is "full" (e.g., when the clock signal changes to a certain state, or a certain number of state changes take place). As a result, the RVM 271 is synchronized to a sync signal of the sync source, which provides a more predictable RE system.

Figure 15:
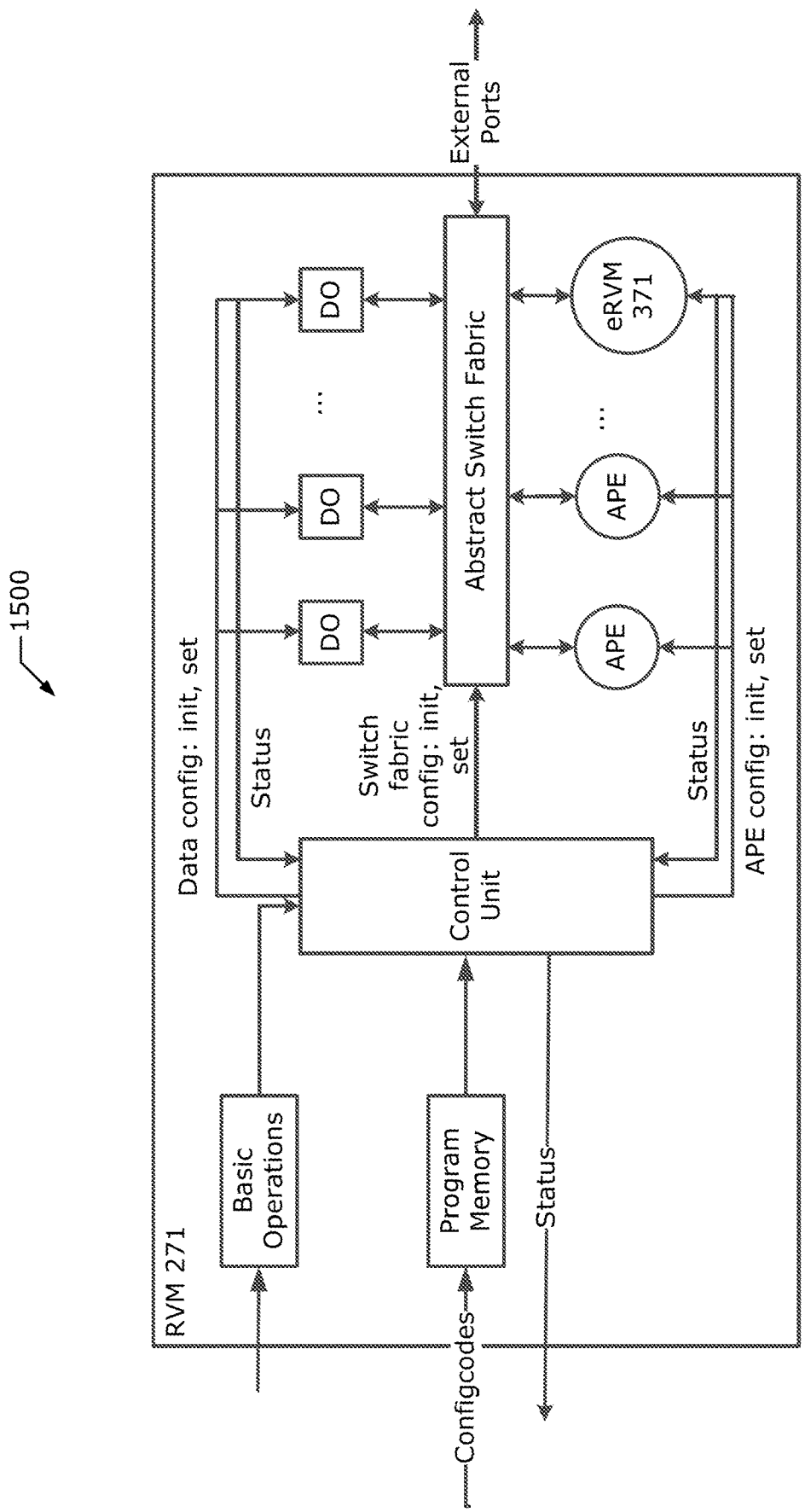
FIG. 15 illustrates an example RVM architecture according to various embodiments.

FIG. 15 shows an example RVM architecture 1500 according to various embodiments. The RVM 271 may be the same or similar as the RVM 271 discussed infra with respect to FIGS. 2, 3, and 4. In FIG. 15, the Abstract Processing Elements (APEs) contain one or more functional blocks (FBs) (e.g., from a Radio Library such as radio library 273 in FIG. 2). In some embodiments, the RVM 271 may be an elementary RVM (eRVM) 471 (see e.g., FIG. 4). In some embodiments, one or more of the APEs in the RVM 271 may be, or may include, an eRVM 471.

The Abstract Switch Fabric (ASF) connects Data Objects (e.g., data) with APEs. A DO is a container for storing data. A Data Object (DO) may be considered to be "empty" when there is no data in the container, and the DO may be considered to be "full" when there is data in the container. An FB (or APE) processes its input data as soon as all DOs connected to the APE are "full" (e.g., have a state of "full"). When this is not synchronized to any global sync source, the RVM is considered to be an async RVM 271.

Figure 16:
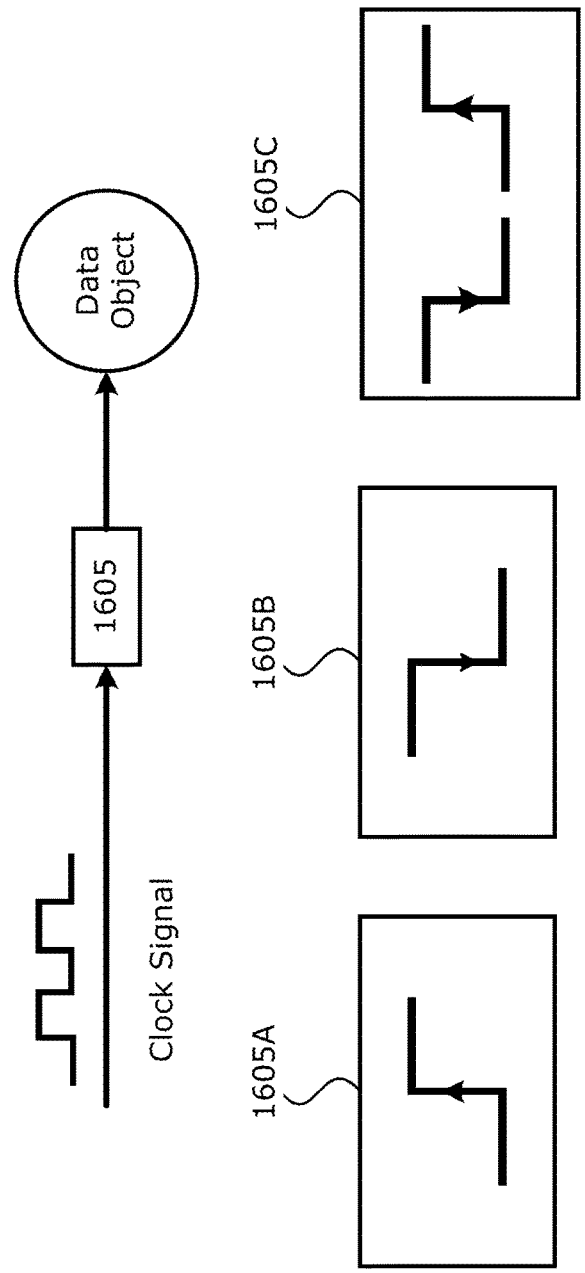
FIG. 16 illustrates example RVM synchronous operations according to various embodiments.

FIG. 16 illustrates an example RVM 271 synchronous operation including various DO state changes according to various embodiments. Synchronous operations require that a first operation must wait for a second operation to complete before the first operation can be executed or otherwise begin. In a synchronous approach for the RVM 271, a (global) sync source is used to synchronize RVM 271/APE operation. In order to synchronize the RVM 271 to the sync source, a new object is introduced which creates a "full Data Object" when the clock changes to a predetermined state (e.g., from LOW to HIGH or from HIGH to LOW) or changes its state a certain number of times (e.g., from LOW to HIGH and then from HIGH to LOW). Examples of these embodiments are shown by FIG. 16.

In FIG. 16, the creation of an output (e.g., the "clock signal" in FIG. 16) from a sync source (or "clock") forces the DO to a "full" state, or vice versa. In the examples of FIG. 16, the DO state change is triggered by the clock signal changing its state 1605 (e.g., reaching or falling below a certain threshold signal strength, voltage, etc.). Examples of state change 1605 include stage changes 1605A, 1605B, and 1605C.

FIG. 16 includes a first state change 1605A where the DO state change is triggered (or enforced) by the clock signal changing its state from LOW to HIGH. A second state change 1605B involves the DO state change being enforced (or triggered) by a clock signal state change from HIGH to LOW. A third stage change 1605C involves the DO state change being triggered/enforced by any state change of the clock signal from HIGH to LOW as well as from LOW to HIGH. In other embodiments, any number of clock signal state changes may be used to trigger/enforce the DO state change, for example, three state changes (e.g., from HIGH to LOW, from LOW to HIGH, and from HIGH to LOW), four state changes (e.g., from LOW to HIGH, from HIGH to LOW, from LOW to HIGH, and HIGH to LOW), and so forth. The number of state changes may be predefined or configured depending on the RA 270 and/or use case. The state change transitions may be expressed using the number of state transitions or using some other unit such as duty cycle, frequency (Hz), pulse width (pulse active time), and/or the like. Using the sync based operation of the various state change 1605 embodiments, it is now possible that only a single DO is fed with the outputs of the entity indicated above (e.g., generating a "full state" of the DO when the clock state changes one or more times).

Figure 17:
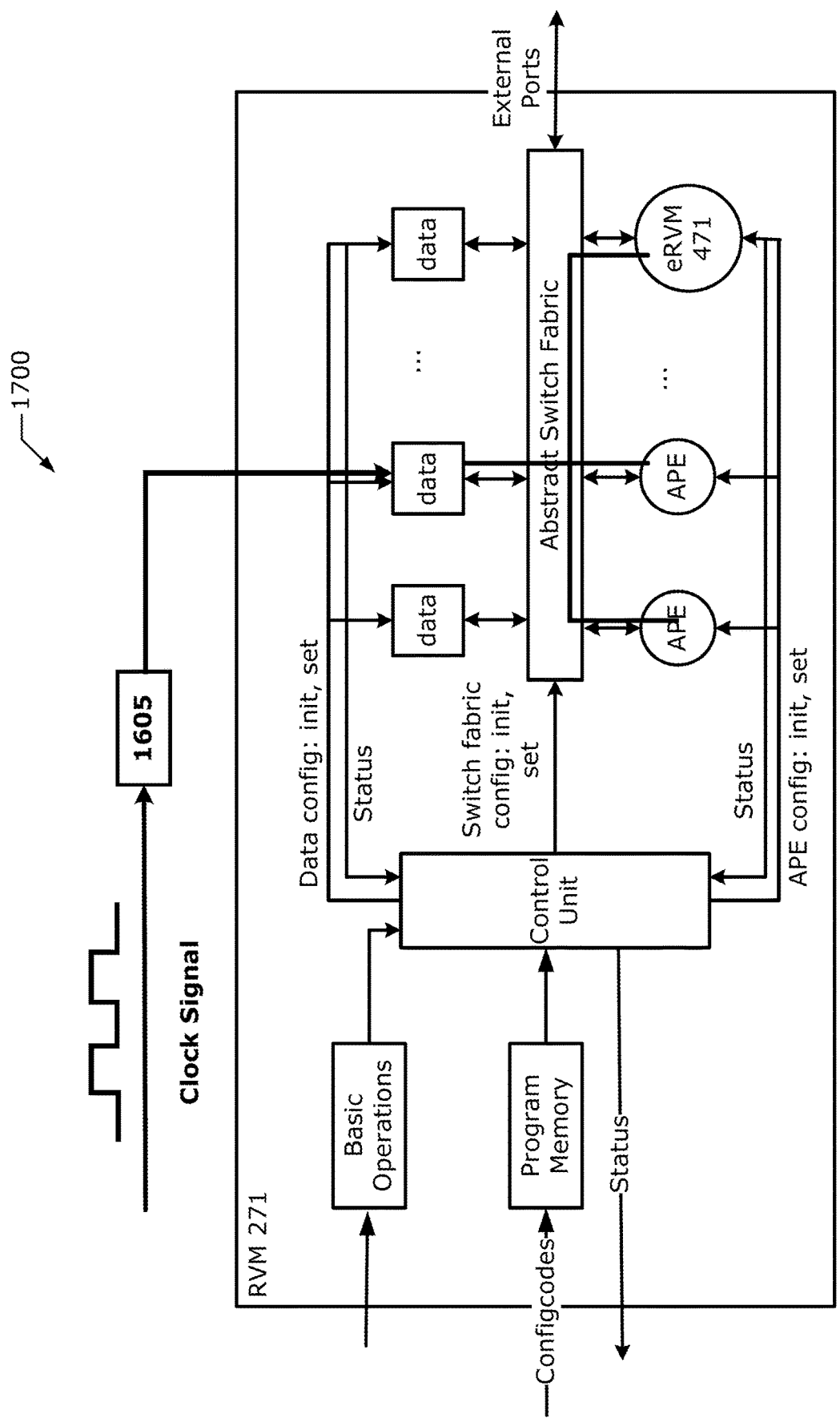
FIGS. 17 and 18 illustrate example of RVM operations according to various embodiments.
Figure 18:
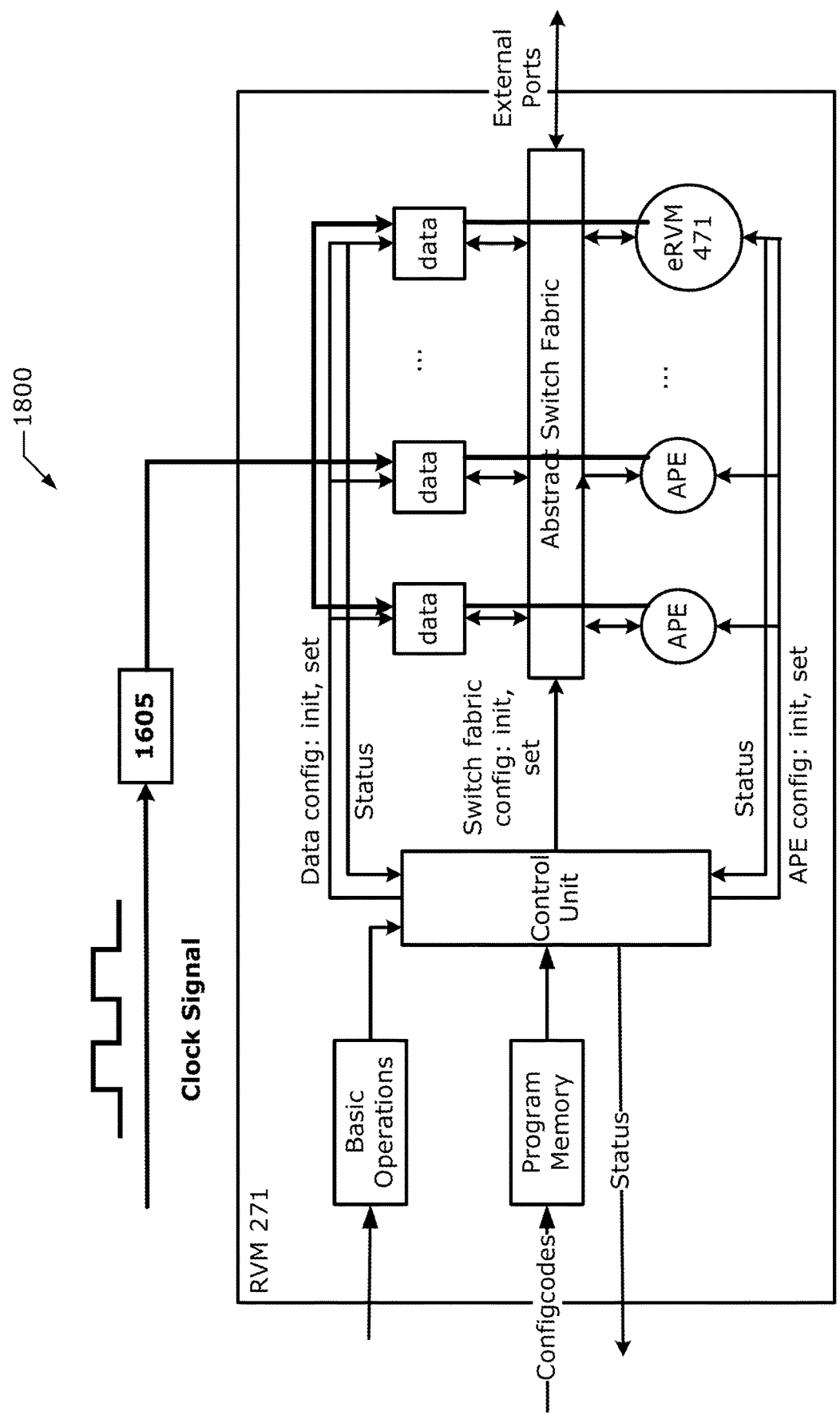

FIG. 17 shows an example of RVM 271 operation 1700 according to various embodiments, where the ASF connects a single DO to all APEs that are required to be executed SYNCHRONOUSLY. FIG. 18 shows another example of RVM 271 operation 1800 according to various embodiments, where multiple DOs are fed with the outputs of the sync source indicated above (e.g., to generate a "full state" of the DO when the clock signal state changes from LOW to HIGH, from HIGH to LOW, or both). Then, different APEs are connected to different DOs enforcing the execution to be SYNCHRONOUS.

In any of the embodiment discussed herein, the sync source generates a clock signal, which is provided to the RVM 271 (or components/entities in the RVM 271). The clock signal may be any type of signal that oscillates between a high state and a low state. The clock signal may be used like a metronome to coordinate actions of digital circuits, APEs, ASF, and/or other elements of the RVM 271. As an example, the clock signal may be in the form of a square wave with a 50% duty cycle. Any other type of wave and/or duty cycle may be used in other embodiments. The duty cycle is a cycle of operation of a machine or other device which operates intermittently rather than continuously. For purposes of the embodiments discussed herein, the duty cycle is a period in which the clock signal is active, which may be expressed as a ratio or percentage (where the "period" is the time it takes for the clock signal to complete an on-and-off cycle, or HIGH-to-LOW cycle or vice versa).

As discussed herein, in order to achieve the synchronous operation, the DO related to the clock signal must switch into the "full" state when the operation (e.g., represented by an APE) is to be executed. This is the case when the clock signal transitions or finalizes the transition (e.g., the state change transition being from LOW to HIGH, from HIGH to LOW, or both). In this case, the "full" state of the DO is reached through the creation of a single bit (or any other data sequence) that is provided to the DO, such as "0" or "1". In some embodiments, the sync source (or "clock") is, or is connected to, circuitry that generates such a bit (or any other data sequence) and provides it to the concerned DO at the right point in time (e.g., when the clock transitions or finalizes the transition from LOW to HIGH, from HIGH to LOW, or both). Such a circuitry may include, for example, a delay element whose NEGATED input and output (or input and NEGATED output) are combined through an AND operation. When the transition of the clock occurs, the result of the AND operation is "1" when the clock transition occurs and this triggers the provision of the triggering bit to the DO. In some implementations, this can be combined with a flip flop element or the like.

In any of the aforementioned embodiments, the sync source may be an internal sync source (e.g., internal to the RVM 271 and/or the RE 101 that includes the RVM 271) or an external sync source (e.g., external or remote from the RVM 271, or external/remote from the RE 101 that includes the RVM 271). Examples of external sync sources may include timing information provided by positioning circuitry of the RE 101 (which demodulates/decodes received GNSS signals to obtain the timing information); a network time (or timing) provided by a base station or other like network element; signaling from a longwave radio clock or radio-controlled clock (e.g., where a dedicated terrestrial long-wave radio transmitter connected to a time standard (e.g., an atomic clock) transmits a time code that is demodulated and decoded to determine the current time); and/or the like. In some embodiments, the external sync source timing may be sent according to the Network Time Protocol (NTP).

The internal sync source may be based on a clock signal provided by an internal component or embedded device such as, for example, a relatively stable atomic clock, a clock generator of internal circuitry (e.g., application processor(s) 2904, 3052, 2951; RCF 210; baseband processor(s) 221, 2938, RF circuitry/transceiver(s) 222, 2934, 2936; and/or positioning circuitry 3045, etc.). The clock generator may be, for example, a crystal or quartz piezo-electric oscillator, an RC oscillator circuit, an LC oscillator circuit, and/or any other electric element(s) that can be used to derive an absolute timing for synchronization. Other sync sources may be used in other embodiments such as periodic software timers, simulated function generators, and/or the like.

In some embodiments, one of the aforementioned sync sources may be predefined or configured as a primary sync source, and one or more other sync sources may be predefined or configured as a secondary or fallback sync source that is used when the primary synchronization source is unavailable. In another embodiment, a predefined or configured priority listing may be used to prioritize for each sync source, where the RE 101 or RVM 271 uses a highest priority sync source that is available. A sync configuration indicating the sync source(s) may be signaled to the RE 101 using higher layer signaling (e.g., RRC or NAS signaling/messages in 5G or LTE networks). In some embodiments, individual RAs 270 may indicate specific sync source(s) to use, and such sync source(s) may be used when the RA 270 is provisioned and executed by the RVM 271.

According to various embodiments, there are two ways of creating the full Data Object state. A first way is an "RVM internal" method where one or multiple entities inside the RVM 271 create the full Data Object state in or based on the function of a clock. A second way is an "external" method, where one or more external sources or entities create the full Data Object state in or based on the function of a clock. In RVM internal or external methods, the clock may be internal or external to the RVM 271.

Figure 19:
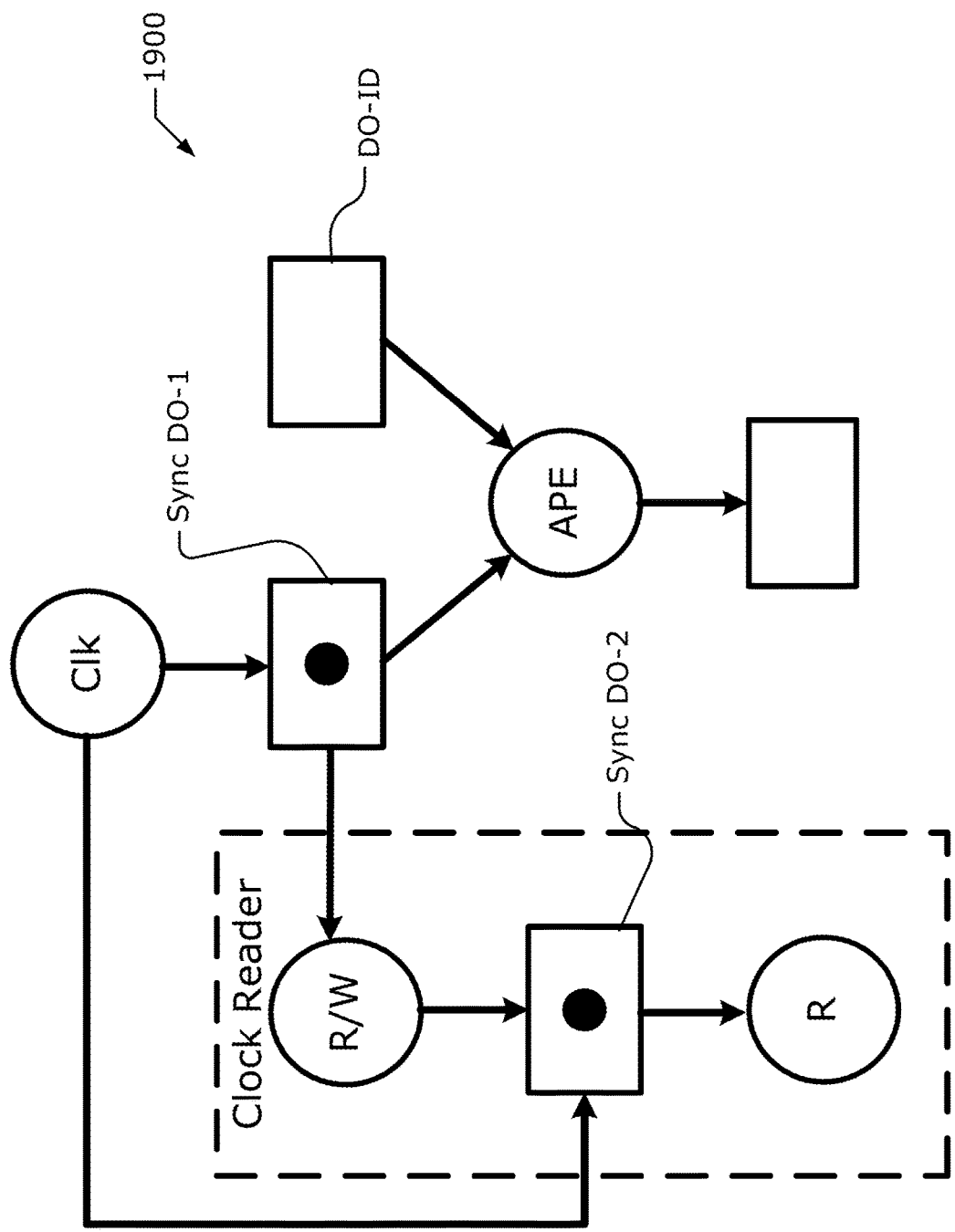
FIG. 19 illustrates an example for input Data Object remaining empty during one or multiple clock cycles according to various embodiments.

An example 1900 for clock distribution is given by FIG. 19, which illustrates an example for input DO remaining empty during one or multiple clock cycles according to various embodiments. The example 1900 for clock distribution includes a Clock generator (Clk), a clock reader including a read/write (R/W) operator and a read (R) operator, and an APE connected to a input DO, a Sync DO and an output DO. The solid (filled-in) circle inside the sync DO-1 and sync DO-2 indicates that those DOs are full, and the DO-ID not including a solid circle indicates that the DO-ID is not full. As mentioned previously, the APE only starts operating when all of its input data objects (e.g., DO-ID) are full. In example 1900, the operation of the APE is not yet ready for execution because the DO-ID is still not full.

In this example, a single Clk feeds independent Sync DOs (e.g., sync DO-1 and sync DO-2 in FIG. 19) and for each APE and corresponding Clock Readers, although the embodiments are not limited in this manner and multiple Clks can feed one or more Sync DOs for one or more APEs in other embodiments. Furthermore, it is assumed that a DO (e.g., DO-ID) remains empty for multiple/several clock cycles. Then, the Clk overwrites the full Sync DO-1 (indicated by the filled circle inside the DO in FIG. 19), which triggers an exception. This exception is avoided by the following mechanism(s): (1) and sync DO-2 is full, blocking R/W operation; (2) operator R consumes and sync DO-2 content; (3) the DO (e.g., DO-ID) is empty, and the operator R/W consumes sync DO-1 content; and/or (4) Clk creating new input to sync DO-1 and sync DO-2 accessing an empty DO.

Figure 20:
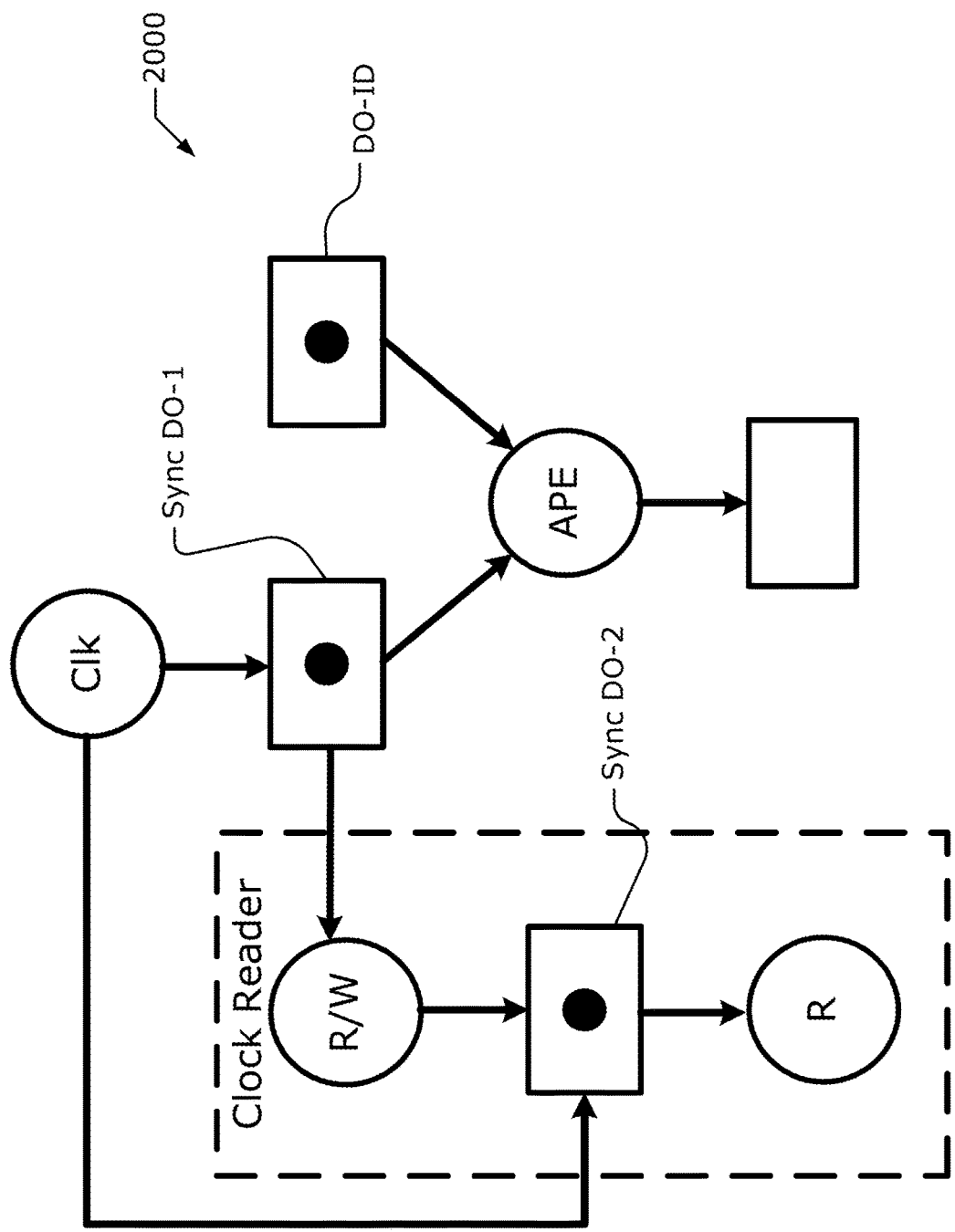
FIG. 20 illustrates an example for full input Data Object according to various embodiments.

The Sync DOs need to be full in order to allow the execution of the APE because the APE is only executed when all of its input data from the DO with APE input data ("DO-ID" in FIG. 19) are available. The sync DOs are full at the time when the Clk changes its state (or undergoes multiple state changes). When the Clk changes its state (or undergoes multiple state changes) as indicated by the sync DOs being in a full state, the APE is authorized to access its data in the DO-ID. In this way, the APE is being synchronized to the edge of the clock FIG. 20 illustrates an example 2000 for full input DO according to various embodiments. This example includes the same elements as discussed previously in example 1900 of FIG. 19. The solid (filled-in) circle inside the DO-ID indicates that the DO-ID is full, which means that data is available for being processed by the APE. As mentioned previously, the APE only starts operating when all of its input data objects (e.g., DO-ID) are full. In example 2000, the operation of the APE is ready for execution because the DO-ID is full. In the example of FIG. 20, it is assumed that the DO (e.g., DO-ID) is full, block R/W operation from reading Sync DO-1 and empty all DOs after reading. This is achieved by the following mechanism(s): (1) Sync DO-2 is full, blocking R/W operation; (2) Operator R consumes Sync DO-2 content; (3) If DO (e.g., DO-ID) and Sync DO-1 are full, so APE is executed and consumes both DO contents. DO, Sync DO-1, and Sync DO-2 are empty; and/or (4) Clk will create new input to Sync DO-1 and Sync DO-2.

In the approaches presented above, exception handling may need to be addressed. In some embodiments, full Data Objects provide inputs to APEs, which execute the respective processing/operations during the duration of a clock cycle. Then, the DOs return to an empty state and are filled again for processing during the next clock cycle. In case of an exception, the concerned Data Object may not return to an empty state before the end of the clock cycle. In this situation, an exception may occur if new data is provided to a Data Object when it is still in full state. In various embodiments, to avoid these exceptions, the concerned Data Objects may be forced to empty spaces/states and the Data Objects contents are destroyed. Furthermore, a Control Unit may trigger corresponding exception status information.

4. Modular Software Reconfiguration for Radio Equipment Embodiments

The software reconfiguration approaches discussed herein enable reconfiguration of REs through software as specified in ETSI EN 303 641 V1.1.2 (2020 March) ("[EN303641]"), ETSI EN 303 648 V1.1.2 (2020 March) ("[EN303648]"), ETSI EN 303 681-1 V1.1.2 (2020 June) ("[EN303681-1]"), ETSI EN 303 681-2 V1.1.2 (2020 June) ("[EN303681-2]"), and ETSI EN 303 681-4 V1.1.2 (2020 June) ("[EN303681-4]"), and the use cases discussed in ETSI TR 103 585 V1.1.1 (2018 February) ("[TR103585]"); the overall framework is complemented by security solutions such as those discussed in ETSI TS 103 436 V1.2.1 (2018 February) ("[TS103436]"). The specific case of Mobile Device reconfiguration is addressed in ETSI EN 303 095 V1.3.1 (2018 May) ("[EN303095]"), ETSI EN 303 146-1 V1.3.1 (2018 June) ("[EN303146-1]"), ETSI EN 303 146-2 V1.1.5 (2016 March) ("[EN303146-2]"), ETSI EN 303 146-3 V1.3.1 (2018 June) ("[EN303146-3]"), ETSI EN 303 146-4 V1.1.1 (2017 January) ("[EN303146-4]"), ETSI TR 103 087 v1.2.1 (2017-11) ("[TR103087]"), and [TS103436]. The software reconfiguration approaches have been designed from a holistic perspective with an emphasis on the needs of commercial equipment, addressing: technical requirements (e.g., code portability and efficiency), security requirements (e.g., security delivery and installation of software components), and regulatory requirements (e.g., technical solutions for re-certification of platforms when radio characteristics are modified).

In various implementations, reconfiguration can be performed on an individual level (e.g., users choosing among new features for their respective component) or en-mass (e.g., automatic upgrade of all platforms). Reconfigurable REs may also be tailored to the needs of the [RED], which includes articles on software reconfiguration. Specific attention is given to security requirements, addressing in particular: proof of conformance of the radio platform and radio applications to the regulatory Declaration of Conformity, considering that the set of installed radio applications can change over time; proof of the integrity of radio applications; proof of the identity of the developer of radio applications; built-in support for security updates; and prevention of code theft.

Moving from today's hardware design principles to software reconfiguration solutions will likely require a paradigm change, which can take place in a gradual step-wise approach. For example, in a first-generation implementation, the functionality may be limited to a replacement of specific (hardwired) components by executable software, designed specifically for a given target platform. Features such as secure delivery of software components and installation will be sufficient to address this need. Hardware resources (e.g., FPGA resources) are typically added to the original design to enable the replacement. Second-generation implementations may build on the first-generation implementations to design portable and yet highly (power) efficient code thanks to the RVM 271. The RVM 271 is a representation of a radio algorithm and may be somewhat different from other virtual machine concepts as generally applied in the computer science and IT arts. Furthermore, the level of autonomy of the platform may evolve over time, including distributed selection of the most relevant features and dynamic replacement of corresponding software components.

With the above features, the software reconfiguration solution is suited to meet the requirements of 5G and beyond applications. For example, it will enable automotive communication platforms to remain relevant over the lifetime of a vehicle and to address platform vulnerabilities which may arise over the lifetime of a vehicle, enable product adaptation to specific market needs for Internet of Things (IoT) solutions, etc.

4.1. Use Case 1—Smartphone Reconfiguration

Figure 21:
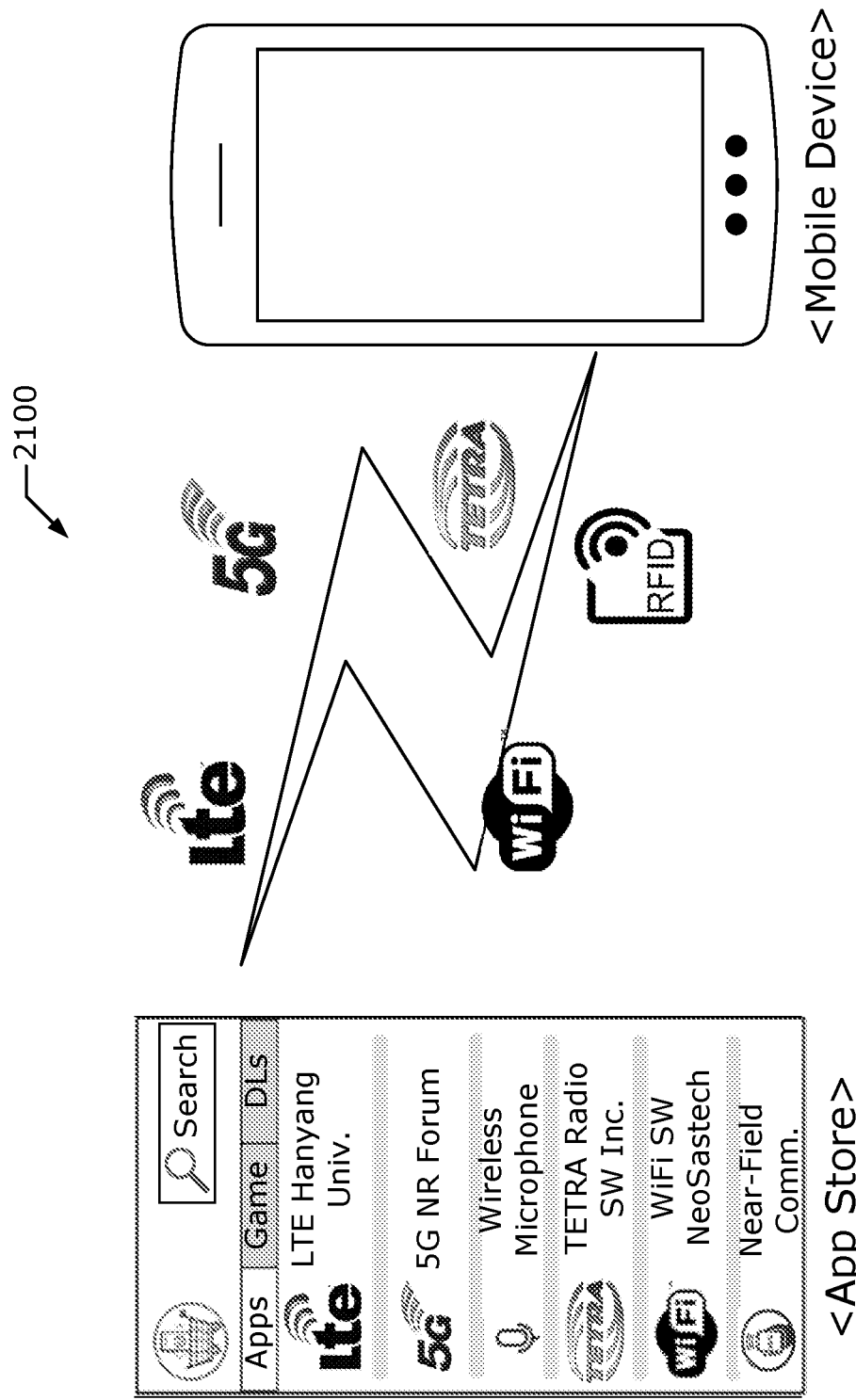
FIG. 21 illustrates an example smartphone reconfiguration use case according to various embodiments.

FIG. 21 shows an example smartphone reconfiguration use case 2100 according to various embodiments. In today's world, the usage of smartphone apps is ubiquitous. These applications, however, typically provide new tools or games to the end-user without altering any radio parameters. The ETSI software reconfiguration solution provides a framework for introducing RadioApps, which are applications that extend or modify existing radio features and define solutions for technical, certification and security needs.

Such RadioApps will be used to optimize the operation of a smartphone in general or for usage in a specific market with special needs. In a typical example of case i) Radio-Apps will be used to optimize the operation of a smartphone in response to the introduction of new features on the network side as they evolve in future releases of the 3GPP standard. In addition, the optimum configuration is identified (e.g., new power-efficient modulation and coding schemes, etc.) to meet power efficiency (see e.g., Siaud et al., "Green-oriented multi-techno link adaptation metrics for 5G heterogeneous networks", EURASIP J Wireless Com Networking, 2016, Art. No. 92, pp. 1-13 (1 Apr. 2016), available at: https://doi.org/10.1186/s13638-016-0588-2), predictable QoS and other requirements. To give an example of specific market usages, in an industrial environment, new mechanisms may be added through software reconfiguration taking the specific characteristics of the usage environment into account. Beyond the provisioning of additional modules, the ETSI framework also allows for the replacement of entire RATs in cases where sufficient computational resources are available.

4.2. Use Case 2—Automotive Applications

Automotive communication is currently a key trend in the industry. Solutions for Vehicle-to-Everything (V2X) communications, including Vehicle-to-Vehicle (V2V), Vehicle-to-Infrastructure (V2I), etc., are currently being developed with the objective to guarantee a safe(r) driving environment for the future. The challenge is to ensure that a radio communications component remains relevant over the entire lifetime of a vehicle, i.e. ten years and beyond. It is almost certain that a V2X framework feature-set will evolve within this period. Software reconfiguration will enable manufacturers to replace specific software and thus maintain related feature-sets up to date without requiring changes to the hardware. This approach reduces the overall cost for change since a vehicle does not need to be upgraded by an authorized dealer (as it would be required for hardware changes), but the process is handled through over-the-air remote control.

4.3. Use Case 3—Radio Access Network (Ran) Reconfiguration

With the evolution of wireless standards, network functions need to be updated. In this use case, the installation of RadioApps can be used to provide updated or new features which address the radio characteristics of the network. Network functions are distributed across a variety of physical entities which all require dedicated software updates for the provisioning of a specific new service. Such equipment may then be further connected to a larger network, for example through wireless or cabled backbone network access. In this use case, the network operator is able to alter or extend the functionalities of this equipment through installation of suitable RadioApps.

4.4. Use Case 4—Internet-of-Things Device Reconfiguration

Future IoT devices, including 5G and beyond, will address a substantial variety of use cases, encompassing for example gaming, voice communication, medical applications, industrial automation, etc. Each such application has its particular needs in terms of features, form factors, etc. Due to quasi-infinite possibilities, it is unlikely that chipmakers will offer tailored components for each application. Rather, a limited number of generic and reconfigurable components will be made available which are suitably tailored to the target market through software components. The ETSI software reconfiguration solution provides a suitable ecosystem to support the future IoT market needs.

4.5. Use Case 5—Radio Reconfiguration Through an External Component (e.g., USB Stick)

This use case concerns standalone radio external components that embed all the capabilities necessary to radio processing. The host device is not involved in radio processing but may configure operational parameters as allowed by the external component (e.g., a USB Stick). Thus, the separation between the host device and the external component is clear and embodied by the physical interface between the two. On the host device, only a device driver is necessary to operate the external component and integrate it into the networking stack. In order to reconfigure the external component, the host device may be used as a staging area to store Radio Applications which are then loaded on the external component via the device driver (e.g., the device driver may leverage the Administrator).

4.6. Use Case 6—Reconfigurable Satellite Telecom Payload

Figure 22:
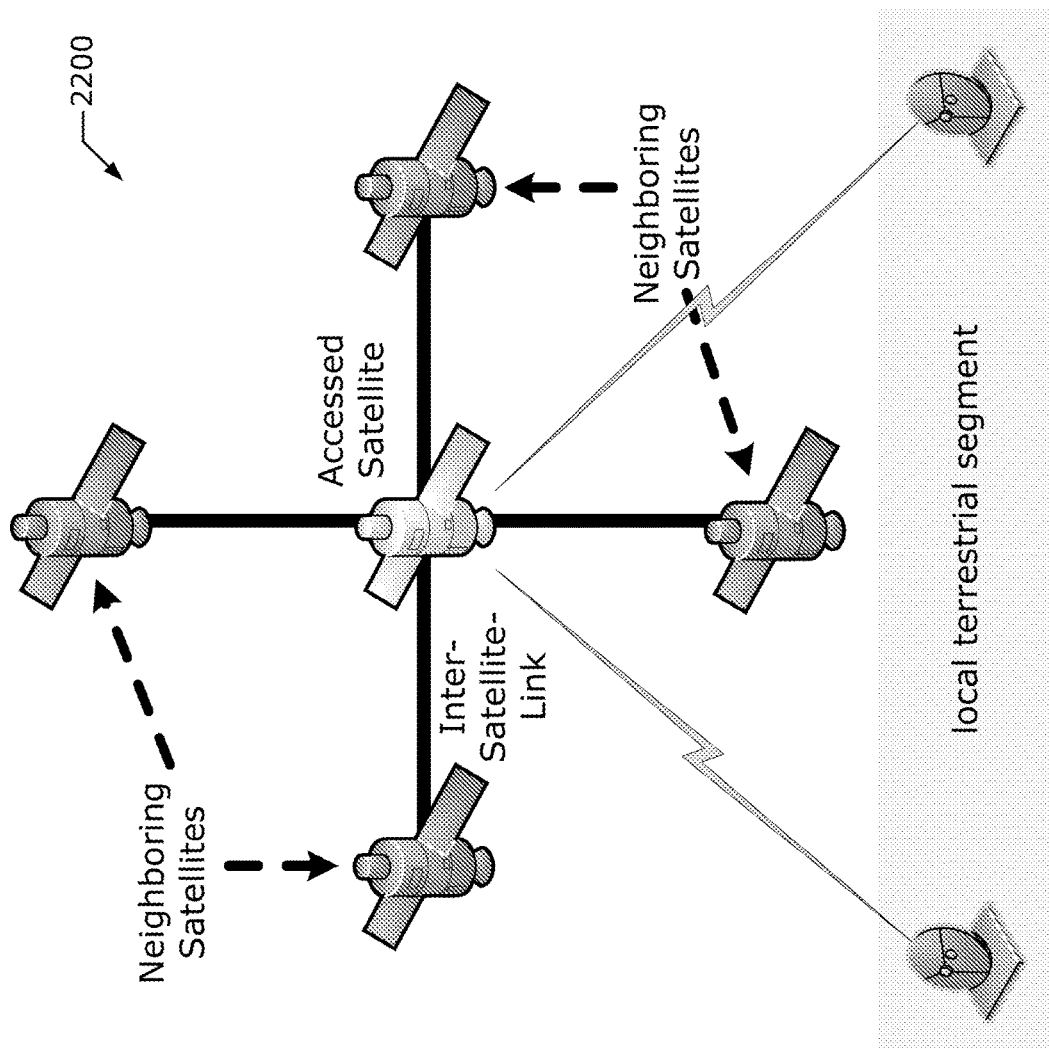
FIG. 22 illustrates an example of software reconfiguration enabling satellite telecom payload according to various embodiments.

FIG. 22 shows an example of software reconfiguration enabling satellite telecom payload according to various embodiments. The lifetime of satellites varies from a few years for Low Earth Orbiting (LEO) satellites until 10 or even 15 years for Geostationary Earth Orbit (GEO) satellites. This fact and the rapid progress in the field of digital communications raise the problem of technological obsolescence of onboard telecom payload. The emergence of new signal processing algorithms and new standards that provide reliable and high-speed transmission of information requires the reconfiguration of the onboard equipment. Satellite communication systems are considered as a part of the global network infrastructure with the integrated satellite segment. Therefore, they should be provisioned within the same management framework as the terrestrial segment, including the management approach for radio software reconfiguration.

4.7 Use Case 7—Bug-Fix and Security Updates

Bug-fixes and security updates are essential to the maintenance of software, and as such also for a Radio Application throughout its lifecycle. Bug-fixes help ensure that Radio Applications will behave according to specification even after the Radio Application has been installed on a device. Security updates help ensure the integrity of an implementation. Application security is an evolving field and implementations believed to be secure at some point in time may later become insecure as new attack methods are devised.

4.8. Use Case 8—Medical Applications

Medical applications, such as remote surgery, monitoring of patient's life support data, etc. require highly reliable and stable communication systems. Still, software reconfiguration is expected to be broadly applied in order to enable users to have access to latest software updates and best possible functionalities. For example, in this context it is of specific importance to immediately remedy any incorrect behavior or security vulnerabilities in order to ensure a maximum level of protection.

4.9. Radio Equipment Directive Aspects

The DIRECTIVE 2014/53/EU OF THE EUROPEAN PARLIAMENT AND OF THE COUNCIL of 16 Apr. 2014 on the harmonization of the laws of the Member States relating to the making available on the market of radio equipment and repealing Directive 1999/5/EC (hereinafter the "Radio Equipment Directive" or "[RED]") establishes a European Union (EU) regulatory framework for placing radio equipment (RE) on the market. The [RED] ensures a single market for RE by setting essential requirements for safety and health, electromagnetic compatibility, and the efficient use of the radio spectrum. The RED also provides the basis for further regulation governing some additional aspects. These include technical features for the protection of privacy, and protection of personal data and against fraud. Furthermore, additional aspects cover interoperability, access to emergency services, and compliance regarding the combination of RE and software. [RED] Article 3 Requirements are not yet "activated". This "activation" requires a Delegated Act and possibly an Implementing Act by the European Commission. The European Commission has created an Expert Group which is working towards the implementation of the sub-articles of [RED] Article 3.

The embodiments herein are related to various aspects of the [RED], where compliance with the [RED] requires the implementation of the embodiments discussed herein. In particular, [RED] Article 3(3)(1) requires the combination of software and hardware to be compliant with the [RED]. This means that the manner in which each platform in the European market processes software needs to be known and/or discoverable. Using the RVM approaches outlined in the present disclosure allows regulators or compliance testers to determine whether the combination of software and hardware of a particular platform is operating correctly based only on the knowledge of how the platform processes software. These embodiments may be useful if, for example, the ETSI EN 303 681 series is taken as a baseline for the implementation of the [RED].

5. Example Edge Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

Internet of Things (IoT) devices are physical or virtualized objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated. The deployment of IoT devices and Multi-access Edge Computing (MEC) services have introduced a number of advanced use cases and scenarios occurring at or otherwise involving the edge of the network.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

The present disclosure provides specific examples relevant to edge computing configurations provided within Multi-Access Edge Computing (MEC) and 5G network implementations. However, many other standards and network implementations are applicable to the edge and service management concepts discussed herein. For example, the embodiments discussed herein may be applicable to many other edge computing/networking technologies in various combinations and layouts of devices located at the edge of a network. Examples of such other edge computing/networking technologies that may implement the embodiments herein include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

Figure 23:
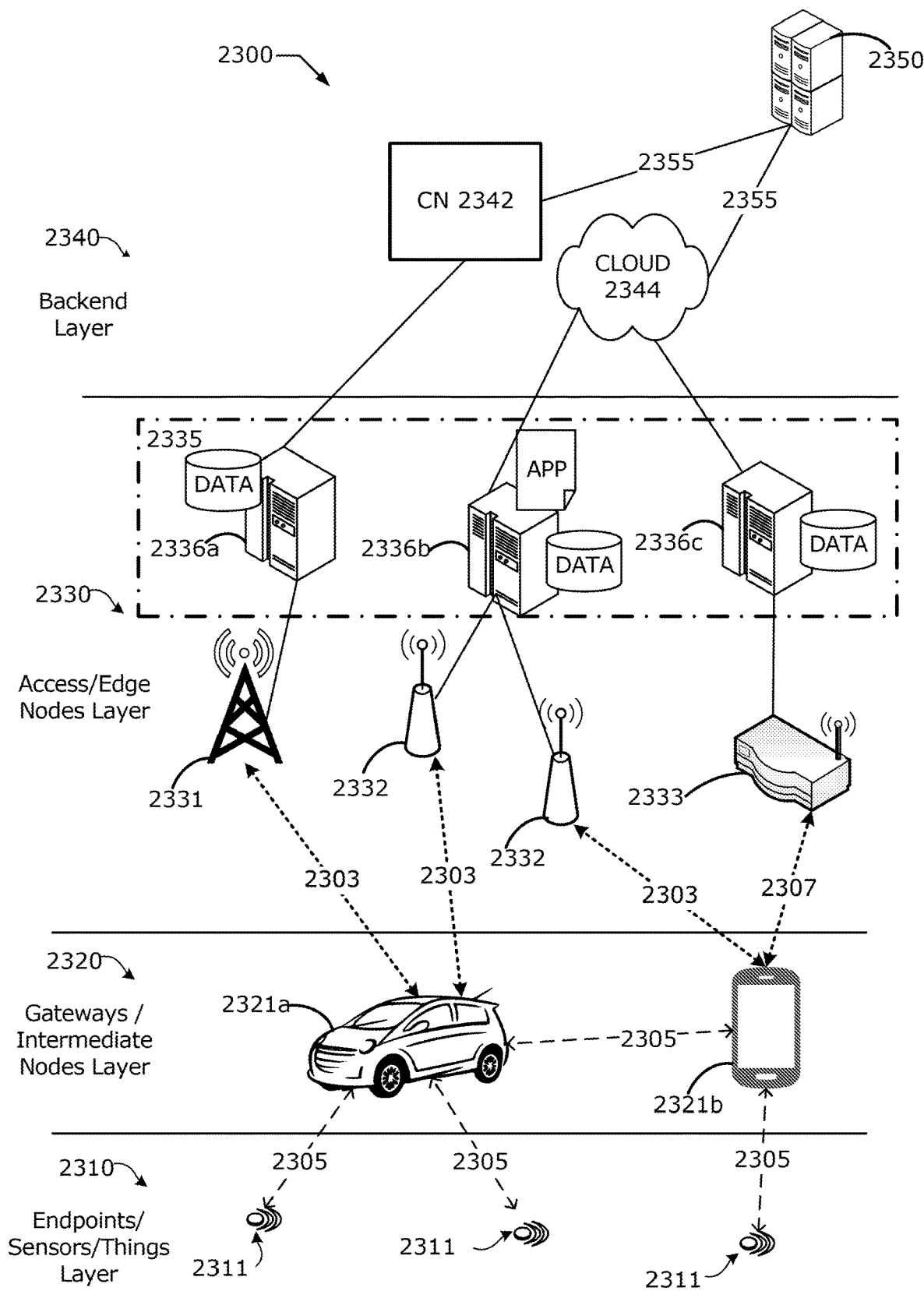
FIG. 23 illustrates an example edge computing environment in accordance with various embodiments.

FIG. 23 illustrates an example edge computing environment 2300 in accordance with various embodiments. FIG. 23 specifically illustrates the different layers of communication occurring within the environment 2300, starting from endpoint sensors or things layer 2310 (e.g., operating in an Internet of Things (IoT) network topology) comprising one or more IoT devices 2311 (also referred to as edge endpoints 2310 or the like); increasing in sophistication to gateways or intermediate node layer 2320 comprising one or more user equipment (UEs) 2321a and 2321b (also referred to as intermediate nodes 2320 or the like), which facilitate the collection and processing of data from endpoints 2310; increasing in processing and connectivity sophistication to access node layer 2330 (or "edge node layer 2330") comprising a plurality of network access nodes (NANs) 2331, 2332, and 2333 (collectively referred to as "NANs 2331-2333" or the like) and a plurality of edge compute nodes 2336a-c (collectively referred to as "edge compute nodes 2336" or the like) within an edge computing system 2335; and increasing in connectivity and processing sophistication to a backend layer 2310 comprising core network (CN) 2342 and cloud 2344. The processing at the backend layer 2310 may be enhanced by network services as performed by a remote application server 2350 and/or other cloud services. Some or all of these elements may be equipped with or otherwise implement some or all aspects of the various embodiments discussed herein.

The environment 2300 is shown to include end-user devices, such as intermediate nodes 2320 and endpoints 2310, which are configured to connect to (or communicatively couple with) one or more multiple communication networks (also referred to as "access networks," "radio access networks," or the like) based on different access technologies (or "radio access technologies") for accessing application services. These access networks may include one or more of NANs 2331, 2332, and/or 2333. The NANs 2331-2333 are arranged to provide network connectivity to the end-user devices via respective links 2303, 2307 between the individual NANs and the one or more UEs 2311, 2321.

As examples, the communication networks and/or access technologies may include cellular technology such as LTE, MuLTEfire, and/or NR/5G (e.g., as provided by Radio Access Network (RAN) node 2331 and/or RAN nodes 2332), WiFi or wireless local area network (WLAN) technologies (e.g., as provided by access point (AP) 2333 and/or RAN nodes 2332), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 2320 include UE 2321a and UE 2321b (collectively referred to as "UE 2321" or "UEs 2321"). In this example, the UE 2321a is illustrated as a vehicle UE, and UE 2321b is illustrated as a smartphone (e.g., handheld touchscreen mobile computing device connectable to one or more cellular networks). However, these UEs 2321 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 2310 include UEs 2311, which may be IoT devices (also referred to as "IoT devices 2311"), which are uniquely identifiable embedded computing devices (e.g., within the Internet infrastructure) that comprise a network access layer designed for low-power IoT applications utilizing short-lived UE connections. The IoT devices 2311 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 2311 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 2311 can utilize technologies such as M2M or MTC for exchanging data with an MTC server (e.g., a server 2350), an edge server 2336 and/or edge computing system 2335, or device via a PLMN, ProSe or D2D communication, sensor networks, or IoT networks. The M2M or MTC exchange of data may be a machine-initiated exchange of data.

The IoT devices 2311 may execute background applications (e.g., keep-alive messages, status updates, etc.) to facilitate the connections of the IoT network. Where the IoT devices 2311 are, or are embedded in, sensor devices, the IoT network may be a WSN. An IoT network describes an interconnecting IoT UEs, such as the IoT devices 2311 being connected to one another over respective direct links 2305. The IoT devices may include any number of different types of devices, grouped in various combinations (referred to as an "IoT group") that may include IoT devices that provide one or more services for a particular user, customer, organizations, etc. A service provider (e.g., an owner/operator of server 2350, CN 2342, and/or cloud 2344) may deploy the IoT devices in the IoT group to a particular area (e.g., a geolocation, building, etc.) in order to provide the one or more services. In some implementations, the IoT network may be a mesh network of IoT devices 2311, which may be termed a fog device, fog system, or fog, operating at the edge of the cloud 2344. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 2344 to Things (e.g., IoT devices 2311). The fog may be established in accordance with specifications released by the OFC, the OCF, among others. In some embodiments, the fog may be a tangle as defined by the IOTA foundation.

The fog may be used to perform low-latency computation/aggregation on the data while routing it to an edge cloud computing service (e.g., edge nodes 2330) and/or a central cloud computing service (e.g., cloud 2344) for performing heavy computations or computationally burdensome tasks. On the other hand, edge cloud computing consolidates human-operated, voluntary resources, as a cloud. These voluntary resource may include, inter-alia, intermediate nodes 2320 and/or endpoints 2310, desktop PCs, tablets, smartphones, nano data centers, and the like. In various implementations, resources in the edge cloud may be in one to two-hop proximity to the IoT devices 2311, which may result in reducing overhead related to processing data and may reduce network delay.

In some embodiments, the fog may be a consolidation of IoT devices 2311 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

In embodiments, the fog may operate at the edge of the cloud 2344. The fog operating at the edge of the cloud 2344 may overlap or be subsumed into an edge network 2330 of the cloud 2344. The edge network of the cloud 2344 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 2336 or edge devices). The Fog layer resides on top of the edge layer and is a consolidation of networking devices such as the intermediate nodes 2320 and/or endpoints 2310 of FIG. 23.

Data may be captured, stored/recorded, and communicated among the IoT devices 2311 or, for example, among the intermediate nodes 2320 and/or endpoints 2310 that have direct links 2305 with one another as shown by FIG. 23. Analysis of the traffic flow and control schemes may be implemented by aggregators that are in communication with the IoT devices 2311 and each other through a mesh network. The aggregators may be a type of IoT device 2311 and/or network appliance. In the example of FIG. 23, the aggregators may be edge nodes 2330, or one or more designated intermediate nodes 2320 and/or endpoints 2310. Data may be uploaded to the cloud 2344 via the aggregator, and commands can be received from the cloud 2344 through gateway devices that are in communication with the IoT devices 2311 and the aggregators through the mesh network. Unlike the traditional cloud computing model, in some implementations, the cloud 2344 may have little or no computational capabilities and only serves as a repository for archiving data recorded and processed by the fog. In these implementations, the cloud 2344 centralized data storage system and provides reliability and access to data by the computing resources in the fog and/or edge devices. Being at the core of the architecture, the Data Store of the cloud 2344 is accessible by both Edge and Fog layers of the aforementioned edge-fog network.

As mentioned previously, the access networks provide network connectivity to the end-user devices 2320, 2310 via respective NANs 2331-2333. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. In some embodiments, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. In these embodiments, the CRAN, CR, or vBBUP may implement a RAN function split, wherein one or more communication protocol layers are operated by the CRAN/CR/vBBUP and other communication protocol entities are operated by individual RAN nodes 2331, 2332. This virtualized framework allows the freed-up processor cores of the NANs 2331, 2332 to perform other virtualized applications, such as virtualized applications for the various embodiments discussed herein.

The UEs 2321, 2311 may utilize respective connections (or channels) 2303, each of which comprises a physical communications interface or layer. The connections 2303 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. In some embodiments, the UEs 2311, 2321 and the NANs 2331-2333 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 2311, 2321 and NANs 2331-2333 may operate using LAA, enhanced LAA (eLAA), and/or further eLAA (feLAA) mechanisms. The UEs 2321, 2311 may further directly exchange communication data via respective direct links 2305, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

In various embodiments, individual UEs 2321, 2311 provide radio information to one or more MEC Hosts 2336 in response to a trigger event and/or on a periodic basis. In some embodiments, individual UEs 2321, 2311 report radio information either at a low periodicity or a high periodicity depending on a data transfer that is to take place, and/or other information about the data transfer. The radio information may be in the form of one or more measurement reports, and/or may include, for example, signal strength measurements, signal quality measurements, and/or the like. Each measurement report is tagged with a timestamp and the location of the measurement (e.g., the UEs 2321, 2311 current location). As examples, the measurements collected by the vUEs and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), e2e delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/NO), energy per bit to interference power density ratio (Ec/I0), peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between an AP or RAN node reference time and a GNSS-specific reference time for a given GNSS), GNSS code measurements (e.g., The GNSS code phase (integer and fractional parts) of the spreading code of the GNSS satellite signal), GNSS carrier phase measurements (e.g., the number of carrier-phase cycles (integer and fractional parts) of the GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v15.3.0 (2018 Sep. 27) ("[TS36214]"), 3GPP TS 38.215 v15.4.0 (2019 Jan. 11) ("[TS38215]"), IEEE 802.11, Part 11: "Wireless LAN Medium Access Control (MAC) and Physical Layer (PHY) specifications, IEEE Std." ("[IEEE80211]"), and/or the like. Additionally or alternatively, any of the aforementioned measurements (or combination of measurements) may be collected by one or more NANs and provided to the MEC Host. In these embodiments, the MEC Host may request the measurements from the NANs at low or high periodicity, or the NANs may provide the measurements to the MEC Host at low or high periodicity. Additionally or alternatively, the MEC host may obtain other relevant data from other MEC Hosts, core network functions, and/or other vUEs, for determining the QoS predictions and/or generating the composite information. For example, other Key Performance Indicators (KPIs) may be collected from other MEC hosts via suitable MEC APIs and/or from core network functions via network exposure functions, and used for predicting the QoS along the planned route and/or generating composite information (discussed infra). Additionally or alternatively, the vUEs may obtain the other relevant information, and provide this information to the MEC Host with the measurement reports or separately from the measurement reports.

The UE 2321b is shown to be configured to access an access point (AP) 2333 via a connection 2307. In this example, the AP 2333 is shown to be connected to the Internet without connecting to the CN 2342 of the wireless system. The connection 2307 can comprise a local wireless connection, such as a connection consistent with any IEEE 802.11 protocol, wherein the AP 2333 would comprise a wireless fidelity (WiFi®) router. In embodiments, the UEs 2321 and IoT devices 2311 can be configured to communicate using suitable communication signals with each other or with any of the AP 2333 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the embodiments is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 2331 and 2332 that enable the connections 2303 may be referred to as "RAN nodes" or the like. The RAN nodes 2331, 2332 may comprise ground stations (e.g., terrestrial access points) or satellite stations providing coverage within a geographic area (e.g., a cell). The RAN nodes 2331, 2332 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 2331 is embodied as a NodeB, evolved NodeB (eNB), or a next generation NodeB (gNB), and the RAN nodes 2332 are embodied as relay nodes, distributed units, or Road Side Unites (RSUs). Any other type of NANs can be used.

Any of the RAN nodes 2331, 2332 can terminate the air interface protocol and can be the first point of contact for the UEs 2321 and IoT devices 2311. In some embodiments, any of the RAN nodes 2331/2332 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc. In embodiments, the UEs 2311, 2321 can be configured to communicate using OFDM communication signals with each other or with any of the NANs 2331, 2332 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the embodiments is not limited in this respect.

For most cellular communication systems, the RAN function(s) operated by the RAN or individual NANs 2331-2332 organize downlink transmissions (e.g., from any of the RAN nodes 2331, 2332 to the UEs 2311, 2321) and uplink transmissions (e.g., from the UEs 2311, 2321 to RAN nodes 2331, 2332) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 2311, 2321 at each transmission time interval (TTI). A TTI is the duration of a transmission on a radio link 2303, 2305, and is related to the size of the data blocks passed to the radio link layer from higher network layers.

The NANs 2331/2332 may be configured to communicate with one another via respective interfaces or links (not shown), such as an X2 interface for LTE implementations (e.g., when CN 2342 is an Evolved Packet Core (EPC)), an Xn interface for 5G or NR implementations (e.g., when CN 2342 is an Fifth Generation Core (5GC)), or the like. The NANs 2331 and 2332 are also communicatively coupled to CN 2342. In embodiments, the CN 2342 may be an evolved packet core (EPC) network, a NextGen Packet Core (NPC) network, a 5G core (5GC), or some other type of CN. The CN 2342 may comprise a plurality of network elements, which are configured to offer various data and telecommunications services to customers/subscribers (e.g., users of UEs 2321 and IoT devices 2311) who are connected to the CN 2342 via a RAN. The components of the CN 2342 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above-described network node functions via executable instructions stored in one or more computer-readable storage mediums (described in further detail infra). A logical instantiation of the CN 2342 may be referred to as a network slice, and a logical instantiation of a portion of the CN 2342 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 2342 components/functions.

The CN 2342 is shown to be communicatively coupled to an application server 2350 and a network 2350 via an IP communications interface 2355. the one or more server(s) 2350 comprise one or more physical and/or virtualized systems for providing functionality (or services) to one or more clients (e.g., UEs 2321 and IoT devices 2311) over a network. The server(s) 2350 may include various computer devices with rack computing architecture component(s), tower computing architecture component(s), blade computing architecture component(s), and/or the like. The server(s) 2350 may represent a cluster of servers, a server farm, a cloud computing service, or other grouping or pool of servers, which may be located in one or more datacenters. The server(s) 2350 may also be connected to, or otherwise associated with one or more data storage devices (not shown). Moreover, the server(s) 2350 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 2350 offer applications or services that use IP/network resources. As examples, the server(s) 2350 may provide traffic management services, cloud analytics, content streaming services, immersive gaming experiences, social networking and/or microblogging services, and/or other like services. In addition, the various services provided by the server(s) 2350 may include initiating and controlling software and/or firmware updates for applications or individual components implemented by the UEs 2321 and IoT devices 2311. The server(s) 2350 can also be configured to support one or more communication services (e.g., Voice-over-Internet Protocol (VoIP) sessions, PTT sessions, group communication sessions, social networking services, etc.) for the UEs 2321 and IoT devices 2311 via the CN 2342.

The cloud 2344 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 2344 include application capabilities type, infrastructure capabilities type, and platform capabilities type. A cloud capabilities type is a classification of the functionality provided by a cloud service to a cloud service customer (e.g., a user of cloud 2344), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 2344 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

In some embodiments, the cloud 2344 may represent a network such as the Internet, a local area network (LAN) or a wide area network (WAN) including proprietary and/or enterprise networks for a company or organization, or combinations thereof. The cloud 2344 may be a network that comprises computers, network connections among the computers, and software routines to enable communication between the computers over network connections. In this regard, the cloud 2344 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 2344 may be via a wired or a wireless connection using the various communication protocols discussed infra. More than one network may be involved in a communication session between the illustrated devices. Connection to the cloud 2344 may require that the computers execute software routines which enable, for example, the seven layers of the OSI model of computer networking or equivalent in a wireless (cellular) phone network. Cloud 2344 may be used to enable relatively long-range communication such as, for example, between the one or more server(s) 2350 and one or more UEs 2321 and IoT devices 2311. In some embodiments, the cloud 2344 may represent the Internet, one or more cellular networks, local area networks, or wide area networks including proprietary and/or enterprise networks, TCP/Internet Protocol (IP)-based network, or combinations thereof. In such embodiments, the cloud 2344 may be associated with network operator who owns or controls equipment and other elements necessary to provide network-related services, such as one or more base stations or access points, one or more servers for routing digital data or telephone calls (e.g., a core network or backbone network), etc. The backbone links 2355 may include any number of wired or wireless technologies, and may be part of a LAN, a WAN, or the Internet. In one example, the backbone links 2355 are fiber backbone links that couple lower levels of service providers to the Internet, such as the CN 2312 and cloud 2344.

In embodiments, the edge compute nodes 2336 may include or be part of an edge system 2335 (or edge network 2335). The edge compute nodes 2336 may also be referred to as "edge hosts 2336" or "edge servers 2336." The edge system 2335 includes a collection of edge servers 2336 (e.g., MEC hosts/servers 2336-1 and 2336-2 of Figure XP1) and edge management systems (not shown by FIG. 23) necessary to run edge computing applications (e.g., MEC Apps XP136 of Figure XP1) within an operator network or a subset of an operator network. The edge servers 2336 are physical computer systems that may include an edge platform (e.g., MEC platform XP137 of Figure XP1) and/or virtualization infrastructure (e.g., VI XP138 of Figure XP1), and provide compute, storage, and network resources to edge computing applications. Each of the edge servers 2336 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 2320 and/or endpoints 2310. The VI of the edge servers 2336 provide virtualized environments and virtualized resources for the edge hosts, and the edge computing applications may run as VMs and/or application containers on top of the VI. One example implementation of the edge system 2335 is a MEC system 2335, which is discussed in more detail infra with respect to Figures XP1-XP2. It should be understood that the disclosed MEC systems and services deployment examples are only one illustrative example of edge computing systems/networks 2335, and that the example embodiments discussed herein may be applicable to many other edge computing/networking technologies in various combinations and layouts of devices located at the edge of a network. Examples of such other edge computing/networking technologies that may implement the embodiments herein include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

As shown by FIG. 23, each of the NANs 2331, 2332, and 2333 are co-located with edge compute nodes (or "edge servers") 2336a, 2336b, and 2336c, respectively. These implementations may be small-cell clouds (SCCs) where an edge compute node 2336 is co-located with a small cell (e.g., pico-cell, femto-cell, etc.), or may be mobile micro clouds (MCCs) where an edge compute node 2336 is co-located with a macro-cell (e.g., an eNB, gNB, etc.). The edge compute node 2336 may be deployed in a multitude of arrangements other than as shown by FIG. 23. In a first example, multiple NANs 2331-2333 are co-located or otherwise communicatively coupled with one edge compute node 2336. In a second example, the edge servers 2336 may be co-located or operated by RNCs, which may be the case for legacy network deployments, such as 3G networks. In a third example, the edge servers 2336 may be deployed at cell aggregation sites or at multi-RAT aggregation points that can be located either within an enterprise or used in public coverage areas. In a fourth example, the edge servers 2336 may be deployed at the edge of CN 2342. These implementations may be used in follow-me clouds (FMC), where cloud services running at distributed data centers follow the UEs 2321 as they roam throughout the network.

In any of the aforementioned embodiments and/or implementations, the edge servers 2336 provide a distributed computing environment for application and service hosting, and also provide storage and processing resources so that data and/or content can be processed in close proximity to subscribers (e.g., users of UEs 2321, 2311) for faster response times The edge servers 2336 also support multi-tenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 2336 from the UEs 2311/2321, CN 2342, cloud 2344, and/or server(s) 2350, or vice versa. For example, a device application or client application operating in a UE 2321/2311 may offload application tasks or workloads to one or more edge servers 2336. In another example, an edge server 2336 may offload application tasks or workloads to one or more UE 2321/2311 (e.g., for distributed ML computation or the like).

Figure 24:
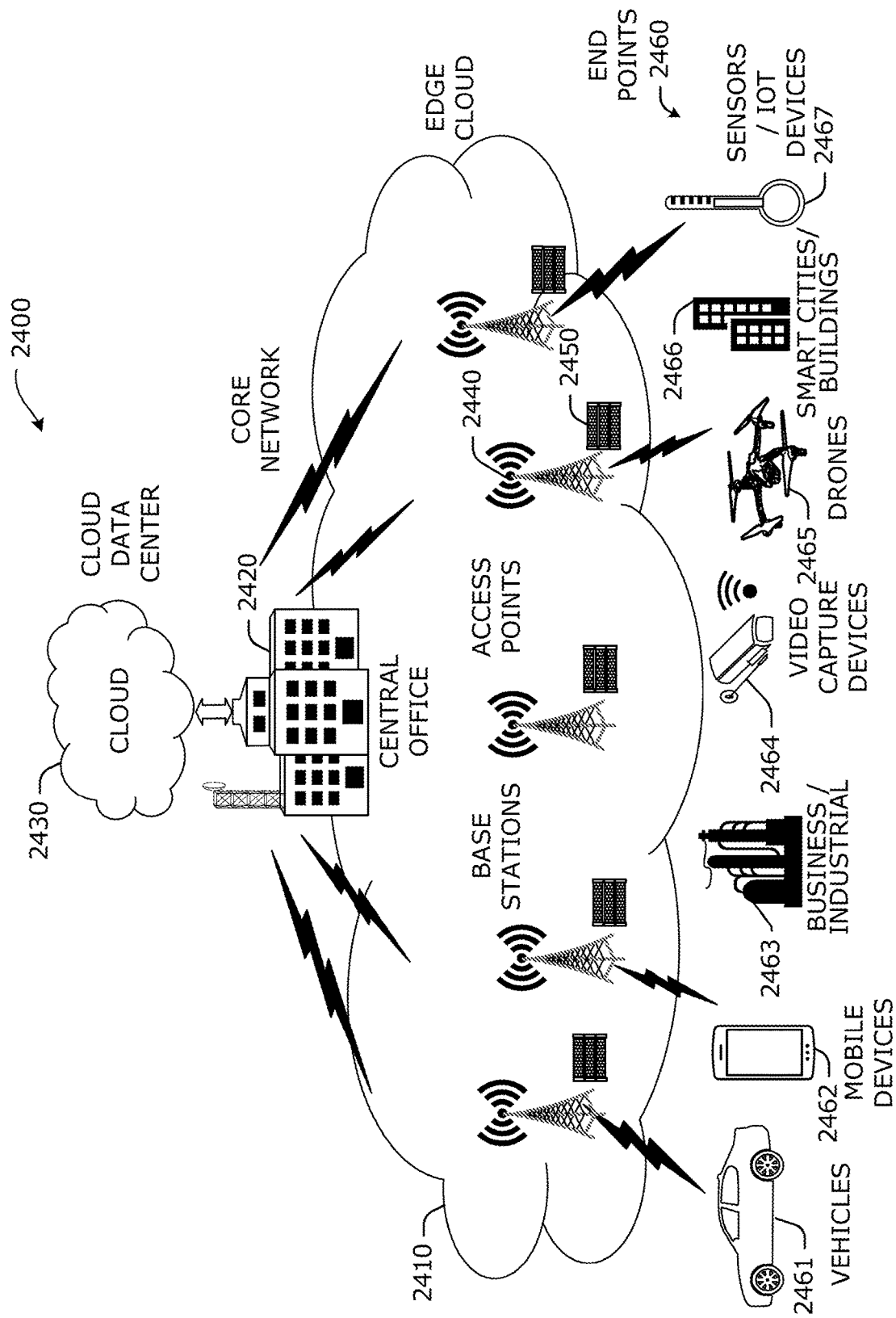
FIG. 24 illustrates an overview of an edge cloud configuration for edge computing.

FIG. 24 is a block diagram 2400 showing an overview of a configuration for edge computing, which includes a layer of processing referred to in many of the following examples as an "edge cloud". An "Edge Cloud" may refer to an interchangeable cloud ecosystem encompassing storage and compute assets located at a network's edge and interconnected by a scalable, application-aware network that can sense and adapt to changing needs, in real-time, and in a secure manner. An Edge Cloud architecture is used to decentralize computing resources and power to the edges of one or more networks (e.g., end point devices and/or intermediate nodes such as client devices/UEs). Traditionally, the computing power of servers is used to perform tasks and create distributed systems. Within the cloud model, such intelligent tasks are performed by servers (e.g., in a data center) so they can be transferred to other devices with less or almost no computing power. In the edge cloud 2410, some or all of these processing tasks are shifted to endpoint nodes and intermediate nodes such as client devices, IoT devices, network devices/appliances, and/or the like. It should be noted that an endpoint node may be the end of a communication path in some contexts, while in other contexts an endpoint node may be an intermediate node; similarly, an intermediate node may be the end of a communication path in some contexts, while in other contexts an intermediate node may be an endpoint node.

As shown, the edge cloud 2410 is co-located at an edge location, such as an access point or base station 2440, a local processing hub 2450, or a central office 2420, and thus may include multiple entities, devices, and equipment instances. The edge cloud 2410 is located much closer to the endpoint (consumer and producer) data sources 2460 (e.g., autonomous vehicles 2461, user equipment 2462, business and industrial equipment 2463, video capture devices 2464, drones 2465, smart cities and building devices 2466, sensors and IoT devices 2467, etc.) than the cloud data center 2430. Compute, memory, and storage resources which are offered at the edges in the edge cloud 2410 are critical to providing ultra-low latency response times for services and functions used by the endpoint data sources 2460 as well as reduce network backhaul traffic from the edge cloud 2410 toward cloud data center 2430 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 25:
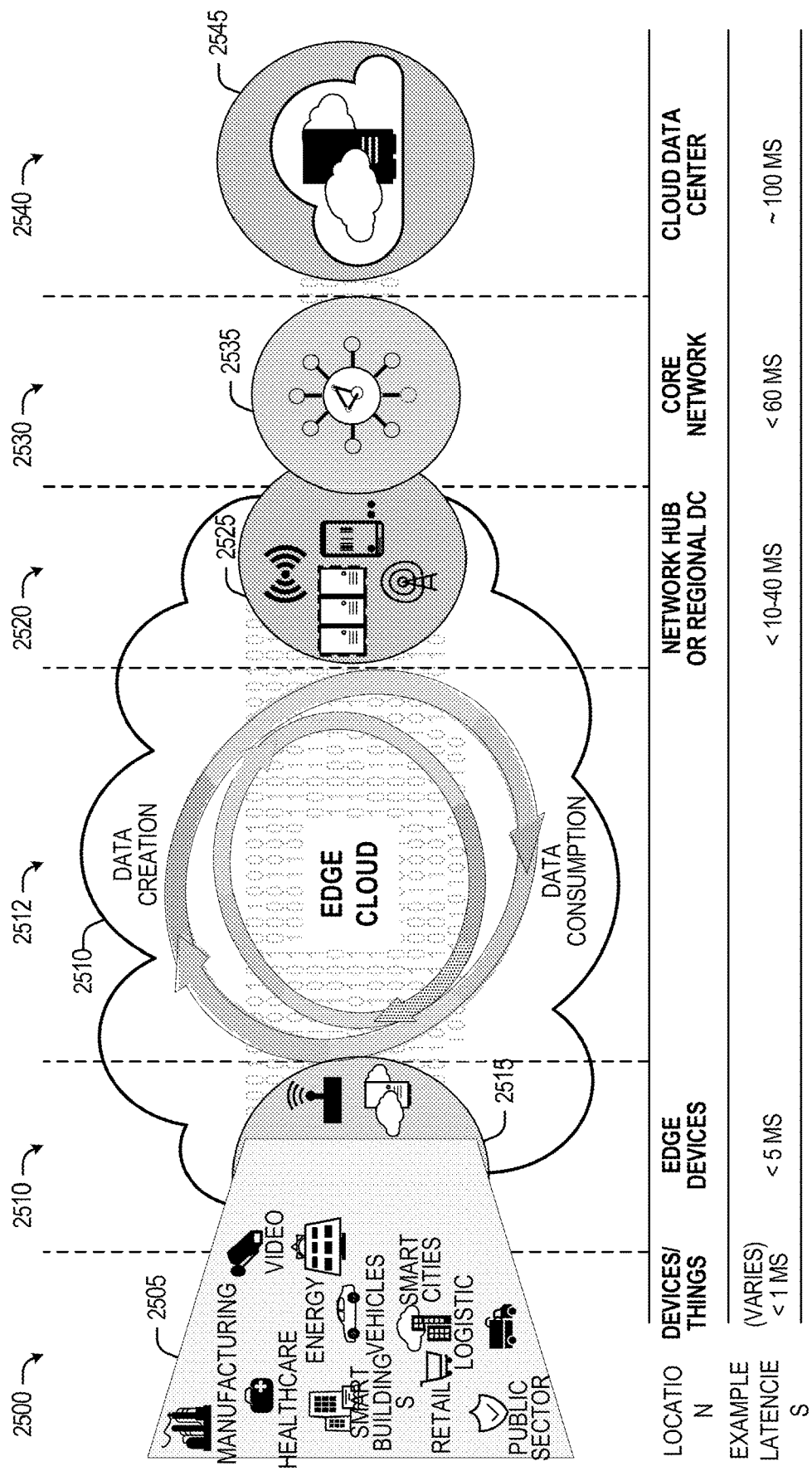
FIG. 25 illustrates operational layers among endpoints, an edge cloud, and cloud computing environments.

FIG. 25 illustrates operational layers among endpoints, an edge cloud, and cloud computing environments. Specifically, FIG. 25 depicts examples of computational use cases 2505, utilizing the edge cloud 2410 among multiple illustrative layers of network computing. The layers begin at an endpoint (devices and things) layer 2500, which accesses the edge cloud 2410 to conduct data creation, analysis, and data consumption activities. The edge cloud 2410 may span multiple network layers, such as an edge devices layer 2510 having gateways, on-premise servers, or network equipment (nodes 2515) located in physically proximate edge systems; a network access layer 2520, encompassing base stations, radio processing units, network hubs, regional data centers (DC), or local network equipment (equipment 2525); and any equipment, devices, or nodes located therebetween (in layer 2512, not illustrated in detail). The network communications within the edge cloud 2410 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 2500, under 5 ms at the edge devices layer 2510, to even between 10 to 40 ms when communicating with nodes at the network access layer 2520. Beyond the edge cloud 2410 are core network 2530 and cloud data center 2540 layers, each with increasing latency (e.g., between 50-60 ms at the core network layer 2530, to 100 or more ms at the cloud data center layer). As a result, operations at a core network data center 2535 or a cloud data center 2545, with latencies of at least 50 to 100 ms or more, will not be able to accomplish many time-critical functions of the use cases 2505. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 2535 or a cloud data center 2545, a central office or content data network may be considered as being located within a "near edge" layer ("near" to the cloud, having high latency values when communicating with the devices and endpoints of the use cases 2505), whereas an access point, base station, on-premise server, or network gateway may be considered as located within a "far edge" layer ("far" from the cloud, having low latency values when communicating with the devices and endpoints of the use cases 2505). It will be understood that other categorizations of a particular network layer as constituting a "close", "local", "near", "middle", or "far" edge may be based on latency, distance, number of network hops, or other measurable characteristics, as measured from a source in any of the network layers 2500-2540.

The various use cases 2505 may access resources under usage pressure from incoming streams, due to multiple services utilizing the edge cloud. To achieve results with low latency, the services executed within the edge cloud 2410 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 2410 may provide the ability to serve and respond to multiple applications of the use cases 2505 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 2410 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 2410 (network layers 2500-2540), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 2410.

As such, the edge cloud 2410 is formed from network components and functional features operated by and within edge gateway nodes, edge aggregation nodes, or other edge compute nodes among network layers 2510-2530. The edge cloud 2410 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 2410 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 2410 may be servers, multi-tenant servers, appliance computing devices, and/or any other type of computing devices. For example, the edge cloud 2410 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIGS. 29-30. The edge cloud 2410 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 26:
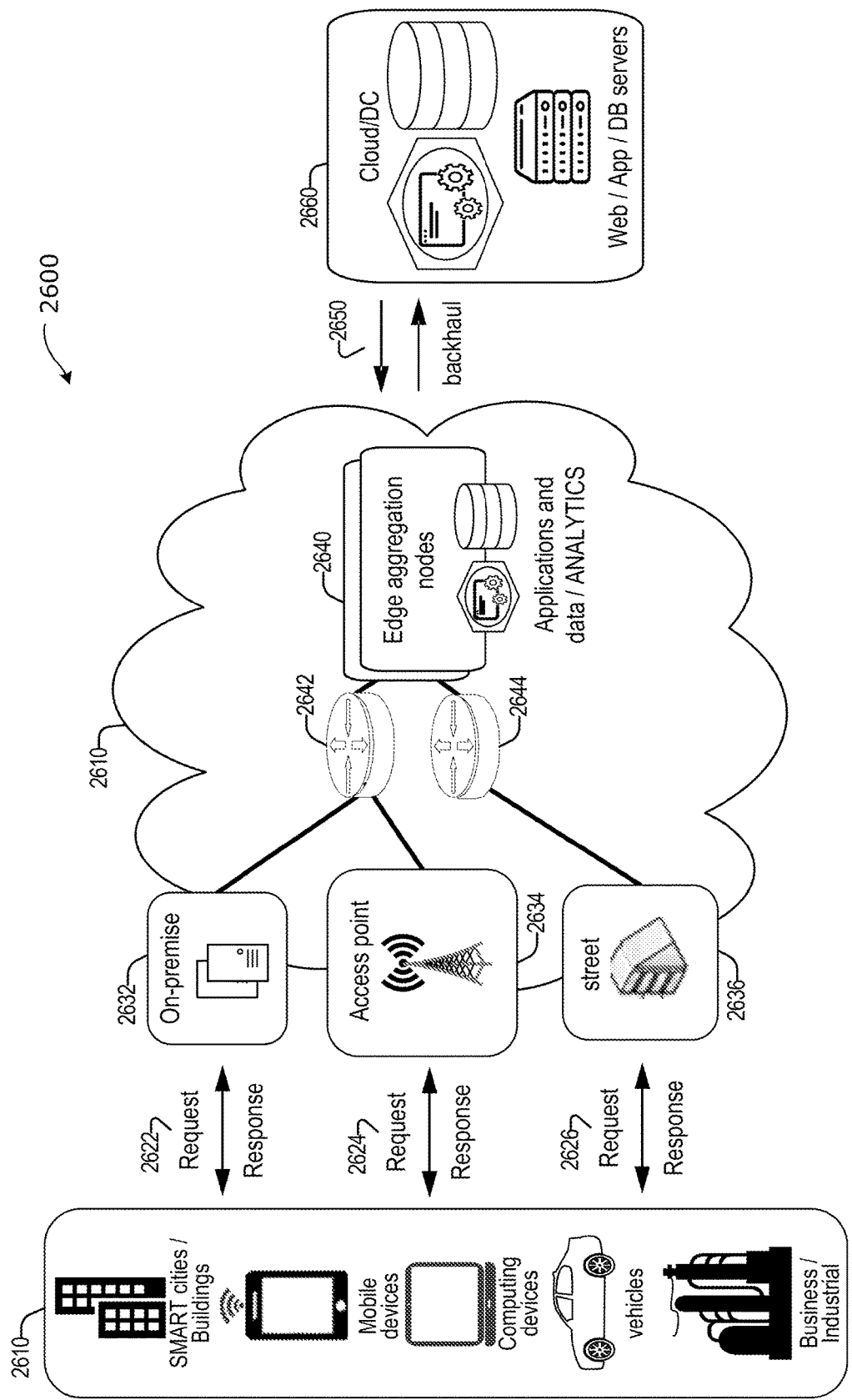
FIG. 26 illustrates an example approach for networking and services in an edge computing system.

In FIG. 26, various client endpoints 2610 (in the form of mobile devices, computers, autonomous vehicles, business computing equipment, industrial processing equipment) exchange requests and responses that are specific to the type of endpoint network aggregation. For instance, client endpoints 2610 may obtain network access via a wired broadband network, by exchanging requests and responses 2622 through an on-premise network system 2632. Some client endpoints 2610, such as mobile computing devices, may obtain network access via a wireless broadband network, by exchanging requests and responses 2624 through an access point (e.g., cellular network tower) 2634. Some client endpoints 2610, such as autonomous vehicles may obtain network access for requests and responses 2626 via a wireless vehicular network through a street-located network system 2636. However, regardless of the type of network access, the TSP may deploy aggregation points 2642, 2644 within the edge cloud 2410 to aggregate traffic and requests. Thus, within the edge cloud 2410, the TSP may deploy various compute and storage resources, such as at edge aggregation nodes 2640, to provide requested content. The edge aggregation nodes 2640 and other systems of the edge cloud 2410 are connected to a cloud or data center 2660, which uses a backhaul network 2650 to fulfill higher-latency requests from a cloud/data center for websites, applications, database servers, etc. Additional or consolidated instances of the edge aggregation nodes 2640 and the aggregation points 2642, 2644, including those deployed on a single server framework, may also be present within the edge cloud 2410 or other areas of the TSP infrastructure.

Figure 27:
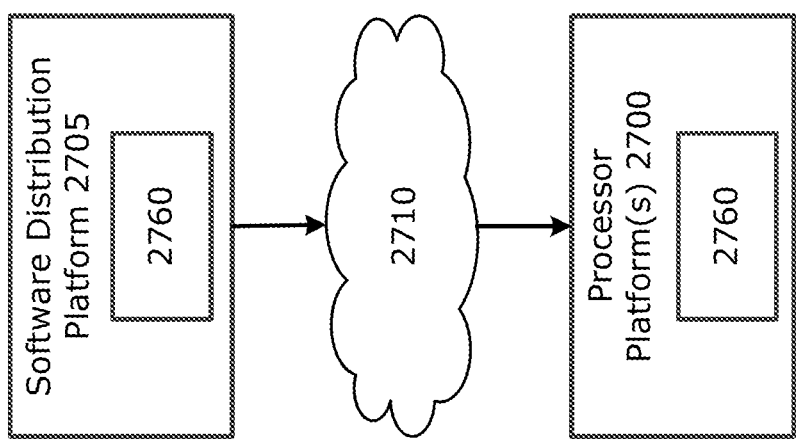
FIG. 27 illustrates an example software distribution platform according to various embodiments.
Figure 30:
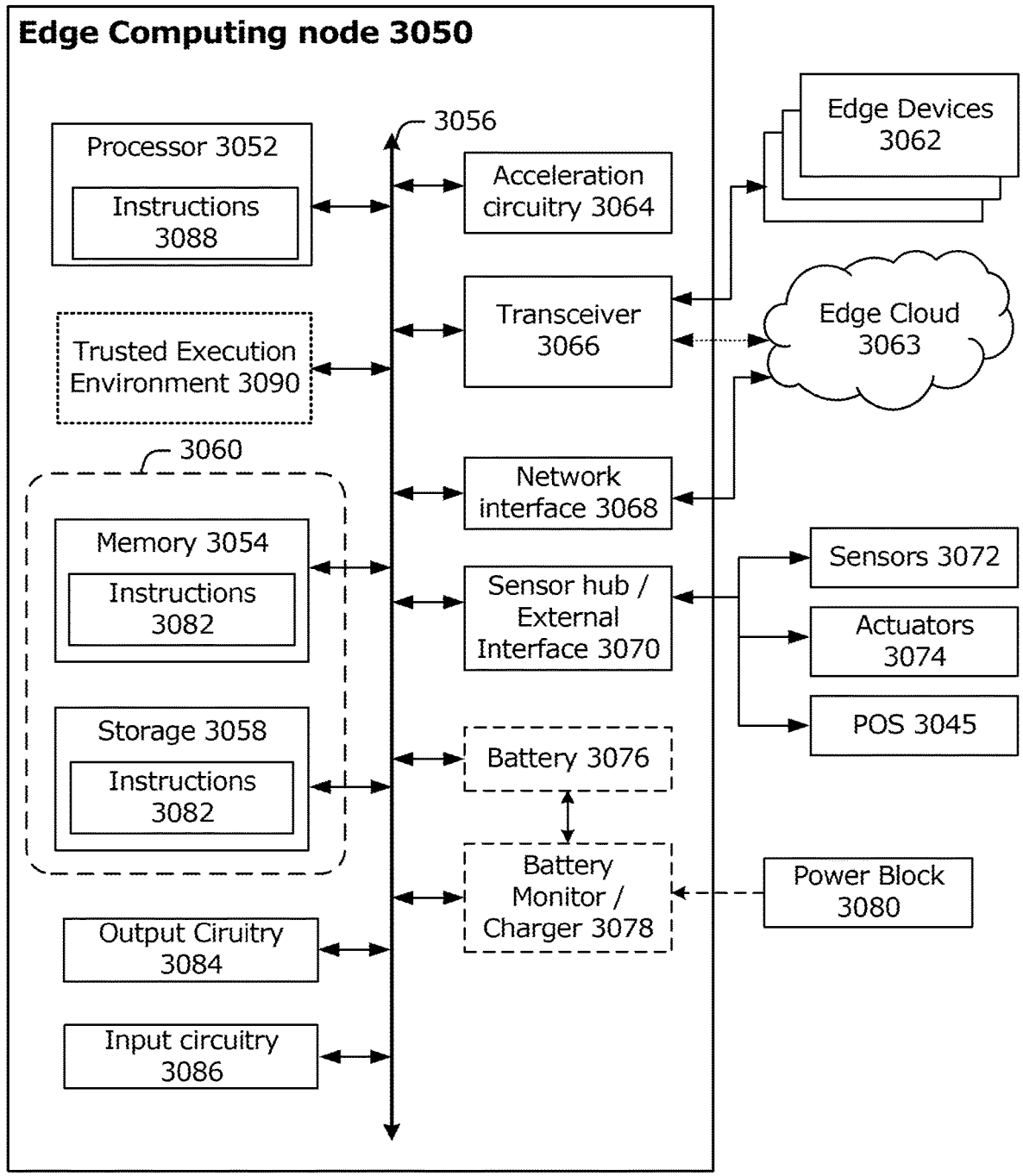

FIG. 27 illustrates an example software distribution platform 2705 to distribute software 2760, such as the example computer readable instructions 3060 of FIG. 30, to one or more devices, such as example processor platform(s) 2700 and/or example connected edge devices 3062 (see e.g., FIG. 30) and/or reconfigurable radio equipment 101 (see e.g., FIG. 1). The example software distribution platform 2705 may be implemented by any computer server, data facility, cloud service, etc., capable of storing and transmitting software to other computing devices (e.g., third parties, the example connected edge devices 3062 of FIG. 30). Example connected edge devices may be customers, clients, managing devices (e.g., servers), third parties (e.g., customers of an entity owning and/or operating the software distribution platform 2705). Example connected edge devices may operate in commercial and/or home automation environments. In some examples, a third party is a developer, a seller, and/or a licensor of software such as the example computer readable instructions 3060 of FIG. 30. The third parties may be consumers, users, retailers, OEMs, etc. that purchase and/or license the software for use and/or re-sale and/or sublicensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 27, the software distribution platform 2705 includes one or more servers and one or more storage devices. The storage devices store the computer readable instructions 2760, which may correspond to the example computer readable instructions 3060 of FIG. 30, as described above. Additionally or alternatively, the software distribution platform 2705 may correspond to the RadioApp Provider 140 of FIG. 1 and the software 2760 may correspond to the RadioApp Package 150 of FIG. 1. The one or more servers of the example software distribution platform 2705 are in communication with a network 2710, which may correspond to any one or more of the Internet and/or any of the example networks 2342, 2344, 2410, 2430, 2510, 2610, and/or the like as described herein. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 2760 from the software distribution platform 2705.

For example, the software 2760, which may correspond to the example RadioApp Package 150 of FIG. 1, may be downloaded to the example processor platform(s) 2700 (e.g., example connected edge devices), which is/are to execute the computer readable instructions 2760 to implement the embodiments discussed herein. In another example, the software 2760, which may correspond to the example computer readable instructions 3060 of FIG. 30, may be downloaded to the example processor platform(s) 2700 (e.g., example reconfigurable radio equipment 101 of FIG. 1), which is/are to execute the computer readable instructions 2760 to implement Radio apps and/or the embodiments discussed herein.

In some examples, one or more servers of the software distribution platform 2705 are communicatively connected to one or more security domains and/or security devices through which requests and transmissions of the example computer readable instructions 2760 must pass. In some examples, one or more servers of the software distribution platform 2705 periodically offer, transmit, and/or force updates to the software (e.g., the example computer readable instructions 3060 of FIG. 30) to ensure improvements, patches, updates, etc. are distributed and applied to the software at the end user devices.

In the illustrated example of FIG. 27, the computer readable instructions 2760 are stored on storage devices of the software distribution platform 2705 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions D182 stored in the software distribution platform 2705 are in a first format when transmitted to the example processor platform(s) 2700. In some examples, the first format is an executable binary in which particular types of the processor platform(s) 2700 can execute. However, in some examples, the first format is uncompiled code that requires one or more preparation tasks to transform the first format to a second format to enable execution on the example processor platform(s) 2700. For instance, the receiving processor platform(s) 2700 may need to compile the computer readable instructions 2760 in the first format to generate executable code in a second format that is capable of being executed on the processor platform(s) 2700. In still other examples, the first format is interpreted code that, upon reaching the processor platform(s) 2700, is interpreted by an interpreter to facilitate execution of instructions.

6. Hardware Components

Figure 28A:
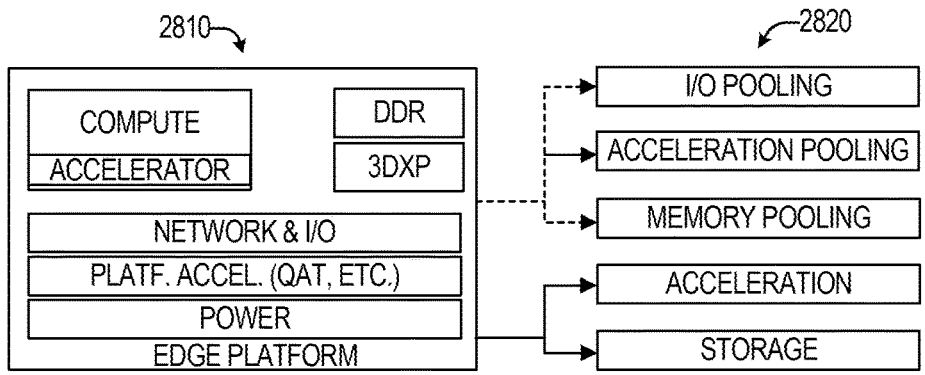
FIGS. 28A, 28B, and 28C depict examples of edge computing hardware configurations.

FIG. 28A illustrates a first edge computing hardware configuration, which maps various architectural aspects of an edge platform 2810 (e.g., compute hardware, network features, power management features, etc.) to specific edge platform capabilities 2820 (e.g., I/O pooling, acceleration pooling, memory pooling, acceleration technologies, storage capabilities). To offer the edge configuration as an overall solution for services, then the workloads or basic hardware components for services and service requirements/constraints (e.g., network and I/O, platform acceleration, power) are considered in light of available architectural aspects (e.g., pooling, storage, etc.).

Within the edge platform capabilities 2820, specific acceleration types may be configured or identified in order to ensure service density is satisfied across the edge cloud. In some implementations, four primary acceleration types may be deployed in an edge cloud configuration: (1) General Acceleration (e.g., FPGAs) to implement basic blocks such as a Fast Fourier transform (FFT), k-nearest neighbors algorithm (KNN) and machine learning workloads; (2) Image, Video and transcoding accelerators; (3) Inferencing accelerators; (4) Crypto and compression related workloads (implemented such as in Intel® QuickAssist™ technology). Thus, the particular design or configuration of the edge platform capabilities 2820 can consider which is the right type of acceleration and platform product models that needs to be selected in order to accommodate the service and throughput density as well as available power.

In other implementations, the edge cloud may provide neural network (NN) acceleration to provide NN services for one or more types of NN topologies, such as Convolution NN (CNN), Recurrent NN (RNN), a Long Short Term Memory (LSTM) algorithm, a deep CNN (DCN), a Deconvolutional NN (DNN), a gated recurrent unit (GRU), a deep belief NN, a feed forward NN (FFN), a deep FNN (DFF), a deep stacking network, a Markov chain, a perception NN, a Bayesian Network (BN), a Dynamic BN (DBN), a Linear Dynamical Systems (LDS), a Switching LDS (SLDS), a Kalman filter, Gaussian Mixture Model, Particle filter, Mean-shift based kernel tracking, an ML object detection technique (e.g., Viola-Jones object detection framework, scale-invariant feature transform (SIFT), histogram of oriented gradients (HOG), etc.), a deep learning object detection technique (e.g., fully convolutional neural network (FCNN), region proposal convolution neural network (R-CNN), single shot multibox detector, 'you only look once' (YOLO) algorithm, etc.), and so forth.

Figure 28B:
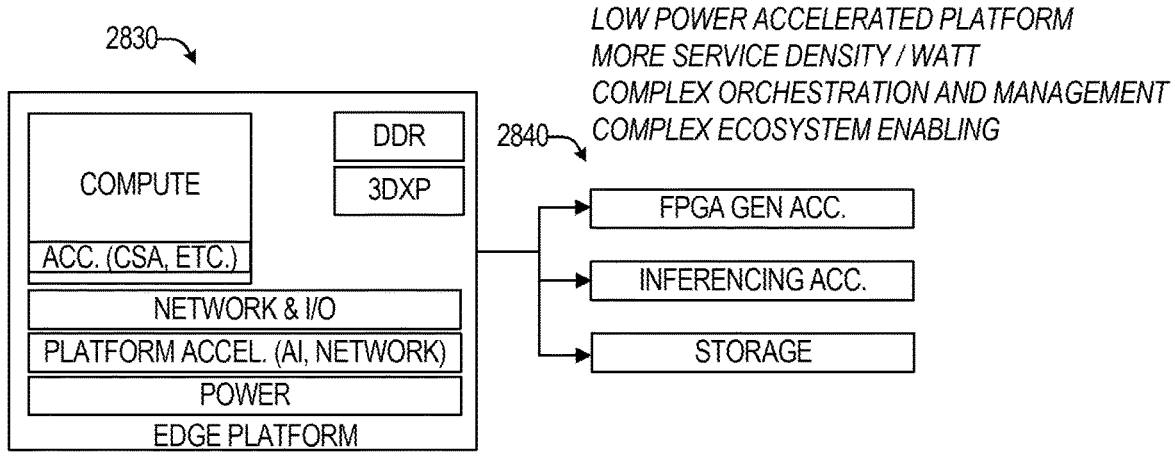

FIG. 28B illustrates a second edge computing hardware configuration, offering a second edge platform 2830 with a second set of edge platform capabilities 2840. This configuration may be deployable as a low power but more service-dense solution. This approach is targeted to define a lower power solution which uses acceleration schemes in order to achieve better service density or service throughput per watt. This main design trade-off leads to a platform that uses sacrifices general compute in favor specialized hardware (e.g., FPGAs, inferencing accelerators) that can perform the same work at better performance-per-watt ratio. In this example, a "service dense" solution enables more service actions per platform and per watt or being able to drive more throughput at a service level per watt.

The platform capabilities 2840 may be designed to be favorable in terms of power envelope as well in terms of physical space. As a result, the configuration of FIG. 28B may provide a suitable target for base station deployments. However, the platform capabilities 2840 may have tradeoffs including: (1) requirements in terms of orchestration, maintenance and system management (which can be translated to OPEX/TCO costs); (2) requiring an operator ecosystem to enable all a system stack to work with different accelerators that are exposed. However, these disadvantages may be mitigated with a developed software abstraction layer.

Figure 28C:
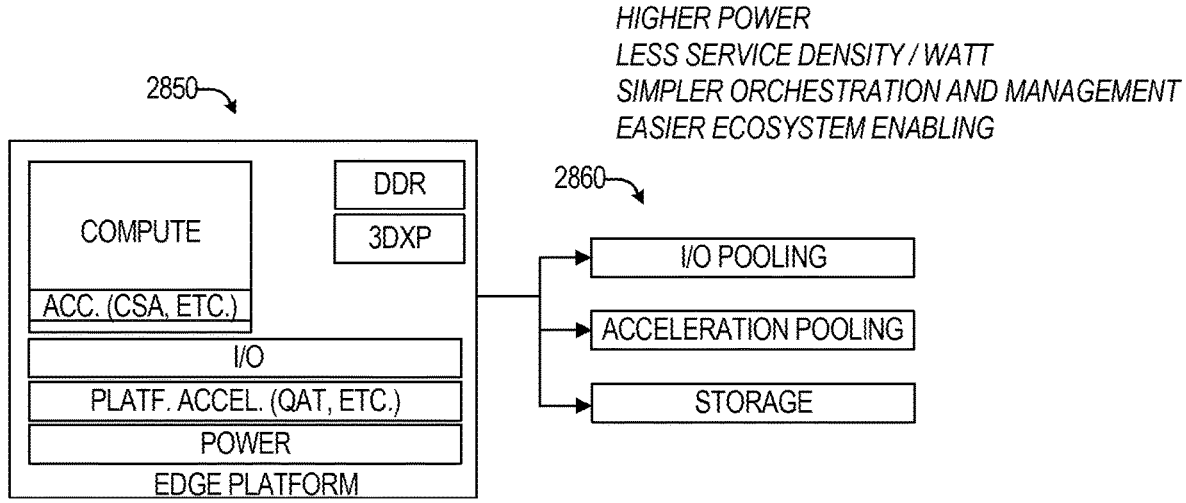

FIG. 28C illustrates a third edge computing hardware configuration, offering a third edge platform 2850 with a second set of edge platform capabilities 2860. This configuration offers a high power yet homogenous and generic architecture. FIG. 28C provides an approach that is opposite as compared FIG. 28B, to provide a platform architecture with reduced heterogeneity in the different types of resources that an operator or edge owner has to deal with respect to management, maintenance and orchestration. However, removing accelerators in favor of homogeneity comes at a cost of having less service density and service throughput per watt at platform level. In further examples, the edge platform capabilities 2860 may implement general purpose acceleration (such as in the form of FPGAs).

Other derivative functions of the edge platforms depicted in FIGS. 28A-C may also be adapted. For example, the platform can be sized and designed in order to incorporate new ingredients that make it more service and throughput dense but keeping it more homogenous by for example including accelerators inside the platform or on die in order to make them seamlessly manageable to the operators.

FIGS. 29 and 30 depict further examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

In FIG. 29, an edge compute node 2900 includes a compute engine (also referred to herein as "compute circuitry") 2902, an input/output (I/O) subsystem 2908, data storage 2910, a communication circuitry subsystem 2912, and, optionally, one or more peripheral devices 2914. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 2900 may be embodied as any type of engine, device, or collection of devices capable of performing various compute functions. In some examples, the compute node 2900 may be embodied as a single device such as an integrated circuit, an embedded system, an FPGA, a System-on-Chip (SoC), or other integrated system or device. The compute node 2900 includes or is embodied as a processor 2904 and a memory 2906. The processor 2904 may be embodied as any type of processor capable of performing the functions described herein (e.g., executing an application). For example, the processor 2904 may be embodied as a multi-core processor(s), a microcontroller, or other processor or processing/controlling circuit. In some examples, the processor 2904 may be embodied as, include, or be coupled to an FPGA, an application specific integrated circuit (ASIC), reconfigurable hardware or hardware circuitry, or other specialized hardware to facilitate performance of the functions described herein.

The main memory 2906 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 2906 may be integrated into the processor 2904. The main memory 2906 may store various software and data used during operation such as one or more applications, data operated on by the application(s), libraries, and drivers.

The compute circuitry 2902 is communicatively coupled to other components of the compute node 2900 via the I/O subsystem 2908, which may be embodied as circuitry and/or components to facilitate input/output operations with the compute circuitry 2902 (e.g., with the processor 2904 and/or the main memory 2906) and other components of the compute circuitry 2902. For example, the I/O subsystem 2908 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 2908 may form a portion of a system-on-a-chip (SoC) and be incorporated, along with one or more of the processor 2904, the main memory 2906, and other components of the compute circuitry 2902, into the compute circuitry 2902.

The one or more illustrative data storage devices 2910 may be embodied as any type of devices configured for short-term or long-term storage of data such as, for example, memory devices and circuits, memory cards, hard disk drives, solid-state drives, or other data storage devices. Individual data storage devices 2910 may include a system partition that stores data and firmware code for the data storage device 2910. Individual data storage devices 2910 may also include one or more operating system partitions that store data files and executables for operating systems depending on, for example, the type of compute node 2900.

The communication circuitry 2912 may be embodied as any communication circuit, device, or collection thereof, capable of enabling communications over a network between the compute circuitry 2902 and another compute device (e.g., an edge gateway node or the like). The communication circuitry 2912 may be configured to use any one or more communication technology (e.g., wired or wireless communications) and associated protocols (e.g., a cellular networking protocol such a 3GPP 4G or 5G standard, a wireless local area network protocol such as IEEE 802.11/ Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 2912 includes a network interface controller (NIC) 2920, which may also be referred to as a host fabric interface (HFI). The NIC 2920 may be embodied as one or more add-in-boards, daughter cards, network interface cards, controller chips, chipsets, or other devices that may be used by the compute node 2900 to connect with another compute device. In some examples, the NIC 2920 may be embodied as part of a system-on-a-chip (SoC) that includes one or more processors, or included on a multichip package that also contains one or more processors. In some examples, the NIC 2920 may include a local processor (not shown) and/or a local memory (not shown) that are both local to the NIC 2920. In such examples, the local processor of the NIC 2920 may be capable of performing one or more of the functions of the compute circuitry 2902 described herein. Additionally, or alternatively, in such examples, the local memory of the NIC 2920 may be integrated into one or more components of the client compute node at the board level, socket level, chip level, and/or other levels.

Additionally, in some examples, a respective compute node 2900 may include one or more peripheral devices 2914. Such peripheral devices 2914 may include any type of peripheral device found in a compute device or server such as audio input devices, a display, other input/output devices, interface devices, and/or other peripheral devices, depending on the particular type of the compute node 2900. In further examples, the compute node 2900 may be embodied by a respective edge compute node in an edge computing system (e.g., client compute node, edge gateway node, edge aggregation node, V-ITS-Ss discussed previous, etc.) or like forms of appliances, computers, subsystems, circuitry, or other components.

FIG. 30 illustrates an example of components that may be present in an edge computing node 3050 for implementing the techniques (e.g., operations, processes, methods, and methodologies) described herein. This edge computing node 3050 provides a closer view of the respective components of node 3000 when implemented as or as part of a computing device (e.g., as a mobile device, a base station, server, gateway, etc.). The edge computing node 3050 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 3050, or as components otherwise incorporated within a chassis of a larger system.

The edge computing node 3050 includes processing circuitry in the form of one or more processors 2952. The processor circuitry 3052 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 3052 may include one or more hardware accelerators (e.g., same or similar to acceleration circuitry 3064), which may be microprocessors, programmable processing devices (e.g., FPGA, ASIC, etc.), or the like. The one or more accelerators may include, for example, computer vision and/or deep learning accelerators. In some implementations, the processor circuitry 3052 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 3052 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 3052 may be coupled with or may include memory/storage and may be configured to execute instructions stored in the memory/ storage to enable various applications or operating systems to run on the platform 3050. The processors (or cores) 3052 is configured to operate application software to provide a specific service to a user of the platform 3050. In some embodiments, the processor(s) 3052 may be a specialpurpose processor(s)/controller(s) configured (or configurable) to operate according to the various embodiments herein.

As examples, the processor(s) 3052 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 3052 may be a part of a system on a chip (SoC), System-in-Package (SiP), a multi-chip package (MCP), and/or the like, in which the processor(s) 3052 and other components are formed into a single integrated circuit, or a single package, such as the Edison™ or Galileo™ SoC boards from Intel® Corporation. Other examples of the processor(s) 3052 are mentioned elsewhere in the present disclosure.

The processor(s) 3052 may communicate with system memory 3054 over an interconnect (IX) 3056. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 3058 may also couple to the processor 3052 via the IX 3056. In an example, the storage 3058 may be implemented via a solid-state disk drive (SSDD) and/or high-speed electrically erasable memory (commonly referred to as "flash memory"). Other devices that may be used for the storage 3058 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 3054 and/or storage circuitry 3058 may also incorporate three-dimensional (3D) cross-point (XPOINT) memories from Intel® and Micron®.

In low power implementations, the storage 3058 may be on-die memory or registers associated with the processor 3052. However, in some examples, the storage 2958 may be implemented using a micro hard disk drive (HDD). Further, any number of new technologies may be used for the storage 3058 in addition to, or instead of, the technologies described, such resistance change memories, phase change memories, holographic memories, or chemical memories, among others.

The components of edge computing device 3050 may communicate over the IX 3056. The IX 3056 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 3056 may be a proprietary bus, for example, used in a SoC based system.

The IX 3056 couples the processor 3052 to communication circuitry 3066 for communications with other devices, such as a remote server (not shown) and/or the connected edge devices 3062. The communication circuitry 3066 is a hardware element, or collection of hardware elements, used to communicate over one or more networks (e.g., cloud 3063) and/or with other devices (e.g., edge devices 3062).

The transceiver 3066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 3062. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 3066 (or multiple transceivers) may communicate using multiple standards or radios for communications at a different range. For example, the edge computing node 3050 may communicate with close devices, e.g., within about 10 meters, using a local transceiver based on BLE, or another low power radio, to save power. More distant connected edge devices 3062, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 3066 (e.g., a radio transceiver) may be included to communicate with devices or services in the edge cloud 3063 via local or wide area network protocols. The wireless network transceiver 3066 may be an LPWA transceiver that follows the IEEE 802.15.4, or IEEE 802.15.4g standards, among others. The edge computing node 3063 may communicate over a wide area using LoRaWAN™ (Long Range Wide Area Network)

developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 3066, as described herein. For example, the transceiver 3066 may include a cellular transceiver that uses spread spectrum (SPA/SAS) communications for implementing high-speed communications. Further, any number of other protocols may be used, such as Wi-Fi® networks for medium speed communications and provision of network communications. The transceiver 3066 may include radios that are compatible with any number of 3GPP specifications, such as LTE and 5G/NR communication systems, discussed in further detail at the end of the present disclosure. A network interface controller (NIC) 3068 may be included to provide a wired communication to nodes of the edge cloud 3063 or to other devices, such as the connected edge devices 3062 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 3068 may be included to enable connecting to a second network, for example, a first NIC 3068 providing communications to the cloud over Ethernet, and a second NIC 3068 providing communications to other devices over another type of network.

Given the variety of types of applicable communications from the device to another component or network, applicable communications circuitry used by the device may include or be embodied by any one or more of components 3064, 3066, 302968, or 3070. Accordingly, in various examples, applicable means for communicating (e.g., receiving, transmitting, etc.) may be embodied by such communications circuitry.

The edge computing node 3050 may include or be coupled to acceleration circuitry 3064, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 3064 may comprise logic blocks or logic fabric and other interconnected resources that may be programmed (configured) to perform various functions, such as the procedures, methods, functions, etc. of the various embodiments discussed herein. In such implementations, the acceleration circuitry 3064 may also include memory cells (e.g., EPROM, EEPROM, flash memory, static memory (e.g., SRAM, anti-fuses, etc.) used to store logic blocks, logic fabric, data, etc. in LUTs and the like.

The IX 3056 also couples the processor 3052 to a sensor hub or external interface 3070 that is used to connect additional devices or subsystems. The additional/external devices may include sensors 3072, actuators 3074, and positioning circuitry 3045.

The sensor circuitry 3072 includes devices, modules, or subsystems whose purpose is to detect events or changes in its environment and send the information (sensor data) about the detected events to some other a device, module, subsystem, etc. Examples of such sensors 3072 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 3074, allow platform 3050 to change its state, position, and/or orientation, or move or control a mechanism or system. The actuators 3074 comprise electrical and/or mechanical devices for moving or controlling a mechanism or system, and converts energy (e.g., electric current or moving air and/or liquid) into some kind of motion. The actuators 3074 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 3074 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 3050 may be configured to operate one or more actuators 3074 based on one or more captured events and/or instructions or control signals received from a service provider and/or various client systems The positioning circuitry 3045 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 3045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 3045 may include a Micro-Technology for Positioning, Navigation, and Timing (Micro-PNT) IC that uses a master timing clock to perform position tracking/estimation without GNSS assistance. The positioning circuitry 3045 may also be part of, or interact with, the communication circuitry 3066 to communicate with the nodes and components of the positioning network. The positioning circuitry 3045 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 3045 is, or includes an INS, which is a system or device that uses sensor circuitry 3072 (e.g., motion sensors such as accelerometers, rotation sensors such as gyroscopes, and altimimeters, magentic sensors, and/or the like to continuously calculate (e.g., using dead by dead reckoning, triangulation, or the like) a position, orientation, and/or velocity (including direction and speed of movement) of the platform 3050 without the need for external references.

In some optional examples, various input/output (I/O) devices may be present within or connected to, the edge computing node 3050, which are referred to as input circuitry 3086 and output circuitry 3084 in FIG. 30. The input circuitry 302986 and output circuitry 3084 include one or more user interfaces designed to enable user interaction with the platform 3050 and/or peripheral component interfaces designed to enable peripheral component interaction with the platform 3050. Input circuitry 3086 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 3084 may be included to show information or otherwise convey information, such as sensor readings, actuator position(s), or other like information. Data and/or graphics may be displayed on one or more user interface components of the output circuitry 3084. Output circuitry 3084 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 3050. The output circuitry 3084 may also include speakers or other audio emitting devices, printer(s), and/or the like. In some embodiments, the sensor circuitry 302972 may be used as the input circuitry 3084 (e.g., an image capture device, motion capture device, or the like) and one or more actuators 3074 may be used as the output device circuitry 3084 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 3076 may power the edge computing node 3050, although, in examples in which the edge computing node 3050 is mounted in a fixed location, it may have a power supply coupled to an electrical grid, or the battery may be used as a backup or for temporary capabilities. The battery 3076 may be a lithium ion battery, or a metal-air battery, such as a zinc-air battery, an aluminum-air battery, a lithium-air battery, and the like.

A battery monitor/charger 3078 may be included in the edge computing node 3050 to track the state of charge (SoCh) of the battery 3076, if included. The battery monitor/charger 3078 may be used to monitor other parameters of the battery 3076 to provide failure predictions, such as the state of health (SoH) and the state of function (SoF) of the battery 3076. The battery monitor/charger 3078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, TX. The battery monitor/charger 3078 may communicate the information on the battery 3076 to the processor 3052 over the IX 3056. The battery monitor/charger 3078 may also include an analog-to-digital (ADC) converter that enables the processor 3052 to directly monitor the voltage of the battery 3076 or the current flow from the battery 3076. The battery parameters may be used to determine actions that the edge computing node 3050 may perform, such as transmission frequency, mesh network operation, sensing frequency, and the like.

A power block 3080, or other power supply coupled to a grid, may be coupled with the battery monitor/charger 3078 to charge the battery 3076. In some examples, the power block 3080 may be replaced with a wireless power receiver to obtain the power wirelessly, for example, through a loop antenna in the edge computing node 3050. A wireless battery charging circuit, such as an LTC4020 chip from Linear Technologies of Milpitas, California, among others, may be included in the battery monitor/charger 3078. The specific charging circuits may be selected based on the size of the battery 3076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 3058 may include instructions 3082 in the form of software, firmware, or hardware commands to implement the techniques described herein. Although such instructions 3082 are shown as code blocks included in the memory 3054 and the storage 3058, it may be understood that any of the code blocks may be replaced with hardwired circuits, for example, built into an application specific integrated circuit (ASIC).

In an example, the instructions 2982 provided via the memory 3054, the storage 3058, or the processor 3052 may be embodied as a non-transitory, machine-readable medium 3060 including code to direct the processor 3052 to perform electronic operations in the edge computing node 3050. The processor 3052 may access the non-transitory, machine-readable medium 3060 over the IX 3056. For instance, the non-transitory, machine-readable medium 3060 may be embodied by devices described for the storage 3058 or may include specific storage units such as optical disks, flash drives, or any number of other hardware devices. The non-transitory, machine-readable medium 3060 may include instructions to direct the processor 3052 to perform a specific sequence or flow of actions, for example, as described with respect to the flowchart(s) and block diagram(s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

FIG. 31 depicts communication components within an example mobile device 2932. This mobile device 2932 provides a closer view of the communication processing components of node 2900 or device 2950 when implemented as a user equipment or a component of a user equipment. The mobile device 2932 may include radio front-end module (FEM) circuitry 2934, radio IC circuitry 2936 and baseband processing circuitry 2938. The mobile device 2932 as shown includes functionality for two RATs, namely RAT1 and RAT2, although aspects of the device are not so limited, and the mobile device 2932 could include many more RAT circuitries implemented in a similar manner as the RAT1 and RAT circuitries. In one example, RAT1 may be Wireless Local Area Network (WLAN) or WiFi functionality and RAT2 may be Bluetooth (BT) functionality, although aspects of the device are not so limited, and other radio technologies discussed herein may be implemented by similar circuitry. FEM circuitry 2934 may include, for example, a RAT1 FEM circuitry 2934A and a RAT2 FEM circuitry 2934B. The RAT1 FEM circuitry 2934A may include a receive signal path comprising circuitry configured to operate on RAT1 RF signals received from one or more antennas 2931A, to amplify the received signals and to provide the amplified versions of the received signals to the RAT1 radio IC circuitry 2936A for further processing. The RAT2 FEM circuitry 2934B may include a receive signal path which may include circuitry configured to operate on RAT2 RF signals received from one or more antennas 2931B, to amplify the received signals and to provide the amplified versions of the received signals to the RAT2 radio IC circuitry 2936B for further processing. FEM circuitry 2934A may also include a transmit signal path which may include circuitry configured to amplify RAT1 signals provided by the radio IC circuitry 2936A for wireless transmission by one or more of the antennas 2931A. In addition, FEM circuitry 2934B may also include a transmit signal path which may include circuitry configured to amplify RAT2 signals provided by the radio IC circuitry 2936B for wireless transmission by the one or more antennas 2931B. In the example of FIG. 31, although FEM 2934A and FEM 2934B are shown as being distinct from one another, aspects of the present disclosure are not so limited, and include within their scope the use of an FEM (not shown) that includes a transmit path and/or a receive path for both RAT1 and RAT2 signals, or the use of one or more FEM circuitries where at least some of the FEM circuitries share transmit and/or receive signal paths for both RAT1 and RAT2 signals.

Radio IC circuitry 2936 as shown may include RAT1 radio IC circuitry 2936A and RAT2 radio IC circuitry 2936B. The RAT1 radio IC circuitry 2936A may include a receive signal path which may include circuitry to down-convert RAT1 RF signals received from the FEM circuitry 2934A and provide baseband signals to RAT1 baseband processing circuitry 2938A. RAT2 radio IC circuitry 2936B may in turn include a receive signal path which may include circuitry to down-convert RAT2 RF signals received from the FEM circuitry 2934B and provide baseband signals to RAT2 baseband processing circuitry 2938B. RAT1 radio IC circuitry 2936A may also include a transmit signal path which may include circuitry to up-convert RAT1 baseband signals provided by the RAT1 baseband processing circuitry 2938A and provide RAT1 RF output signals to the FEM circuitry 2934A for subsequent wireless transmission by the one or more antennas 2931A. RAT2 radio IC circuitry 2936B may also include a transmit signal path which may include circuitry to up-convert RAT2 baseband signals provided by the RAT2 baseband processing circuitry 2938B and provide RAT2 RF output signals to the FEM circuitry 2934B for subsequent wireless transmission by the one or more antennas 2931B. In the example of FIG. 31, although radio IC circuitries 2936A and 2936B are shown as being distinct from one another, aspects of the present disclosure are not so limited, and include within their scope the use of a radio IC circuitry (not shown) that includes a transmit signal path and/or a receive signal path for both RAT1 and RAT2 signals, or the use of one or more radio IC circuitries where at least some of the radio IC circuitries share transmit and/or receive signal paths for both RAT1 and RAT2 signals.

Baseband processing circuitry 2938 may include a RAT1 baseband processing circuitry 2938A and a RAT2 baseband processing circuitry 2938B. The RAT1 baseband processing circuitry 2938A may include a memory, such as, for example, a set of RAM arrays in a Fast Fourier Transform or Inverse Fast Fourier Transform block (not shown) of the RAT1 baseband processing circuitry 2938A. Each of the RAT1 baseband circuitry 2938A and the RAT2 baseband circuitry 2938B may further include one or more processors and control logic to process the signals received from the corresponding RAT1 or RAT2 receive signal path of the radio IC circuitry 2936, and to also generate corresponding RAT1 or RAT2 baseband signals for the transmit signal path of the radio IC circuitry 2936. Each of the baseband processing circuitries 2938A and 2938B may further include physical layer (PHY) and medium access control layer (MAC) circuitry, and may further interface with application processor 2951 (or, in other examples, processor circuitry 2950) for generation and processing of the baseband signals and for controlling operations of the radio IC circuitry 2936.

Referring still to FIG. 31, according to the illustrated aspects, RAT1-RAT2 coexistence circuitry 2943 may include logic providing an interface between the RAT1 baseband circuitry 2938A and the RAT2 baseband circuitry 2938B to enable use cases requiring RAT1 and RAT2 coexistence. In addition, a switch 2933 may be provided between the RAT1 FEM circuitry 2934A and the RAT2 FEM circuitry 2934B to allow switching between the RAT1 and RAT2 radios according to application needs. In addition, although the antennas 2931A, 2931B are depicted as being respectively connected to the RAT1 FEM circuitry 2934A and the RAT2 FEM circuitry 2934B, aspects of the present disclosure include within their scope the sharing of one or more antennas as between the RAT1 and RAT2 FEMs, or the provision of more than one antenna connected to each of FEM 2934A or 2934B.

In some aspects of the present disclosure, the front-end module circuitry 2934, the radio IC circuitry 2936, and baseband processing circuitry 2938 may be provided on a single radio card. In other aspects, the one or more antennas 2931A, 2931B, the FEM circuitry 2934 and the radio IC circuitry 2936 may be provided on a single radio card. In some other aspects of the present disclosure, the radio IC circuitry 2936 and the baseband processing circuitry 2938 may be provided on a single chip or integrated circuit (IC).

Figure 32:
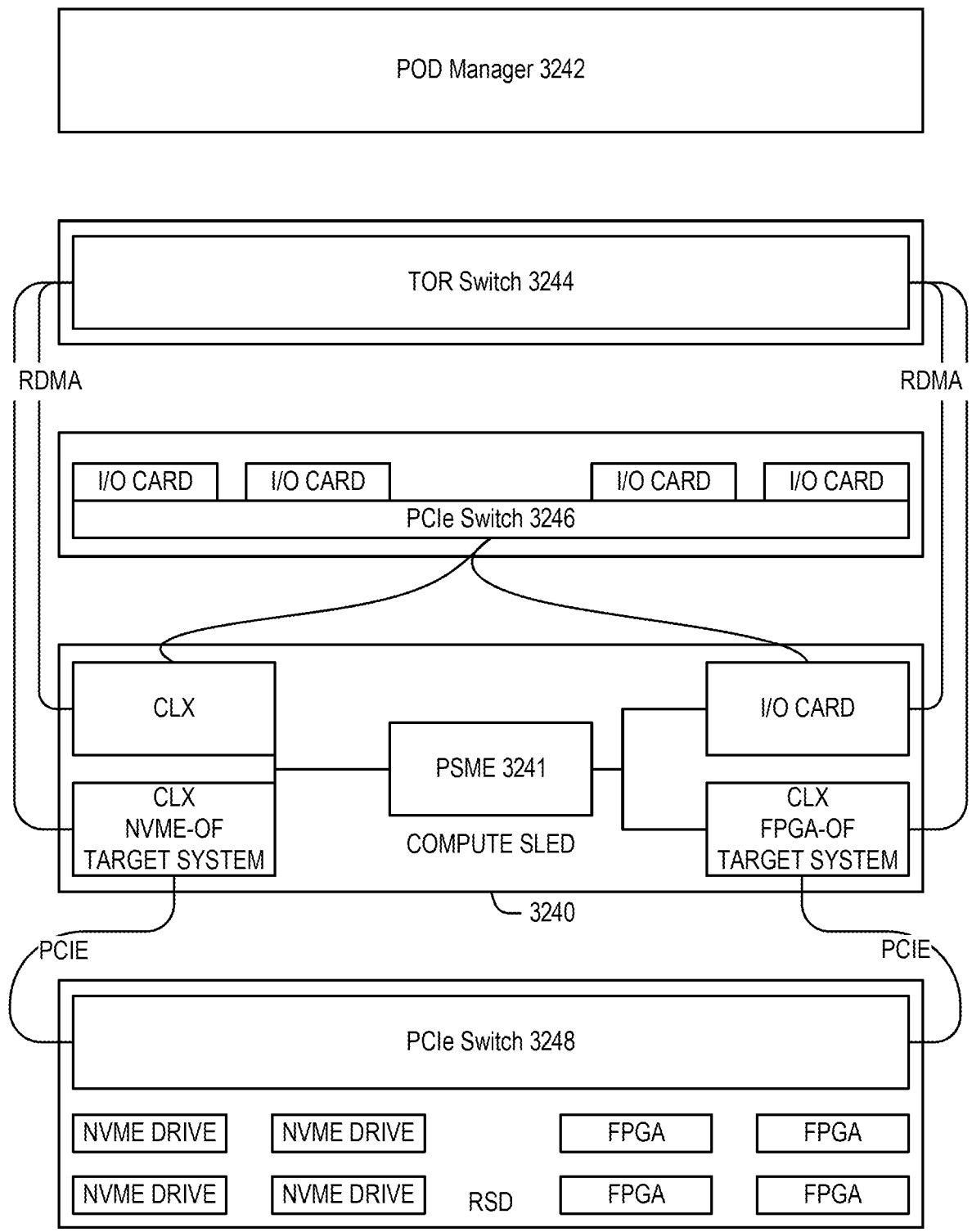
FIG. 32 depicts an example of a configurable server rack in an edge computing system.

FIG. 32 illustrates Rack Scale Design (RSD) components that may be included a part of a server or other discrete compute node in an edge platform architecture. This arrangement provides a closer view of the configurable processing components of node 2900 or device 3050 when implemented as a server (e.g., in a server rack, blade, etc.). This configurable architecture differs from some others by disaggregating field programmable gate array (FPGA), non-volatile memory express (NVMe), and input-output (I/O) pooling resources. The FPGA and NVMe resources provide elements that may be used for any type of edge services, such as video or speech analytics. I/O pooling may be used to provide flexible NFs. This architecture enables scaling network interfaces according to the expected data rate or network load for a particular VNF. This architecture also enables flexibility to map different network cards to compute nodes depending on the type of network processing happening at a given node.

The illustrated RSD architecture includes a point of delivery (POD) Manager 3242. The POD Manager 3242 is responsible of managing the resources—including compute and disaggregated resources—within a POD (e.g., one or more racks). The POD Manager 3242 exposes interfaces to an orchestrator in order to create, manage, or destroy composed nodes. Managing a composed node includes the feature of scaling up or down the amount of pooled resources 3248 connected to a particular compute sled 3240. The POD Manager 3242 typically runs on a node controller. The POD Manager 3242 is responsible for discovery of resources in the POD, configuring and managing the resources, and composing a logical server. In an example, the POD Manager 3242 is an optional separate component and will not be required in-rack. However, in an example, to be "RSD conformant" a Rack is manageable by a certified POD Manager.

The following are some example attributes of a POD Manager 3242. For example, a rack may include a set of compute sleds 3240 used to execute edge services and other related system software stacks (e.g., such as orchestration or other system services). One type of compute sled 3240 may be a Pooled Resources Sled. This compute sled 3240 may manage a set of disaggregated resources. Here, a compute sled 2940 may include a pooled System Management Engine software (PSME) 3241. The PSME 3241 provides a management interface to manage the modules or blades at a drawer level. In an example, a rack contains one or more logical PSME(s). For example, each drawer may have a PSME or server drawers may share a PSME, or a PSME may run on a top-of-rack (TOR) 3244 switch or on a separate host. In an example, the PSME 3241 supports the RSD APIs.

In an example, the compute sled 3240 may include processors (e.g., CLX) to run an RSD software stack implementing NVM-oF or FPGA-oF acting as a target system and managing a set of disaggregated resources. In an example, the processors are connected using PCIe x16 bifurcation port to a PCIe switch 3246 providing access to the target resources (FPGA or NVME in the RSD 3248).

Various RSD edge-composed node flavors may be used in the compute sled 3240 to run edge services. Services running on those nodes may use client software libraries or drivers to provide transparent access to the disaggregated FPGAS and NVME in the RSD 3248. In a further example, the rack includes one or more PCIe switches connecting the compute sleds 3240 to a set of disaggregated resources (e.g., RSD 3248).

The illustrations of FIGS. 29, 30, 31, and 32 are intended to depict a high-level view of components of a varying device, subsystem, or arrangement of an edge computing node. However, it will be understood that some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

The respective compute platforms of FIGS. 29, 30, 31, and 32 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions—even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

FIGS. 29 and 30 depict examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

7. Example Implementations

Figure 33:
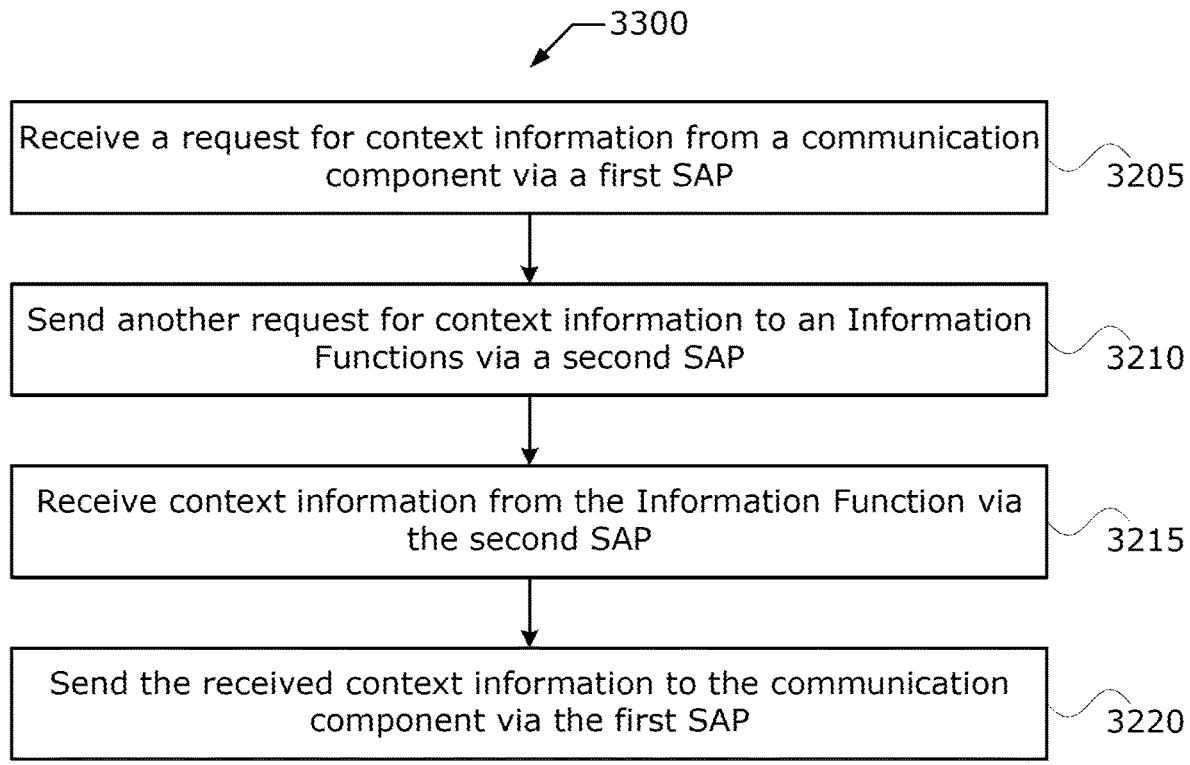
FIGS. 33 and 34 depict example processes for practicing various embodiments discussed herein.
Figure 34:
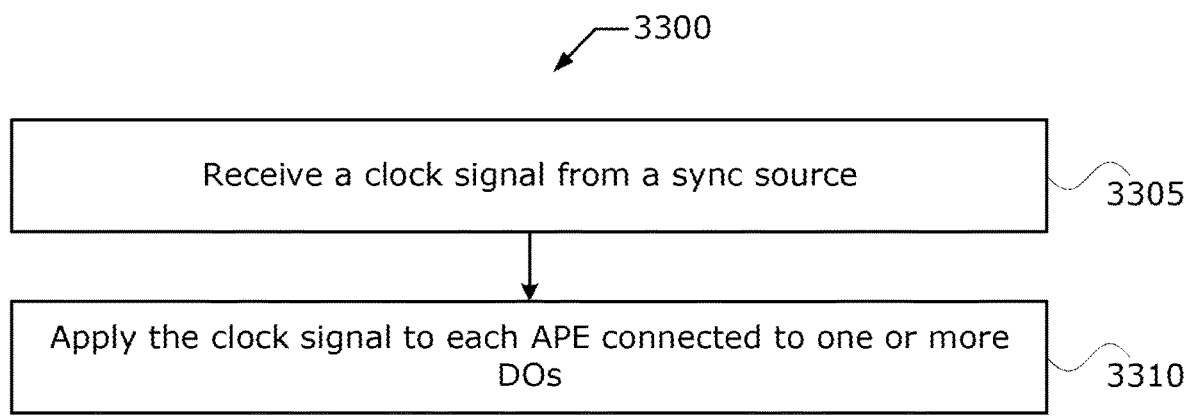

FIGS. 33 and 34 illustrate example processes 3300 and 3400, respectively, in accordance with various embodiments. While particular examples and orders of operations are illustrated by FIGS. 33 and 34, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

FIG. 33 shows an example process 3300 for providing context information to communication components according to various embodiments. Process 3300 begins at operation 3305 a Radio Interface Engine (RIE) (or RIE Function) receives a request for context information from a communication component of over a first Service Access Point (SAP). At operation 3310, the RIE sends another request for context information to respective Information Functions via a second SAP. At operation 3315, the RIE receives the requested context information from the Information Function via the second SAP. At operation 3310, the RIE sends the context information to the communication component via the first SAP.

FIG. 34 shows an example process 3400 for synchronous operation of an Radio Virtual Machine (RVM) 271, where the RVM 271 comprises one or more Abstract Processing Elements (APEs) connected to one or more Data Objects (DOs). process 3400 begins at operation 3405 where the RVM 271 receives a clock signal from a synchronization (sync) source. at operation 3410, the RVM 271 applies the clock signal to each APR of the one or more APEs, which causes each APE to process input data from connected DOs that have a full state according to a state of the clock signal.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example A01 includes a method comprising: receiving, by a Radio Interface Engine (RIE) via a first Service Access Point (SAP), a request for context information from a communication component; sending, by the RIE via respective second SAPs, a request for context information to respective Information Functions; receiving, by the RIE via the respective second SAPs, context information from the respective Information Functions; and sending, by the RIE via the first SAP, the context information to the communication component.

Example A02 includes the method of example A01 and/or some other example(s) herein, further comprising: processing, by the RIE, the context information received from the respective Information Functions components; and sending the processed context information to higher layer entities of the communication component through the first SAP.

Example A03 includes the method of example A02 and/or some other example(s) herein, wherein the processing comprises: reformatting, translating, and/or transforming the context information into a standardized format.

Example A04 includes the method of examples A01-A03 and/or some other example(s) herein, further comprising: receiving context information from the respective Information Functions without a request.

Example A05 includes the method of example A04 and/or some other example(s) herein, wherein receiving context information from the respective Information Functions without a request comprises: receiving the context information from the respective Information Functions based on occurrence of one or more trigger events.

Example A06 includes the method of examples A01-A05 and/or some other example(s) herein, further comprising: providing, by the RIE to an Information Valid Function (IVF), a request for validation of the context information; and obtaining, by the RIE from the IVF, an indicator indicating whether the context information is properly validated.

Example A07 includes the method of example A06 and/or some other example(s) herein, wherein providing the request for validation comprises: sending, by the RIE, the request for validation to the IVF over a third SAP.

Example A08 includes the method of example A07 and/or some other example(s) herein, wherein obtaining the indicator comprises: receiving, by the RIE, the indicator from the IVF over the third SAP.

Example A09 includes the method of examples A07-A08 and/or some other example(s) herein, wherein the third SAP is an IN_LINK_SAP, wherein the IVF is an entity outside of, or separate from the RIE.

Example A10 includes the method of example A06 and/or some other example(s) herein, wherein providing the request for validation comprises: sending, by the RIE, the request for validation to the IVF via an interface.

Example A11 includes the method of example A10 and/or some other example(s) herein, wherein obtaining the indicator comprises: obtaining, by the RIE, the indicator from the IVF over the interface.

Example A12 includes the method of examples A10-A11 and/or some other example(s) herein, wherein the interface is an API, ABI, middleware, firmware, software connector, software glue, and/or some other like interface, wherein the IVF is an entity inside of the RIE.

Example A13 includes the method of examples A01-A12 and/or some other example(s) herein, wherein the first SAP includes an RIEF_LINK_SAP for layer 1 (L1) and layer 2 (L2) entities of each communication component, and an RIEF_SAP for layer 3 (L3) entities of each communication component, and wherein the respective second SAPs are IN_LNK_SAPs.

Example A14 includes the method of examples A01-A13 and/or some other example(s) herein, wherein each Information Function is responsible for collecting a specific type of context information.

Example A15 includes the method of examples A01-A14 and/or some other example(s) herein, wherein the RIE, the respective information functions, the communication components, and the IVF are operated by or within a Reconfigurable Radio System (RRS) environment of a radio equipment (RE).

Example B01 includes a method of operating a Radio Virtual Machine (RVM), the RVM comprising one or more Abstract Processing Elements (APEs) connected to one or more Data Objects (DOs), the method comprising: receiving a clock signal from a synchronization (sync) source; and causing each APE of the one or more APEs to process input data from connected DOs that have a full state according to a state of the clock signal.

Example B02 includes the method of example B01 and/or some other example(s) herein, further comprising: triggering each APE to process the input data when the clock signal changes the state from a low state to a high state.

Example B03 includes the method of example B01 and/or some other example(s) herein, further comprising: triggering each APE to process the input data when the clock signal changes the state from a high state to a low state.

Example B04 includes the method of example B01 and/or some other example(s) herein, further comprising: triggering each APE to process the input data when the clock signal changes the state from a high state to a low state and changes from the high state to the low state.

Example B05 includes the method of example B01 and/or some other example(s) herein, further comprising: triggering each APE to process the input data when the clock signal changes the state from a high state to a low state and changes from the high state to the low state.

Example B06 includes the method of example B01 and/or some other example(s) herein, further comprising: triggering each APE to process the input data when the clock signal changes the state a predetermined or configured number of times.

Example B07 includes the method of examples B01-B06 and/or some other example(s) herein, further comprising: feeding each DO of the one or more DOs with the clock signal to cause each DO to change its state.

Example B08 includes the method of examples B01-B07 and/or some other example(s) herein, wherein the RVM further comprises an Abstract Switch Fabric (ASF) that connects each APE to the one or more DOs, and the method further comprises: causing the ASF to connect an individual DO of the one or more DOs to all APEs that are required to be executed synchronously.

Example B09 includes the method of examples B01-B07 and/or some other example(s) herein, wherein the RVM further comprises an ASF that connects each APE to the one or more DOs, and the method further comprises: causing the ASF to connect each DO of the one or more DOs to corresponding APEs of the one or more APEs such that the corresponding APEs are executed synchronously.

Example B10 includes the method of examples B01-B09 and/or some other example(s) herein, wherein each APE abstracts a computational resource corresponding to an operation in a data flow chart, and the method further comprises: causing each APE to execute one or more computations until the one or more APEs become inactive, wherein a result of executing the computations are full DOs that cannot activate the inactive APEs or inactive operators.

Example B11 includes the method of example B10 and/or some other example(s) herein, wherein causing each APE to execute the one or more computations comprises: reading input data from the connected DOs; causing each APE to execute an allocated operator; and causing each APE to write the processed data when associated output DOs are empty, wherein the write operation is blocked the associated output DOs that are full.

Example B12 includes the method of examples B01-B12 and/or some other example(s) herein, wherein the RVM is operated by or within a Reconfigurable Radio System (RRS) environment of a radio equipment (RE).

Example C01 includes a method to be performed by a reconfigurable radio equipment, the method comprising: sending, by a Radio Interface Engine Function (RIEF), a request for context information to respective information functions via respective Information Function Service Access Points (IN_LINK_SAPs) implemented by the respective information functions; obtaining, by the RIEF over the respective IN_LINK_SAPs, context information from the respective information functions; and sending, by the RIEF, the context information to the communication component via an RIEF Service Access Point (RIEF_SAP) of the REIF.

Example C02 includes the method of example C01 and/or some other example(s) herein, further comprising: processing, by the RIEF, the context information received from the respective information functions; and sending the processed context information to higher layer entities of the communication component through the RIEF_SAP.

Example C03 includes the method of example C02 and/or some other example(s) herein, wherein the processing comprises: reformatting, translating, or transforming the context information into a standardized format.

Example C04 includes the method of examples C01-C03 and/or some other example(s) herein, wherein the request for context information is a first request for context information, and the method further comprises: receiving, by the RIEF, a second request for context information from the communication component through the RIEF_SAP, wherein the first request is based on the second request.

Example C05 includes the method of examples C01-C03 and/or some other example(s) herein, wherein the request for context information is a first request for context information, and the method further comprises: receiving, by the RIEF, a second request for context information from the communication component through an RIEF Link Service Access Point (RIEF_LINK_SAP) when the communication component is a layer 1. (L1) or layer 2. (L2) entity, and the first request is based on the second request.

Example C06 includes the method of examples C04-C05 and/or some other example(s) herein, wherein the second request for context information includes information related to the communication component.

Example C07 includes the method of examples C01-C03 and/or some other example(s) herein, further comprising: receiving the context information from the respective information functions in response to occurrence of one or more trigger events.

Example C08 includes the method of examples C01-C07 and/or some other example(s) herein, further comprising: providing, by the RIEF to an Information Valid Function (IVF), a request for validation of the context information; and obtaining, by the RIEF from the IVF, an indicator indicating whether the context information is properly validated.

Example C09 includes the method of Example C08 and/or some other example(s) herein, wherein the IVF is an entity outside of, or separate from the RIEF, and wherein: providing the request for validation comprises sending, by the RIEF, the request for validation to the IVF over an IVF Service Access Point (INF_VAL_SAP); and obtaining the indicator comprises receiving, by the RIEF, the indicator from the IVF over the INF_VAL_SAP.

Example C10 includes the method of Example C08 and/or some other example(s) herein, wherein the IVF is an entity inside of the RIEF, and wherein: providing the request for validation comprises sending, by the RIEF, the request for validation to the IVF via an internal interface; and obtaining the indicator comprises: obtaining, by the RIEF, the indicator from the IVF over the internal interface.

Example C11 includes the method of Example C10 and/or some other example(s) herein, wherein the internal interface is a reference point, a server-based interface, an Application Programming Interface (API), and Application Binary Interface (ABI), middleware, firmware, a software connector, or software glue.

Example C12 includes the method of examples C01-C11 and/or some other example(s) herein, wherein each information function of the respective information functions is responsible for collecting a specific type of context information.

Example C13 includes the method of examples C01-C12 and/or some other example(s) herein, wherein the context information comprises localization information, information about a wireless context, Quality of Service that is provided by specific Radio Access Technologies (RATs), or Artificial Intelligence (AI) or Machine Learning (ML) information.

Example C14 includes the method of examples C01-C13 and/or some other example(s) herein, wherein the reconfigurable radio equipment further includes a Radio Virtual Machine (RVM), the RVM comprising a set of Abstract Processing Elements (APEs) connected to a set of Data Objects (DOs) through an Abstract Switch Fabric (ASF), and the method further comprises: receiving, by the RVM, a synchronization (sync) signal from a sync source; and triggering, by the RVM when the sync signal has a predetermined state, one or more APEs of the set of APEs to process input data of one or more DOs of the set of DOs having a full state.

Example C15 includes the method of Example C14 and/or some other example(s) herein, wherein the predefined state is a logical high state, a logical low stare, a number of transitions from the logical low state to the logical high state, or a number of transitions from the logical high state to the logical low state.

Example C16 includes the method of examples C14-C15 and/or some other example(s) herein, further comprising: feeding the one or more DOs with the sync signal, wherein the sync signal is to force each of the one or more DOs to the full state when the sync signal is in the predetermined state, and the sync signal is to force each of the one or more DOs to a not full state when the sync signal is not in the predetermined state.

Example C17 includes the method of examples C14-C16 and/or some other example(s) herein, further comprising: causing the ASF to connect individual DOs of the set of DOs to all APEs that are required to be executed synchronously.

Example C18 includes the method of examples C14-C16 and/or some other example(s) herein, further comprising: feeding a set of sync DOs with the sync signal, each sync DO of the set of sync DOs corresponding to a DO of the one or more DOs, wherein the sync signal is to force each sync DO the set of sync DOs to the full state when the sync signal is in the predetermined state, and the sync signal is to force each of the one or more DOs to a not full state when the sync signal is not in the predetermined state; and causing the one or more APEs to consume date from the one or more DOs when the corresponding sync DOs of the set of sync DOs are full.

Example C19 includes the method of examples C14-C18 and/or some other example(s) herein, wherein at least one APE of the set of APEs is an elementary RVE (eRVM).

Example C20 includes the method of examples C14-C19 and/or some other example(s) herein, wherein each APE of the set of APEs abstracts a computational resource corresponding to an operation in a data flow chart, wherein the data flow chart is a reactive data flow computational model including data and operators where the data are connected with the operators.

Example C21 includes the method of Example C20 and/or some other example(s) herein, further comprising: causing each APE to execute one or more computations until it becomes inactive, wherein a result of executing the computations are full DOs that cannot activate the inactive APEs or inactive operators.

Example C22 includes the method of Example C21 and/or some other example(s) herein, wherein causing each APE to execute the one or more computations comprises: reading input data from the connected DOs; causing each APE to execute an allocated operator; and causing each APE to write the processed data when associated output DOs are empty, wherein the write operation is blocked the associated output DOs that are full.

Example C23 includes the method of examples C14-C22 and/or some other example(s) herein, wherein individual DOs of the set of DOs have a full state when the individual DOs contain any amount of data.

Example C24 includes the method of examples C14-C23 and/or some other example(s) herein, wherein individual APEs of the set of APEs are configured to perform one or more operations, wherein the one or more operations include one or more of simple arithmetical operations, complex arithmetical operations, basic operations of the RVM, dynamic operations, and terminal operations.

Example C25 includes the method of examples C14-C24 and/or some other example(s) herein, wherein the reconfigurable radio equipment is a mobile device, an Internet of Things (IoT) device, a smart appliance, a desktop computer, a workstation, a server computer, a Radio Access Network (RAN) node, a network appliance, or an edge computing server.

Example Z01 includes one or more computer readable media comprising instructions, wherein execution of the instructions by processor circuitry is to cause the processor circuitry to perform the method of any one of examples A01-A15, B01-B12, C01-C25.

Example Z02 includes a computer program comprising the instructions of example Z01.

Example Z03a includes an Application Programming Interface defining functions, methods, variables, data structures, and/or protocols for the computer program of example Z02.

Example Z03b includes an API or specification defining functions, methods, variables, data structures, protocols, etc., defining or involving use of any of examples A01-A15, B01-B12, C01-C25 or portions thereof, or otherwise related to any of examples A01-A15, B01-B12, C01-C25 or portions thereof.

Example Z04 includes an apparatus comprising circuitry loaded with the instructions of example Z01.

Example Z05 includes an apparatus comprising circuitry operable to run the instructions of example Z01.

Example Z06 includes an integrated circuit comprising one or more of the processor circuitry of claim 1 and the one or more computer readable media of example Z01.

Example Z07 includes a computing system comprising the one or more computer readable media and the processor circuitry of example Z01.

Example Z08 includes an apparatus comprising means for executing the instructions of example Z01.

Example Z09 includes a signal generated as a result of executing the instructions of example Z01.

Example Z10 includes a data unit generated as a result of executing the instructions of example Z01.

Example Z11 includes the data unit of example Z10 and/or some other example(s) herein, wherein the data unit is a datagram, network packet, data frame, data segment, a Protocol Data Unit (PDU), a Service Data Unit (SDU), a message, or a database object.

Example Z12 includes a signal encoded with the data unit of examples Z10 and/or Z11.

Example Z13 includes an electromagnetic signal carrying the instructions of example Z01.

Example Z14 includes an apparatus comprising means for performing the method of any one of examples A01-A15, B01-B12, C01-C25 and/or some other example(s) herein.

Example Z15, includes a Multi-access Edge Computing (MEC) host executing a service as part of one or more MEC applications instantiated on a virtualization infrastructure, the service being related to any of examples A01-A15, B01-B12, C01-C25 or portions thereof and/or some other example(s) herein, and wherein the MEC host is configurable or operable to operate according to a standard from one or more ETSI MEC standards families.

An example implementation is an edge computing system, including respective edge processing devices and nodes to invoke or perform the operations of examples A01-A15, B01-B12, C01-C25, or other subject matter described herein. Another example implementation is a client endpoint node, operable to invoke or perform the operations of examples A01-A15, B01-B12, C01-C25, or other subject matter described herein. Another example implementation is an aggregation node, network hub node, gateway node, or core data processing node, within or coupled to an edge computing system, operable to invoke or perform the operations of examples A01-A15, B01-B12, C01-C25, or other subject matter described herein. Another example implementation is an access point, base station, road-side unit, street-side unit, or on-premise unit, within or coupled to an edge computing system, operable to invoke or perform the operations of examples A01-A15, B01-B12, C01-C25, or other subject matter described herein. Another example implementation is an edge provisioning node, service orchestration node, application orchestration node, or multi-tenant management node, within or coupled to an edge computing system, operable to invoke or perform the operations of examples A01-A15, B01-B12, C01-C25, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of examples A01-A15, B01-B12, C01-C25, or other subject matter described herein. Another example implementation is an edge computing system operable as an edge mesh, as an edge mesh with side car loading, or with mesh-to-mesh communications, operable to invoke or perform the operations of examples A01-A15, B01-B12, C01-C25, or other subject matter described herein. Another example implementation is an edge computing system including aspects of network functions, acceleration functions, acceleration hardware, storage hardware, or computation hardware resources, operable to invoke or perform the use cases discussed herein, with use of examples A01-A15, B01-B12, C01-C25, or other subject matter described herein. Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of examples A01-A15, B01-B12, C01-C25, or other subject matter described herein. Another example implementation is an edge computing system adapted for mobile wireless communications, including configurations according to an 3GPP 4G/LTE or 5G network capabilities, operable to invoke or perform the use cases discussed herein, with use of examples A01-A15, B01-B12, C01-C25, or other subject matter described herein. Another example implementation is an edge computing system adapted for supporting xApps and operating according to 0-RAN specifications, operable to invoke or perform the use cases discussed herein, with use of examples A01-A15, B01-B12, C01-C25, or other subject matter described herein.

8. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

As used herein, the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory. Specific arrangements of edge computing applications and services accessible via mobile wireless networks (e.g., cellular and WiFi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Specific implementations of a compute node may be incorporated into a server, base station, gateway, road side unit, on premise unit, UE or end consuming device, or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The term "station" or "STA" refers to a logical entity that is a singly addressable instance of a medium access control (MAC) and physical layer (PHY) interface to the wireless medium (WM). The term "wireless medium" or WM" refers to the medium used to implement the transfer of protocol data units (PDUs) between peer physical layer (PHY) entities of a wireless local area network (LAN).

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "access point" or "AP" refers to an entity that contains one station (STA) and provides access to the distribution services, via the wireless medium (WM) for associated STAs. An AP comprises a STA and a distribution system access function (DSAF). As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy.

As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. In some aspects, NFV processing and data storage will occur at the edge data centers that are connected directly to the local cellular site, within the infrastructure edge.

As used herein, the term "virtualized NF" (or VNF) indicates a software-based NF operating on multi-function, multi-purpose compute resources (e.g., x86, ARM processing architecture) which are used by NFV in place of dedicated physical equipment. In some aspects, several VNFs will operate on an edge data center at the infrastructure edge.

As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "Internet of Things" or "IoT" refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. "Edge IoT devices" may be any kind of IoT devices deployed at a network's edge.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

As used herein, the term "radio technology" refers to technology for wireless transmission and/or reception of electromagnetic radiation for information transfer. The term "radio access technology" or "RAT" refers to the technology used for the underlying physical connection to a radio based communication network. The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies (RATs).

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The term "Quality of Service" or "QoS' refers to a description or measurement of the overall performance of a service (e.g., telephony and/or cellular service, network service, wireless communication/connectivity service, cloud computing service, etc.). In some cases, the QoS may be described or measured from the perspective of the users of that service, and as such, QoS may be the collective effect of service performance that determine the degree of satisfaction of a user of that service. In other cases, QoS refers to traffic prioritization and resource reservation control mechanisms rather than the achieved perception of service quality. In these cases, QoS is the ability to provide different priorities to different applications, users, or data flows, or to guarantee a certain level of performance to a data flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein.

The term "localized network" as used herein may refer to a local network that covers a limited number of connected vehicles in a certain area or region. The term "distributed computing" as used herein may refer to computation resources that are geographically distributed within the vicinity of one or more localized networks' terminations. The term "local data integration platform" as used herein may refer to a platform, device, system, network, or element (s) that integrate local data by utilizing a combination of localized network(s) and distributed computation.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" refers to a data type that contains one single data. The term "data frame" or "DF" refers to a data type that contains more than one data element in a predefined order.

As used herein, the term "reliability" refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "ego ITS-S" refers to an ITS-S that is under consideration, the term "ego vehicle" refers to a vehicle embedding an ITS-S being considered, and the term "neighbors" refers to other ITS-Ss different than the ego ITS-S and ego vehicle.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. One or more non-transitory computer-readable medium (NTCRM) comprising instructions for operating a Radio Interface Engine Function (RIEF) of a reconfigurable radio equipment (RRE), wherein execution of the instructions by the RRE is to cause the RRE to operate the RIEF to:
    send a request for context information to respective information functions via respective Information Function Service Access Points (IN_LINK_SAPs) implemented by the respective information functions;
    obtain, over the respective IN_LINK_SAPs, context information from the respective information functions; and
    send the context information to a communication component via an RIEF Service Access Point (RIEF_SAP) of the RIEF.

2. The one or more NTCRM of claim 1, wherein execution of the instructions is to cause the RRE to operate the RIEF to:
    process the context information received from the respective information functions; and
    send the processed context information to higher layer entities of the communication component through the RIEF_SAP.

3. The one or more NTCRM of claim 2, wherein, to process the context information, execution of the instructions is to cause the RRE to:
    reformat, translat, or transform the context information into a standardized format.

4. The one or more NTCRM of claim 1, wherein the request for context information is a first request for context information, and execution of the instructions is to cause the RRE to operate the RIEF to:
    receive a second request for context information from the communication component through the RIEF_SAP, wherein the first request is based on the second request and the second request for context information includes information related to the communication component.

5. The one or more NTCRM of claim 1, wherein the request for context information is a first request for context information, and execution of the instructions is to cause the RRE to operate the RIEF to:
receive a second request for context information from the communication component through an RIEF Link Service Access Point (RIEF_LINK_SAP) when the communication component is a layer 1 (L1) or layer 2 (L2) entity, and the first request is based on the second request and the second request for context information includes information related to the communication component.

6. The one or more NTCRM of claim 1, wherein execution of the instructions is to cause the RRE to operate the RIEF to:
receive the context information from the respective information functions in response to occurrence of one or more trigger events.

7. The one or more NTCRM of claim 6, wherein execution of the instructions is to cause the RRE to operate the RIEF to:
provide, to an Information Valid Function (IVF), a request for validation of the context information; and
obtain, from the IVF, an indicator indicating whether the context information is properly validated.

8. The one or more NTCRM of claim 7, wherein the IVF is an entity outside of, or separate from the RIEF, and to provide the request for validation, execution of the instructions is to cause the RRE to operate the RIEF to:
send the request for validation to the IVF over an interface.

9. The one or more NTCRM of claim 8, wherein the IVF is an entity outside of, or separate from the RIEF, and wherein, to obtain the indicator, execution of the instructions is to cause the RRE to operate the RIEF to:
receive the indicator from the IVF over the interface.

10. The one or more NTCRM of claim 9, wherein the interface is an IVF Service Access Point (INF_VAL_SAP).

11. The one or more NTCRM of claim 9, wherein the interface is an internal interface, and the internal interface is a reference point, a server-based interface, an Application Programming Interface (API), and Application Binary Interface (ABI), middleware, firmware, a software connector, or software glue.

12. The one or more NTCRM of claim 1, wherein each information function of the respective information functions is responsible for collecting a specific type of context information.

13. The one or more NTCRM of claim 1, wherein the context information comprises localization information, information about a wireless context, Quality of Service that is provided by specific Radio Access Technologies (RATs), or Artificial Intelligence (AI) or Machine Learning (ML) information.

14. Reconfigurable radio equipment (RRE) including a Radio Virtual Machine (RVM), the RVM including a set of Abstract Processing Elements (APEs) connected to a set of Data Objects (DOs) through an Abstract Switch Fabric (ASF), and the RVM is configured to:
receive a synchronization (sync) signal from a sync source; and
trigger, when the sync signal has a predetermined state, one or more APEs of the set of APEs to process input data of one or more DOs of the set of DOs having a full state, wherein the predetermined state is a logical high state, a logical low state, a number of transitions from the logical low state to the logical high state, or a number of transitions from the logical high state to the logical low state.

15. The RRE of claim 14, wherein the RVM is configured to:
feed the one or more DOs with the sync signal, wherein the sync signal is to force each of the one or more DOs to the full state when the sync signal is in the predetermined state, and the sync signal is to force each of the one or more DOs to a not-full state when the sync signal is not in the predetermined state.

16. The RRE of claim 15, wherein the RVM is configured to:
cause the ASF to connect individual DOs of the set of DOs to all APEs that are required to be executed synchronously.

17. The RRE of claim 15, wherein the RVM is configured to:
feed a set of sync DOs with the sync signal, each sync DO of the set of sync DOs corresponding to a DO of the one or more DOs, wherein the sync signal is to force each sync DO of the set of sync DOs to the full state when the sync signal is in the predetermined state, and the sync signal is to force each of the one or more DOs to a not full state when the sync signal is not in the predetermined state; and
cause the one or more APEs to consume data from the one or more DOs when the corresponding sync DOs of the set of sync DOs are full.

18. The RRE of claim 17, wherein each APE of the set of APEs abstracts a computational resource corresponding to an operation in a data flow chart, wherein the data flow chart is a reactive data flow computational model including data and operators where the data are connected with the operators.

19. The RRE of claim 18, wherein the RVM is configured to:
causing each APE to execute one or more computations until it becomes inactive, wherein a result of executing the computations is full DOs that cannot activate the inactive APEs or inactive operators.

20. The RRE of claim 19, wherein the RVM is configured to cause each APE to execute the one or more computations including:
read input data from the connected DOs;
cause each APE to execute an allocated operator; and
cause each APE to write the processed data when associated output DOs are empty, wherein the write operation is blocked when the associated output DOs that are full.

21. The RRE of claim 14, wherein individual DOs of the set of DOs have a full state when the individual DOs contain any amount of data.

22. The RRE of claim 21, wherein individual APEs of the set of APEs are configured to perform one or more operations, wherein the one or more operations include one or more of simple arithmetical operations, complex arithmetical operations, basic operations of the RVM, dynamic operations, and terminal operations.

23. The RRE of claim 14, wherein at least one APE of the set of APEs is an elementary RVE (eRVE).

24. The RRE of claim 14, wherein the reconfigurable radio equipment is a mobile device, an Internet of Things (IoT) device, a smart appliance, a desktop computer, a workstation, a server computer, a Radio Access Network (RAN) node, a network appliance, or an edge computing server.

\* \* \* \* \*